(12) United States Patent
Ichishi et al.

(10) Patent No.: US 7,578,341 B2
(45) Date of Patent: Aug. 25, 2009

(54) AIR CONDITIONING SYSTEM FOR MOTOR VEHICLE

(75) Inventors: Yoshinori Ichishi, Kariya (JP); Tatsumi Kumada, Gamagori (JP); Kouichi Itoh, Handa (JP); Makoto Umebayashi, Chiryu (JP); Yoshinori Yanagimachi, Takahama (JP); Kazushige Ogawa, Toyota (JP)

(73) Assignee: Denso Corporation, Kariya (JP)

( * ) Notice: Subject to any disclaimer, the term of this patent is extended or adjusted under 35 U.S.C. 154(b) by 621 days.

(21) Appl. No.: 11/108,932

(22) Filed: Apr. 19, 2005

(65) Prior Publication Data

US 2005/0267646 A1    Dec. 1, 2005

(30) Foreign Application Priority Data

Apr. 19, 2004   (JP)   ............................. 2004-122799
Mar. 11, 2005   (JP)   ............................. 2005-069201

(51) Int. Cl.
 *B60H 1/00*   (2006.01)
(52) U.S. Cl. ...................... 165/202; 165/270
(58) Field of Classification Search ................. 165/202, 165/203, 204, 270
See application file for complete search history.

(56) References Cited

U.S. PATENT DOCUMENTS

| | | | | |
|---|---|---|---|---|
| 6,202,934 B1 * | 3/2001 | Kamiya et al. | ............... | 165/204 |
| 6,659,358 B2 * | 12/2003 | Kamiya et al. | ............... | 165/204 |
| 6,892,808 B2 * | 5/2005 | Remond et al. | ............. | 165/203 |
| 7,246,656 B2 * | 7/2007 | Ichishi et al. | ................ | 165/202 |

FOREIGN PATENT DOCUMENTS

JP   62-299420   12/1987

* cited by examiner

*Primary Examiner*—Ljiljana (Lil) V Ciric
(74) *Attorney, Agent, or Firm*—Harness, Dickey & Pierce, PLC

(57) ABSTRACT

A control unit for an air conditioning system for a motor vehicle calculates a target blowing air temperature based on a temperature of a passenger's clothing detected by a no contact temperature sensor. An air conditioning operation is performed based on the calculated target blowing air temperature. In particular, when calculating the target temperature in the summer or in the winter season, a change of the detected temperature of the passenger's clothing is used, so that the change of detected temperature is reflected in the target temperature with a time delay.

24 Claims, 28 Drawing Sheets

AIR CONDITIONING SYSTEM FOR MOTOR VEHICLE

CROSS REFERENCE TO RELATED APPLICATION

This application is based on Japanese Patent Application Nos. 2004-122799 filed on Apr. 19, 2004 and 2005-69201 filed on Mar. 11, 2005, the disclosures of which are incorporated herein by reference.

FIELD OF THE INVENTION

The present invention relates to an air conditioning system for a motor vehicle, in which a passenger compartment is air conditioned by use of a no-contact temperature sensor.

BACKGROUND OF THE INVENTION

A conventional air conditioning system for a motor vehicle of this kind, for example, as disclosed in Japanese Patent Publication S62-299420, comprises a pyroelectric temperature sensor (i.e. an infrared temperature sensor) for detecting surface temperature of occupant's clothing as a no-contact type temperature sensor, an air conditioning unit for blowing conditioned air into a passenger compartment of a motor vehicle, and an electronic control unit for calculating a target blowing air temperature (which is temperature of the air blown into the passenger compartment from the air conditioning unit) based on the temperature detected by the pyroelectric temperature sensor and controlling the air conditioning unit so that the blowing air temperature becomes close to the target blowing air temperature.

In the above conventional system, when a passenger gets into the passenger compartment of the motor vehicle during a winter period in which an ambient (outside) temperature is low, the electronic control unit calculates the target blowing air temperature at a higher value than an ordinal temperature in the other cases, because the temperature of the passenger's clothing is lower due to the outside low temperature. And thereby, the blowing air temperature from the air conditioning unit can be set at a higher value in response to the outside low temperature, shortly after the passenger gets in the motor vehicle.

On the other hand, when a passenger gets into the passenger compartment of the motor vehicle during a summer period in which an ambient (outside) temperature is high, the electronic control unit calculates the target blowing air temperature at a lower value than an ordinal temperature in the other cases, because the temperature of the passenger's clothing is higher due to the outside high temperature. And thereby, the blowing air temperature from the air conditioning unit can be set at a lower value in response to the outside high temperature, shortly after the passenger gets in the motor vehicle, even in the case that an operational condition of the air conditioning unit is in a normal operation mode shortly before the passenger gets in the motor vehicle.

According to researches of the inventors of this invention, with regard to comfortable feeling which the passenger gets by the blowing air from the air conditioning unit shortly after he gets into the motor vehicle, it was found out that there are following two problems.

According to the above conventional system, the blowing air temperature can be adjusted at the higher value than the ordinal temperature during the winter season, in accordance with the surface temperature of the passenger's clothing. However, the target blowing air temperature is decreased by the electronic control unit within a short period, because heat capacity of the clothing is generally small and thereby the temperature of the clothing is increased in the short period due to the inside temperature of the passenger compartment. The temperature of the air blowing out of the air conditioning unit is decreased, before the passenger feels "warm". As a result, the above conventional system can not sufficiently give a comfortable feeling to the passenger by the warm air, during a period shortly after the passenger gets into the motor vehicle.

On the other hand, the blowing air temperature can be adjusted at the lower value than the ordinal temperature during the summer season. However, the target blowing air temperature is increased by the electronic control unit within a short period, because the temperature of the clothing is decreased in the short period due to the inside temperature of the passenger compartment. The temperature of the air blowing out of the air conditioning unit is increased, before the passenger feels "cool". As a result, the above conventional system can not sufficiently give a comfortable feeling to the passenger by the cool air, either, during a period shortly after the passenger gets into the motor vehicle.

SUMMARY OF THE INVENTION

It is, therefore, an object of the present invention, in view of the above mentioned problems, to provide an air conditioning system for a motor vehicle, in which a no-contact temperature sensor is used and which can sufficiently give comfortable feeling to passengers by air-conditioned air even in a time period shortly after the passenger gets into the motor vehicle.

According to a feature of the present invention, a no-contact temperature sensor is provided for detecting surface temperatures of a passenger's clothing at various different body portions. An electronic control unit calculates a target temperature of blowing air into respective air conditioning spaces of a motor vehicle, such as a front right space for a vehicle driver, a rear right space for a passenger, and so on, wherein the target temperature is calculated based on the above detected temperature of the passenger's clothing as well as other various information, such as an outside air temperature, an inside air temperature, a desired temperature set by the driver or the passenger, an amount of solar insolation, and so on. And an air conditioning operation is performed based on the above calculated target temperature.

When calculating the target temperature, in particular, in the case that the passenger gets into the vehicle in the summer or in the winter season, a change of the detected temperature of the passenger's clothing is used for calculating the target temperature, in such a manner that the change of detected temperature is reflected in the target temperature with a time delay, so that a more comfortable feeling can be given to the passenger.

According to another feature of the invention, the electronic control unit determines whether the passenger has got into the vehicle or not based on the change of the detected temperature of the passenger's clothing.

According to a further feature of the present invention, the electronic control unit calculates the target temperature and changes it to a higher value than a normal value, during a predetermined time period, when the passenger gets into the vehicle during the winter season. As a result, a more comfortable feeling can be given to the passenger, even shortly after the passenger gets into the vehicle.

On the other hand, the electronic control unit calculates the target temperature and changes it to a lower value than a normal value, during a predetermined time period, when the passenger gets into the vehicle during the summer season. As a result, a more comfortable feeling can be given to the passenger, even shortly after the passenger gets into the vehicle.

According to a still further feature of the invention, the change of the detected temperature of the passenger's clothing is used in the calculation of the target temperature, wherein the change of the detected temperature is contributed contributes more in the calculation when the passenger gets into the vehicle than the contribution of the case before the passenger gets into the vehicle.

As a result, the power of the air conditioning operation during the predetermined period after the passenger has got into the vehicle is increased compared with the air conditioning operation before the passenger has got into the vehicle, so that a more comfortable feeling can be given to the passenger, even shortly after the passenger has got into the vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
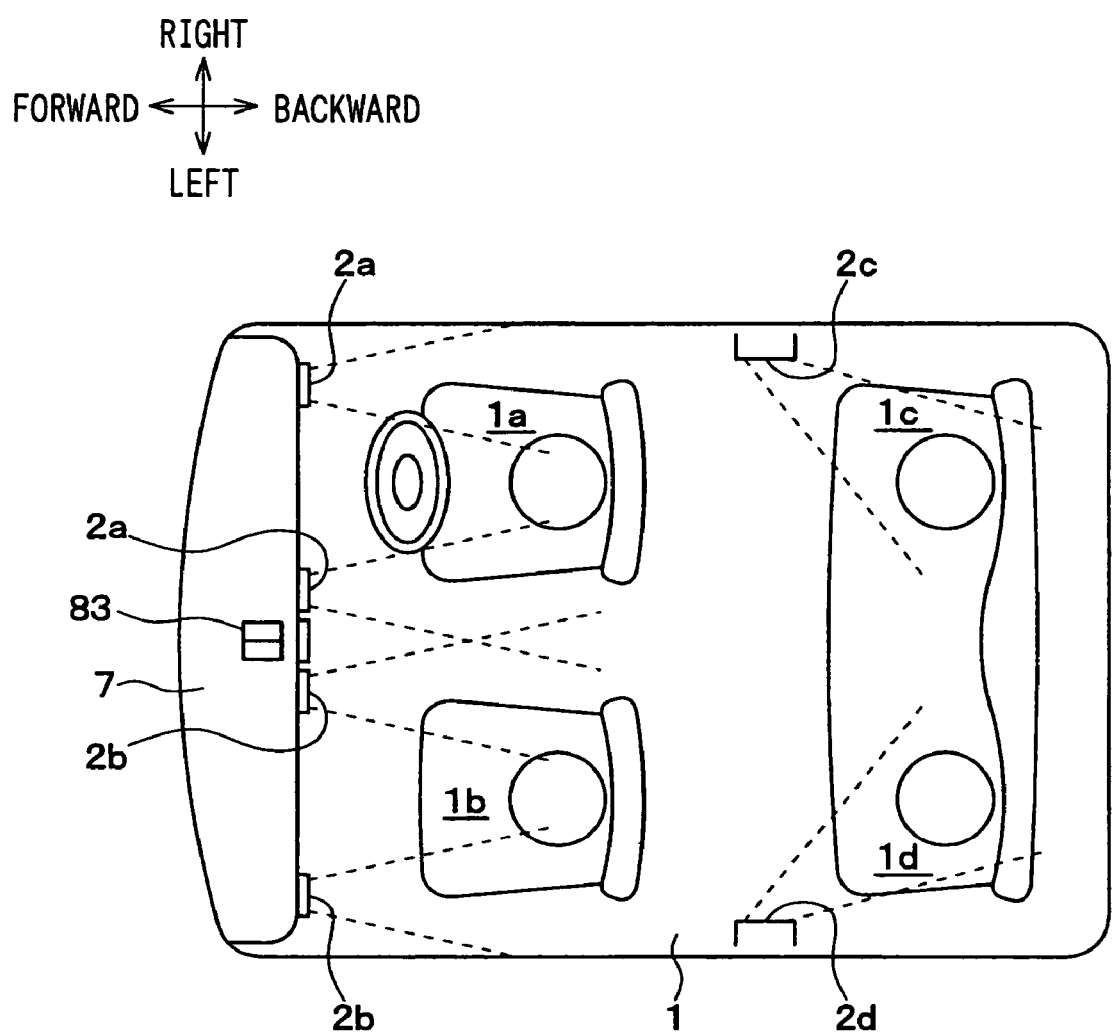
FIG. 1 is a schematic view showing a layout of an air conditioning system for a vehicle, according to a first embodiment of the present invention.
Figure 2:
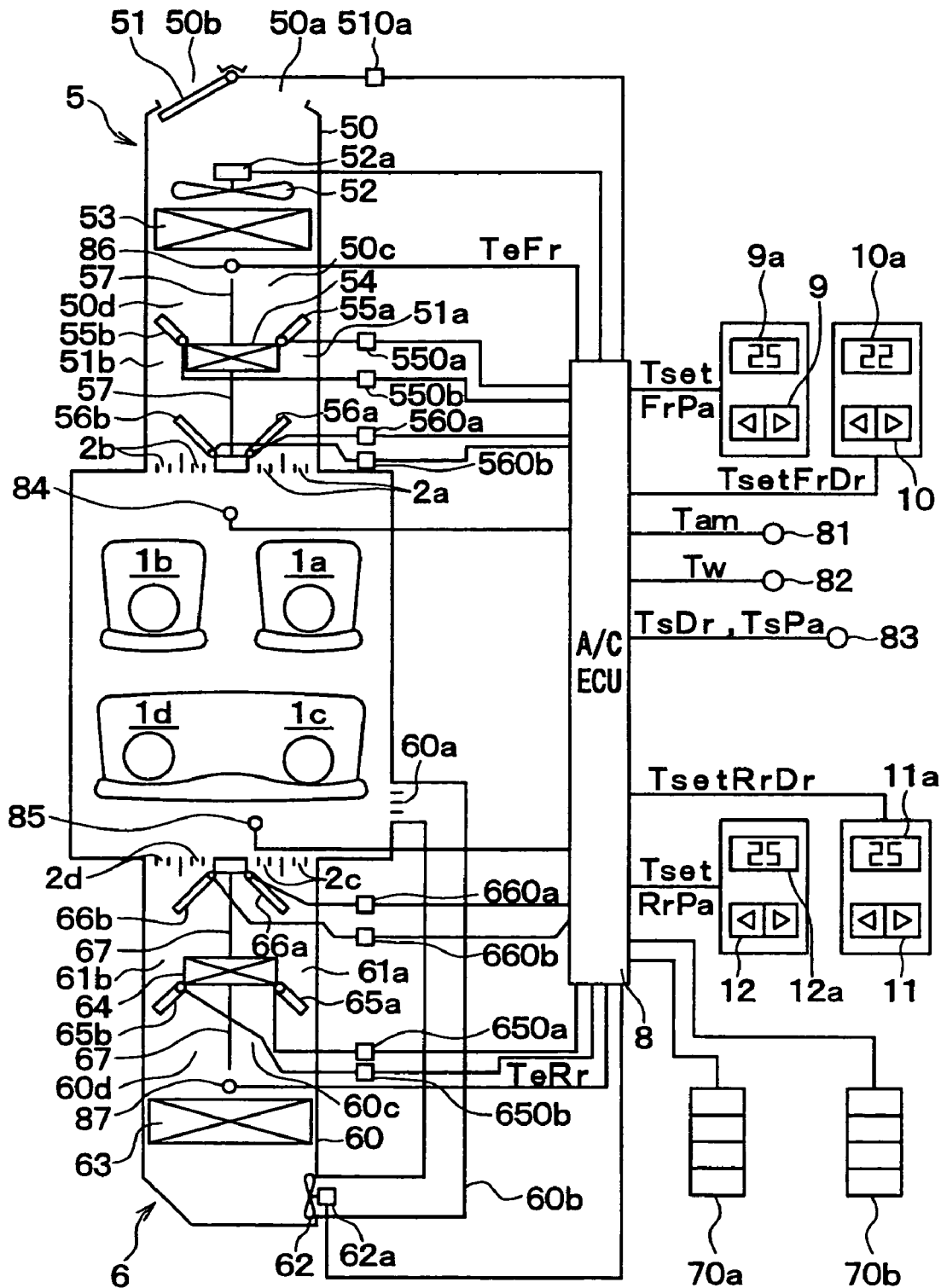
FIG. 2 is a schematic view showing the entire air conditioning system, according to the first embodiment.

A first embodiment of the present invention will now be explained with reference to the drawings, wherein FIG. 1 is a schematic plan view showing a layout of air blowing ducts of an inside air conditioning unit for an air conditioning system according to the first embodiment, and FIG. 2 is a schematic view showing a total system including the inside air conditioning unit and control blocks.

In the first embodiment, a passenger compartment 1 of a motor vehicle is divided into four air conditioning spaces 1*a* to 1*d*, and an air conditioning operation for the four air conditioning spaces (front and rear, and right and left) 1*a*, 1*b*, 1*c* and 1*d* are independently performed. A motor vehicle having a right-hand steering wheel is shown in FIGS. 1 and 2. The air conditioning space 1*a* is a space of the front and right side (i.e. a space for a vehicle driver's seat), and the air conditioning space 1*b* is a space of the front and left (i.e. a space for an assistant driver's seat).

The air conditioning space 1*c* is a space of the rear and right, while the air conditioning space 1*d* is a space of the rear and left. Arrows in FIG. 1 show directions of the motor vehicle, in which the air conditioning system is mounted.

The inside air conditioning unit for the motor vehicle comprises a front unit 5 and a rear unit 6. The front unit 5 independently controls the air conditioning operation (e.g. temperature of the blowing air) for the front right and front left spaces 1*a* and 1*b*. The rear unit 6, likewise, independently controls the air conditioning operation for the rear right and rear left spaces 1*c* and 1*d*.

The front unit 5 is arranged within an instrument panel casing 7, which is located at a front side of the passenger compartment 1, and the rear unit 6 is arranged at a rearmost portion of the passenger compartment 1. The front unit 5 has an air duct 50 for blowing the air toward the front seats of the passenger compartment 1. An inside air recirculation port 50*a* and an outside air port 50*b* are respectively provided at an upstream end of the air duct 50, for respectively guiding the inside air from the passenger compartment 1 and the outside air.

A switching door 51 is provided in the air duct 50 for selectively opening the outside air port 50*b* and the inside air recirculation port 50*a*. A servo motor 510*a* is connected to the switching door 51 for operating the same.

A centrifugal type blower device 52 is provided in the air duct 50 and at a downstream side of the outside air port 50*b* and the inside air recirculation port 50a, for generating air flow so that the air is blown into the passenger compartment 1. The blower device 52 comprises a centrifugal type blower fan and a blower motor 52a for rotating the blower fan. In FIG. 2, the blower fan is shown as an axial flow type fan for the purpose of simplifying the drawing, although the centrifugal type blower fan is used in the actual apparatus.

An evaporator 53 is provided in the air duct 50 and at a downstream side of the blower fan device 52 for cooling down the air flowing in the air duct 50. A heater core 54 is also provided in the air duct 50 and at a downstream side of the evaporator 53 for heating the air flowing through the air duct 50.

A partitioning plate 57 is provided in the air duct 50 and at the downstream side of the evaporator 53 to divide the air passage in the air duct 50 into two air passages, namely a driver side air passage 50c and an assistant driver side air passage 50d.

A bypass air passage 51a is provided in the driver side air passage 50c, so that the air cooled down at the evaporator 53 can bypass the heater core 54.

A bypass air passage 51b is likewise provided in the assistant driver side air passage 50d, so that the air cooled down at the evaporator 53 can bypass the heater core 54.

Air mix doors 55a and 55b are respectively provided in the driver side and the assistant driver side air passages 50c and 50d, and at the upstream side of the heater core 54, wherein the air mix doors 55a and 55b are independently operated. The air mix door 55a controls, by adjusting its opening degree in the driver side air passage 50c, a ratio of an amount of the air (hot air) flowing through the heater core 54 to an amount of the air (cool air) flowing in the bypass air passage 51a, so that the temperature of the blowing air to be blown into the air conditioning space 1a for the driver's seat is controlled.

The air mix door 55b controls, by adjusting its opening degree in the assistant driver side air passage 50d, a ratio of an amount of the air (hot air) flowing through the heater core 54 to an amount of the air (cool air) flowing in the bypass air passage 51b, so that the temperature of the blowing air to be blown into the air conditioning space 1b for the assistant driver's seat is controlled.

Servo motors 550a and 550b are respectively connected to the air mix doors 55a and 55b, for independently controlling the opening degrees of the respective air mix doors 55a and 55b.

The evaporator 53 is a well known heat exchanger of a low pressure side, which forms a refrigerating cycle together with a compressor, a condenser, a receiver and a depressurizing device (not shown). In the evaporator 53, the refrigerant of low pressure side is evaporated by absorbing evaporation latent heat from the air flowing through the air duct 50, so that the air is cooled down in the air duct 50. The compressor (not shown) is operatively connected to an internal combustion engine for the motor vehicle through an electromagnetic clutch (not shown), so that the operation of the compressor is controlled by a switching operation of the electromagnetic clutch.

The heater core 54 is a heat exchanger for heating the air having passed through the evaporator 53 by the engine cooling water from the engine.

Face air outlets 2a and 2b are respectively provided at downstream side of the heater core 54 in the driver side and the assistant driver side air passages 50c and 50d.

The face air outlet 2a of the driver side blows the air from the driver side air passage 50c toward the upper body of the driver seated on the driver's seat. The face air outlet 2b of the assistant driver side blows the air from the assistant driver side air passage 50d toward the upper body of the occupant seated on the assistant driver's seat.

Switching doors 56a and 56b are respectively provided in the driver side and the assistant driver side air passages 50c and 50d and at an upstream side of each face air outlets 2a and 2b, to open and close the face air outlets 2a and 2b. Servo motors 560a and 560b are connected to the switching doors 56a and 56b for operating the same.

Each of the face air outlets 2a and 2b comprises a center air outlet provided in the instrument panel casing 7 and arranged at a position close to the center of the instrument panel, and a side air outlet also provided in the instrument panel casing 7 and arranged at a position close to a side windshield (horizontally distanced from the center air outlet), as shown in FIG. 1.

Although not shown in the drawings, a foot air outlet and a defrosting air outlet are respectively provided at the downstream end of the driver side air passage 50c, in addition to the above face air outlet 2a. The foot air outlet blows the air from the driver side air passage 50c toward the lower body of the driver, whereas the defrosting air outlet blows the air from the driver side air passage 50c toward an inner surface of a front windshield on the driver side.

A foot air outlet and a defrosting air outlet are likewise and respectively provided at the downstream end of the assistant driver side air passage 50d, in addition to the above face air outlet 2b. The foot air outlet blows the air from the assistant driver side air passage 50d toward the lower body of the assistant driver, whereas the defrosting air outlet blows the air from the assistant driver side air passage 50d toward the inner surface of the front windshield on the assistant driver side.

Switching doors (not shown) are also respectively provided in the driver side and the assistant driver side air passages 50c and 50d and at an upstream side of each of the foot air outlet and the defrosting air outlet, to open and close those outlets. Those switching doors are likewise operated by the servo motors 560a and 560b.

The rear unit 6 has an air duct 60 for blowing the air into the passenger compartment 1. An inside air recirculation port 60a is provided in the passenger compartment 1, and an inside air recirculation duct 60b is provided at an upstream end of the air duct 60, for guiding the inside air from the passenger compartment 1 through the inside air recirculation port 60a.

A centrifugal type blower device 62 is provided at a downstream side of the inside air recirculation duct 60b, for generating air flow so that the air is blown into the passenger compartment 1. The blower device 62 comprises a centrifugal type blower fan and a blower motor 62a for rotating the blower fan. In FIG. 2, the blower fan is shown as an axial flow type fan for the purpose of simplifying the drawing, although the centrifugal type blower fan is used in the actual apparatus, as in the same manner to the above front unit 5.

An evaporator 63 is provided in the air duct 60 and at a downstream side of the blower fan device 62 for cooling down the air flowing in the air duct 60. A heater core 64 is also provided in the air duct 60 and at a downstream side of the evaporator 63 for heating the air flowing through the air duct 60.

A partitioning plate 67 is provided in the air duct 60 and at the downstream side of the evaporator 63 to divide the air passage in the air duct 60 into two air passages, namely a rear right side air passage 60c and a rear left side air passage 60d.

A bypass air passage 61a is provided in the rear right side air passage 60c, so that the air cooled down at the evaporator 63 can bypass the heater core 64.

A bypass air passage 61b is likewise provided in the rear left side air passage 60d, so that the air cooled down at the evaporator 63 can bypass the heater core 64.

Air mix doors 65a and 65b are respectively provided in the rear right and rear left side air passages 60c and 60d, and at the upstream side of the heater core 64, wherein the air mix doors 65a and 65b are independently operated. The air mix door 65a controls, by adjusting its opening degree in the rear right side air passage 60c, a ratio of an amount of the air (hot air) flowing through the heater core 64 to an amount of the air (cool air) flowing in the bypass air passage 61a, so that the temperature of the blowing air to be blown into the air conditioning space 1c for the rear right seat is controlled.

The air mix door 65b controls, by adjusting its opening degree in the rear left side air passage 60d, a ratio of an amount of the air (hot air) flowing through the heater core 64 to an amount of the air (cool air) flowing in the bypass air passage 61b, so that the temperature of the blowing air to be blown into the air conditioning space 1d for the rear left seat is controlled.

Servo motors 650a and 650b are respectively connected to the air mix doors 65a and 65b, for independently controlling the opening degrees of the respective air mix doors 65a and 65b.

The evaporator 63 is a heat exchanger provided in parallel to the evaporator 53 of the above described well known refrigerating cycle.

The heater core 64 is a heat exchanger arranged in parallel to the above heater core 54 in the hot water circuit, for heating the air having passed through the evaporator 63 by the engine cooling water from the engine.

A face air outlet 2c is provided at a downstream side of the heater core 64 in the rear right side air passage 60c, for blowing the air from the rear right air passage 60c toward an upper body of an occupant (referred to as the rear right occupant) seated in the rear right seat.

A face air outlet 2d is provided at a downstream side of the heater core 64 in the rear left side air passage 60d, for blowing the air from the rear left air passage 60d toward an upper body of an occupant (referred to as the rear left occupant) seated in the rear left seat.

Switching doors 66a and 66b are respectively provided in the rear right and rear left side air passages 60c and 60d and at an upstream side of each face air outlets 2c and 2d, to open and close the face air outlets 2c and 2d. Servo motors 660a and 660b are connected to the switching doors 66a and 66b for operating the same.

Although not shown in FIGS. 1 and 2, a foot air outlet is provided at the downstream end of the rear right side air passage 60c, in addition to the above face air outlet 2c. The foot air outlet blows the air from the rear right side air passage 60c toward the lower body of the rear right occupant.

A foot air outlet is likewise provided at the downstream end of the rear left side air passage 60d, in addition to the above face air outlet 2d. The foot air outlet blows the air from the rear left side air passage 60d toward the lower body of the rear left occupant.

Switching doors (not shown) are also respectively provided in the rear right and rear left side air passages 60c and 60d and at an upstream side of each of the foot air outlet, to open and close those outlets. Those switching doors are likewise operated by the servo motors 660c and 660d.

An outside temperature sensor 81, a cooling water temperature sensor 82, a solar insolation sensor 83, an inside temperature sensors 84 and 85, and an evaporator temperature sensor 85 and 87 are connected to an input side of the electronic control unit 8 (also referred to as the ECU) for the air conditioning system.

The outside temperature sensor 81 detects a temperature of the ambient air outside of the vehicle and outputs an outside temperature signal "Tam" to the ECU 8. The cooling water temperature sensor 82 detects a temperature of the cooling water (i.e. the hot water) for the engine and outputs a cooling water temperature signal "Tw" to the ECU 8.

The solar insolation sensor 83 is a well known two-element type (2D) sensor arranged at a position on a dashboard close to the front windshield (which is almost a center position of the dashboard in a horizontally right-left direction). The solar insolation sensor 83 respectively detects amounts of incident insolation in the driver's and the assistant driver's spaces 1a and 1b, and outputs to the ECU 8 insolation signals "TsDr" and "TsPa", respectively corresponding to the amounts of the incident insolation.

The inside temperature sensor 84 detects a typical temperature of the inside air in the front space (the driver's and the assistant driver's spaces 1a and 1b) and outputs an inside temperature signal "TrFr" to the ECU 8. The inside temperature sensor 85 detects a typical temperature of the inside air in the rear space (the rear right and the rear left spaces 1c and 1d) and outputs an inside temperature signal "TrRr" to the ECU 8.

The evaporator temperature sensors 86 and 87 respectively detect temperature of the air at the downstream side of the respective evaporators 53 and 63, and output evaporator temperature signals "TeFr" and "TeRr" to the ECU 8.

Temperature setting switches 9, 10, 11 and 12 are connected to the ECU 8, wherein desired temperatures "FrTsetDr", "FrTsetPa", "RrTsetDr", and "RrTsetPa" for the respective air conditioning spaces 1a, 1b, 1c and 1d are selected by the driver and other passengers (occupants). Matrix infrared (IR) temperature sensors 70a and 70b of a no-contact type sensor are also connected to the ECU 8, wherein the temperature sensors 70a and 70b (for the right and left spaces) respectively detect surface temperatures of the rear space (the rear right and rear left air conditioning spaces 1c and 1d). Display devices 9a, 10a, 11a and 12a are respectively provided adjacent to the switches 9 to 12 for displaying the inputted information, such as the desired (set) temperature. The display devices 9a to 12a are respectively arranged at a front side of the respective seats, and each of the display devices is directed toward the driver and the other passengers.

A thermopile type detecting device is used for the matrix IR sensors 70a and 70b, wherein a change of electromotive force generated in response to an amount change of infrared ray is detected as a temperature change. The structure of the matrix IR sensors 70a and 70b is explained with reference to FIGS. 3 and 4.

The matrix IR sensors 70a and 70b for the right and left sides have the same structure, so that the matrix IR sensor 70a for the right side is mainly explained, whereas the explanation of the matrix IR sensor 70b for the left side is simply made.

Figure 3:
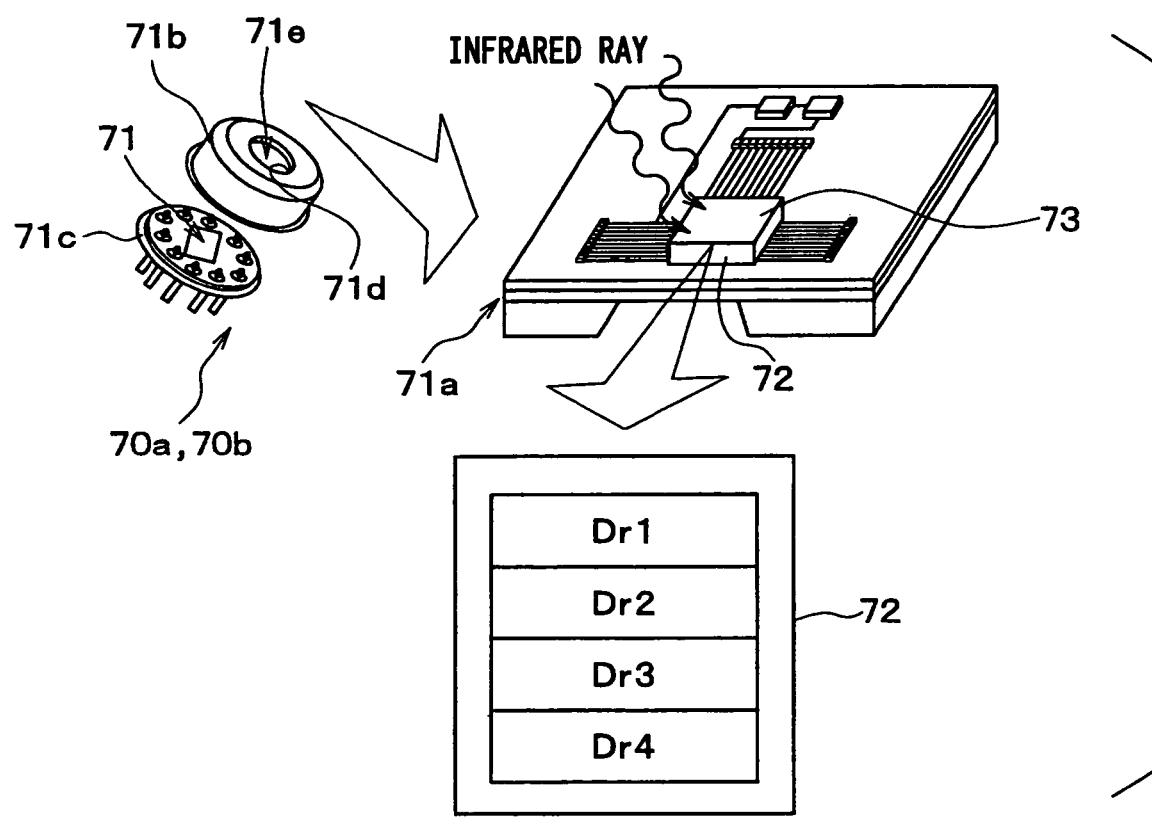
FIG. 3 is a schematic view showing a matrix type IR sensor.

The sensor 70a has a detecting portion 71, as shown in FIG. 3, which comprises a base plate 71a, a sensor chip 72 mounted on the base plate 71a, and an infrared ray absorbing film 73 covering the sensor chip 72. The detecting portion 71 is arranged on a seat element 71c and is covered by a cup-shaped casing 71b. A rectangular window 71d is formed at a bottom of the casing 71b, and a lens 71e is embedded in the window 71d. The infrared ray absorbing film 73 converts the incident infrared rays coming through the lens 71e from physical objects for temperature detection in the air conditioning spaces 1c and 1d.

Four thermoelectric couples Dr1 to Dr4 are arranged on the sensor chip 72, wherein the thermoelectric couples Dr1 to Dr4 are temperature detecting elements for converting the heat generated at the infrared ray absorbing film 73 into electric voltage (electrical energy).

Figure 4:
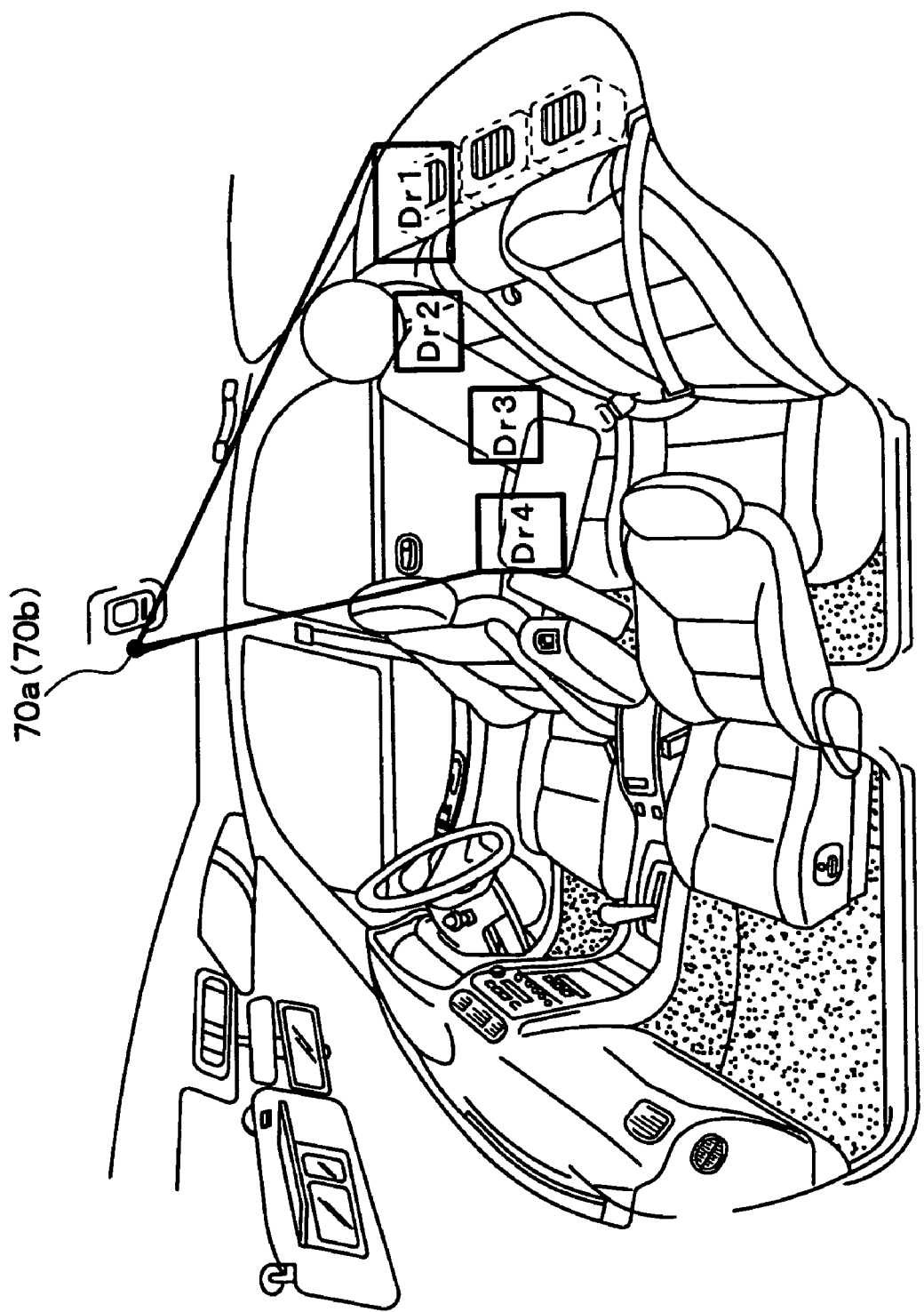
FIG. 4 is a layout of a vehicle, in which the matrix IR sensors and detection areas by the sensors are indicated.

FIG. 4 shows a position of the IR sensor 70a (70b) and areas, the temperature of which are detected by the thermoelectric couples Dr1 to Dr4. The references Dr1 to Dr4 in FIG. 4 correspond to those temperature detection areas.

The matrix IR sensor 70a for the right side is arranged at an almost center of a vehicle ceiling, wherein the infrared ray absorbing film 73 of the sensor 70a is inclined from the horizontal plane toward a backward direction, so that the temperature detection areas are formed at such areas which are backward side of the vertical line of the sensor 70a.

More specifically, the detection area for the thermoelectric couple Dr1 is formed at a right hand side of a rear tray, and the detection area for the thermoelectric couple Dr2 is formed at a space covering a shoulder of the passenger seated in the rear right seat. The detection area for the thermoelectric couple Dr3 is formed at such a space covering a breast and an abdomen of the passenger in the rear right seat, and the detection area for the thermoelectric couple Dr4 is formed at such a space covering a thigh of the passenger in the rear right seat.

The rear tray is arranged at a position beneath a rear windshield, and it is influenced by the incident insolation at the right rear tray area coming through the rear windshield, or cold radiation. Accordingly, the thermoelectric couple Dr1 detects temperature information including the incident insolation and the cold radiation at the rear right tray. The surface temperatures at the shoulder, the breast and abdomen, and the thigh respectively represent surface temperatures of the passenger's clothing, which are influenced by the air temperature in the air conditioning space 1c. Therefore, those temperatures can be regarded as the temperature of the inside air in the air conditioning space 1c.

A temperature detection area by the matrix IR sensor 70b in the rear left air conditioning space 1d is symmetrical to the temperature detection area by the matrix IR sensor 70a, with respect to a longitudinal center line of the vehicle. Therefore, the area 700b is not shown in FIG. 4.

As in the same manner to the IR sensor 70a for the right side, the thermoelectric couple Dr1 of the IR sensor 70b for the left side detects temperature information including the incident insolation and the cold radiation at the rear left tray. The thermoelectric couples Dr2 to Dr4 respectively detect the surface temperatures at the shoulder, the breast and abdomen, and the thigh of the passenger in the rear left seat. Those temperatures can be regarded as the temperature of the inside air in the air conditioning space 1d.

The electronic control unit (ECU) 8 is a well known control unit having analog-digital converters, micro computer and so on. The respective output signals from the matrix IR sensors 70a and 70b, the solar insolation sensor 83, the temperature sensors 81, 82, 84, 86 and 87, and the temperature setting switches 9 to 12 are converted from the analog to digital signals and inputted into the micro computer.

The micro computer comprises memories, such as ROM and RAM, and CPU, wherein electric power is supplied to the ECU 8 when an ignition switch (not shown) is turned on.

An operation of the above described first embodiment will be explained with reference to FIGS. 5 to 11.

Figure 5:
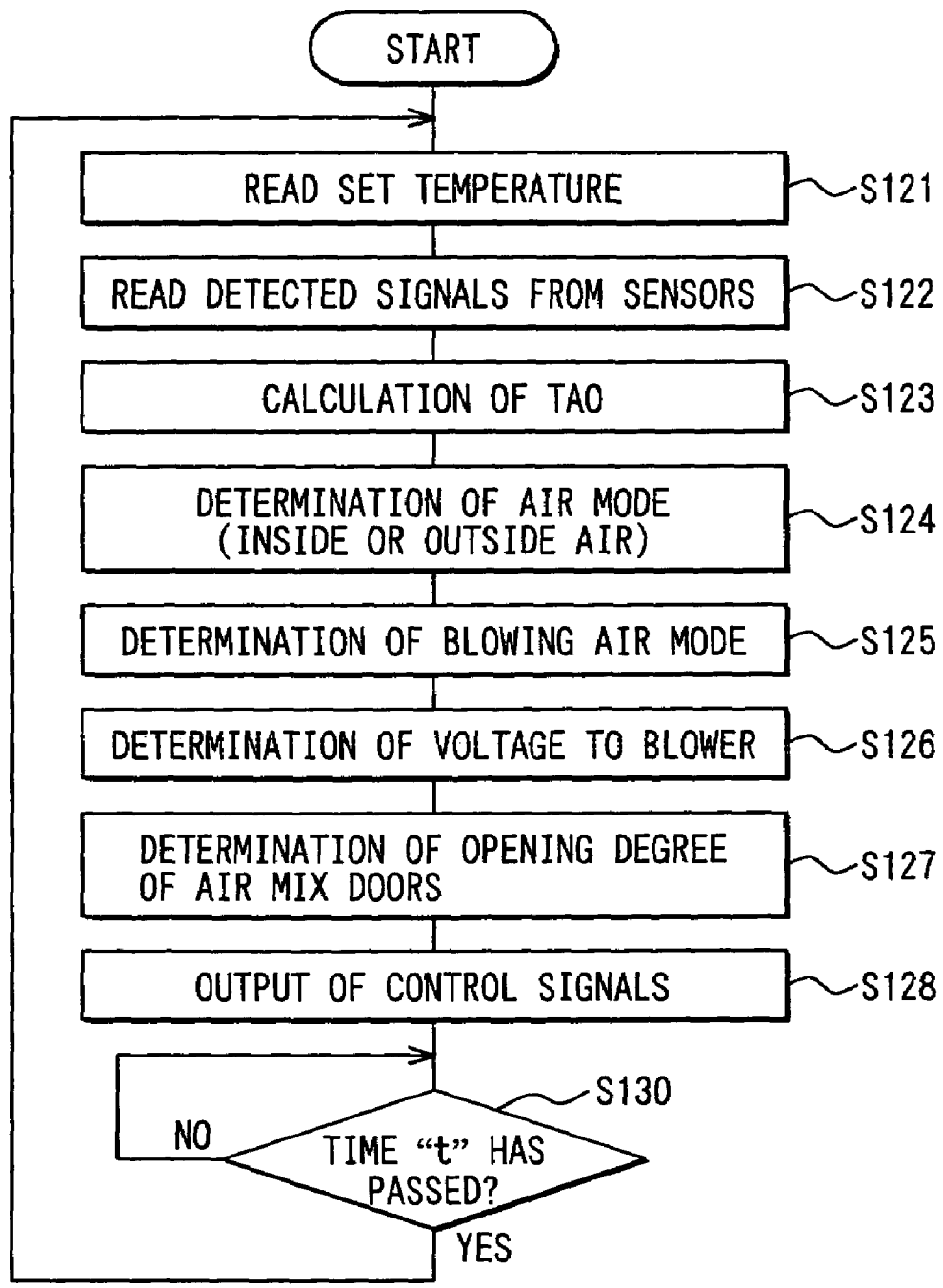
FIG. 5 is a flow chart showing a process for air conditioning operation controlled by an electronic control unit.

The ECU 8 starts a control program memorized in the memory and performs an air conditioning control in accordance with a flow chart shown in FIG. 5, when the electric power is supplied to the ECU 8. The air conditioning control operations for the front and rear spaces are alternately performed, namely at a predetermined time interval "Ts", for example 250 msec. The operations for the front and rear spaces are respectively explained below.

(Operation for the Front Space)

At a step S121, the set temperature signals "FrTsetDr" and "FrTsetPa" from the temperature setting switches 9 and 10 are read. At a step S122, the outside temperature signal "Tam" and the solar insolation signals "TsDr" and "TsPa" are read from the respective sensors 81, 83 and 84, and the inside temperature signal "TrFr" is read from the inside temperature sensor 84.

At a step S123, a target blowing air temperature "FrTAODr" for the driver seat is calculated by a formula (1), wherein the set temperature signal "FrTsetDr", the outside (ambient) temperature signal "Tam", the insolation signal "TsDr", and the inside air temperature signal "TrFr" are substituted in the formula (1). The target blowing air temperature "FrTAODr" is a target temperature which is necessary to keep the temperature of the air conditioning space 1a at the set temperature "FrTsetDr", irrespectively of the changes of vehicle environmental condition (e.g. thermal load for the air conditioning operation).

$$FrTAODr = KsetFrDr \cdot FrTsetDr - KrFr \cdot TrFr - Kam \cdot Tam - KsDr \cdot TsDr + CFrDr \quad (1)$$

In the above formula (1), "KsetFrDr" is a temperature set gain for the front right space, "KrFr" is an inside temperature gain for the front space, "Kam" is an outside temperature gain, "KsDr" is an insolation gain, and "CFrDr" is a constant for correction for the front right seat.

Then (at the step S123), a target blowing air temperature "FrTAOPa" for the assistant driver seat is calculated by a formula (2), wherein the outside (ambient) temperature signal "Tam", the set temperature signal "FrTsetPa", the insolation signal "TsPa", and the inside air temperature signal "TrFr" are substituted in the formula (2). The target blowing air temperature "FrTAOPa" is a target temperature which is necessary to keep the temperature of the air conditioning space 1b at the set temperature "FrTsetPa".

$$FrTAOPa = KsetFrPa \cdot FrTsetPa - KrFr \cdot TrFr - Kam \cdot Tam - KsPa \cdot TsPa + CFrPa \quad (2)$$

In the above formula (2), "KsetFrPa" is a temperature set gain for the front left space, "KrFr" is the inside temperature gain for the front space, "Kam" is the outside temperature gain, "KsPa" is an insolation gain, and "CFrPa" is a constant for correction for the front left seat.

At a step S124, either one of air modes, namely an inside air recirculation mode or an outside air mode, is decided by a control map shown in FIG. 6 depending on an average value of "FrTAOPa" and "FrTAODr" (hereinafter also referred to as "a target average value for the front seats"). In the inside air recirculation mode, the inside air is sucked into the front unit 5 through the inside air recirculation port 50a, whereas the outside air is sucked into the front unit 5 through the outside air port 50b in the outside air mode.

Figure 6:
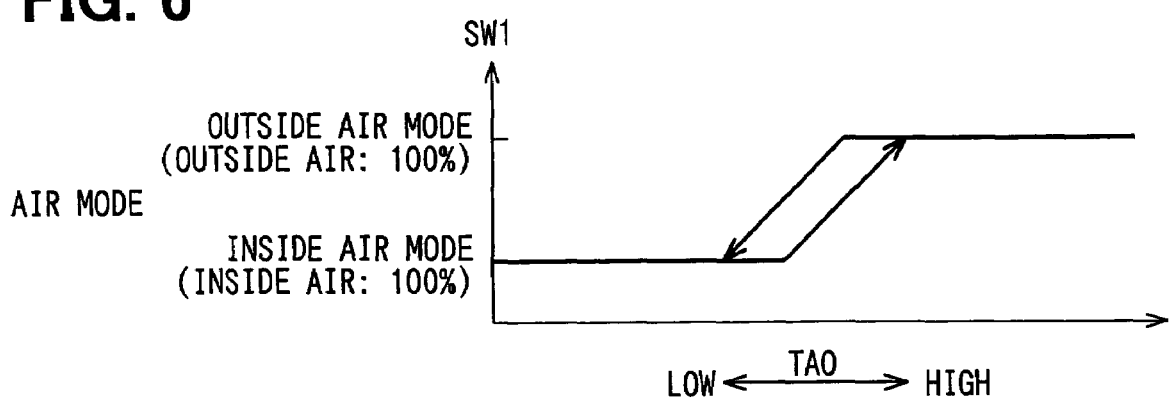
FIG. 6 is a control map for controlling inside-outside air mode.

More specifically, as shown in FIG. 6, in the case that the average value of "FrTAOPa" and "FrTAODr" (which corresponds to TAO in FIG. 6) is lower than a predetermined value (in a range of maximum cooling), the inside air recirculation mode is selected so that the inside air port 50a is fully opened and the outside air port 50b is fully closed. On the other hand, in the case that the average value of "FrTAOPa" and "FrTAODr" becomes higher than another predetermined value, the outside air mode is selected so that the inside air port 50a is fully closed and the outside air port 50b is fully opened.

Figure 7:
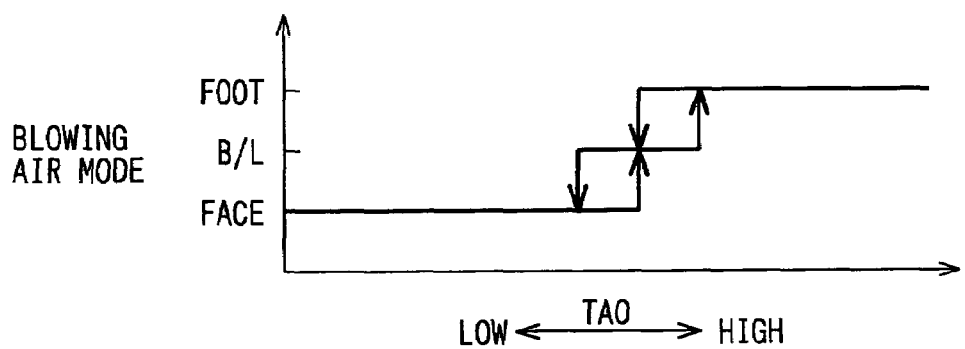
FIG. 7 is a control map for controlling blowing air mode.

At a step S125 (FIG. 5), a blowing air mode is selected from a control map shown in FIG. 7 for the respective air conditioning spaces 1a and 1b. The control map shown in FIG. 7 is a control map memorized in ROM in advance for deciding the above blowing air mode, according to which the blowing air mode for the air conditioning space 1a is automatically changed from "a face mode (FACE)" to "a bi-level mode (B/L)" and "a foot mode (FOOT)", as "FrTAODr" is increased ("FrTAODr" corresponds to TAO in FIG. 7). As in the same manner, the blowing air mode for the air conditioning space 1b is automatically changed from "a face mode (FACE)" to "a bi-level mode (B/L)" and "a foot mode (FOOT)", as "FrTAOPa" is increased.

The face mode is a blowing air mode in which the conditioned air is blown out from the face air outlets (2a, 2b), and the foot mode is a blowing air mode in which the conditioned air is blown out from the foot air outlets. And the bi-level mode is a blowing air mode in which the conditioned air is blown out from both of the face and foot air outlets.

For example, in the face mode, the face air outlet 2a (2b) is opened by the switching door 56a (56b) so that the conditioned air is blown toward the upper body of the passenger (driver). In the bi-level mode, the face air outlet 2a (2b) and the foot air outlet (not shown) are opened by the respective doors 56a (56b), so that the conditioned air is simultaneously blown toward the upper and lower body of the passenger. And in the foot mode, the foot air outlet (not shown) alone is opened by the switching door (not shown) so that the conditioned air is blown toward the lower body of the passenger.

As above, when the blowing air mode is decided at the step S125 for the respective air conditioning spaces 1a and 1b, the servo motors are operated to drive the corresponding doors to open (or close) the corresponding air outlets.

Figure 8:
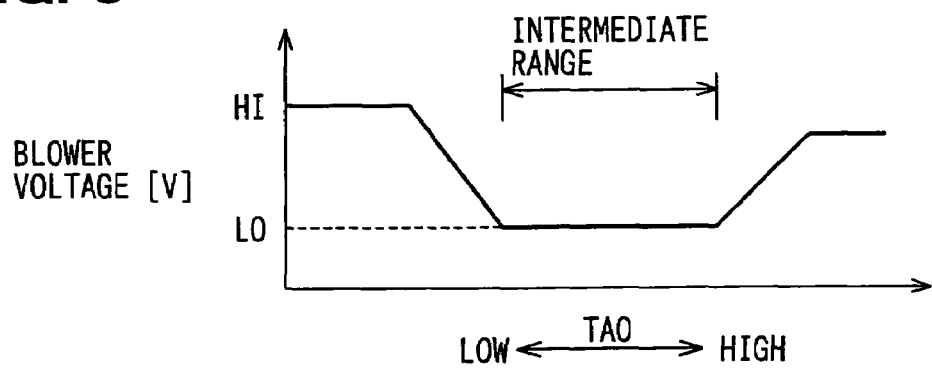
FIG. 8 is a control map for controlling a blower voltage.

At a step S126 (FIG. 5), a blower voltage to be applied to the blower motor 52a is selected from a control map shown in FIG. 8, depending on the average value of "FrTAOPa" and "FrTAODr". The blower voltage controls an amount of air flow by the blower device 52. The control map shown in FIG. 8 is a control map memorized in ROM in advance for deciding the above blower voltage.

In the control map shown in FIG. 8, "TAO" corresponds to the average value of "FrTAOPa" and "FrTAODr". In the case that "TAO" is in an intermediate range, the blower voltage (i.e. the amount of the air flow by the blower device 52) is constant. When "TAO" becomes higher than the intermediate range, the blower voltage becomes higher depending on "TAO", whereas the blower voltage becomes lower depending on "TAO" when "TAO" becomes lower than the intermediate range. As above, the blower voltage is decided at the step S126.

At a step S127 (FIG. 5), target opening degrees $\theta 1$ and $\theta 2$ for the air mixing doors 55a and 55b are calculated by the following formulas (3) and (4).

$$\theta 1 = \{(FrTAODr - TeFr)/(Tw - TeFr)\} \times 100 (\%) \quad (3)$$

$$\theta 2 = \{(FrTAOPa - TeFr)/(Tw - TeFr)\} \times 100 (\%) \quad (4)$$

In the above formulas, "TeFr" is the evaporator temperature signal from the evaporator temperature sensor 86, and "Tw" is the cooling water temperature signal from the cooling water temperature sensor 82. In the case that $\theta 1 = 0\%$ and $\theta 2 = 0\%$, which mean the maximum cooling condition, the whole conditioned air (cool air) having passed through the evaporator 53 of the front unit 5 flow through the bypass air passages 51a and 51b of the driver side and assistant driver side air passages 50c and 50d. On the other hand, in the case that $\theta 1 = 100\%$ and $\theta 2 = 100\%$, which mean the maximum heating condition, the whole conditioned air (cool air) having passed through the evaporator 53 of the front unit 5 flow through the heater core 54 in the driver side and assistant driver side air passages 50c and 50d, so that the air is heated.

Then at a step S128 (FIG. 5), control signals (which correspond to the above decided blower voltage, the target opening degrees $\theta 1$ and $\theta 2$, the air mode, and the blowing air mode) are outputted to the servo motors 510a, 550a, 550b, 560a, 560b and the blower motor 52a, to respectively control the operations of switching doors 51, the air mix doors 55a, 55b, the air outlet switching doors 56a, 56b and the blower device 52.

The process goes to a step S130. At the step S130, when a predetermined time period is passed, the process goes back to the step S121 and the above described steps S121 to S130 are repeated. As above, the air conditioning operation for the front space is performed.

(Operation for the Rear Space)

The air conditioning operation for the rear space is performed at a predetermined interval, e.g. 250 msec. The operation is explained also with reference to the flow chart shown in FIG. 5.

At a step S121, the set temperature signals "RrTsetDr" and "RrTsetPa" from the temperature setting switches 11 and 12 are read. At a step S122, the outside temperature signal "Tam" and the solar insolation signals "TsDr" and "TsPa" are read from the respective sensors 81 and 83. The detected temperature signals "Tir1" to "Tir4" are read from the thermoelectric couples Dr1 to Dr4 of the matrix IR sensor 70a, and the detected temperature signals "Tir1" to "Tir4" are likewise read from the thermoelectric couples Dr1 to Dr4 of the matrix IR sensor 70b.

At the step S122, an average value for the detected temperature "Tir2" from the thermoelectric couple Dr2 of the matrix IR sensor 70a is calculated by multiple detections. Namely, the average value of "RrDrShoulder" is calculated from the detected temperature signal "Tir2(n)" of this time and other 15 previously detected temperature signals "Tir2(n−1)", "Tir2(n−2)", "Tir2(n−3)" . . . "Tir2(n−15)", wherein "Tir2(n)" is the detected temperature signal, and "n" is a number of sampling.

$$RrDrShoulder = \{Tir2(n) + Tir2(n-1) + Tir2(n-2) \ldots Tir2(n-15)\}/16$$

An average value "RrDrBody" for the detected temperature "Tir3" from the thermoelectric couple Dr3 of the matrix IR sensor 70a is calculated by multiple detections, as in the same manner of the "RrDrShoulder":

$$RrDrBody = \{Tir3(n) + Tir3(n-1) + Tir3(n--2) \ldots Tir3(n--15)\}/16$$

An average value "RrDrLeg" for the detected temperature "Tir4" from the thermoelectric couple Dr4 of the matrix IR sensor 70a is calculated by multiple detections, as in the same manner of the "RrDrShoulder":

$$RrDrLeg = \{Tir4(n) + Tir4(n-1) + Tir4(n-2) \ldots Tir4(n-15)\}/16$$

The thermoelectric couples Dr2, Dr3 and Dr4 function to respectively detect surface temperatures of parts of the passenger's clothing (the shoulder, the breast and abdomen, and thigh).

After the average values of "RrDrShoulder", "RrDrBody" and "RrDrLeg" are calculated at the step S122, the process goes to a step S123, at which a target blowing air temperature "RrTAODr" for the rear right air conditioning space 1c is calculated based on the above three average values "RrDr- Shoulder", "RrDrBody" and "RrDrLeg", the set temperature signal "RrTsetDr", the outside (ambient) temperature signal "Tam", and the insolation signal "TsDr".

The target blowing air temperature "RrTAODr" is a target temperature which is necessary to keep the temperature of the air conditioning space 1c at the set temperature "RrTsetDr", irrespectively of the changes of vehicle environmental condition (e.g. thermal load for the air conditioning operation). A process for deciding the target blowing air temperature "RrTAODr" is explained with reference to a flow chart of FIG. 9.

Figure 9:
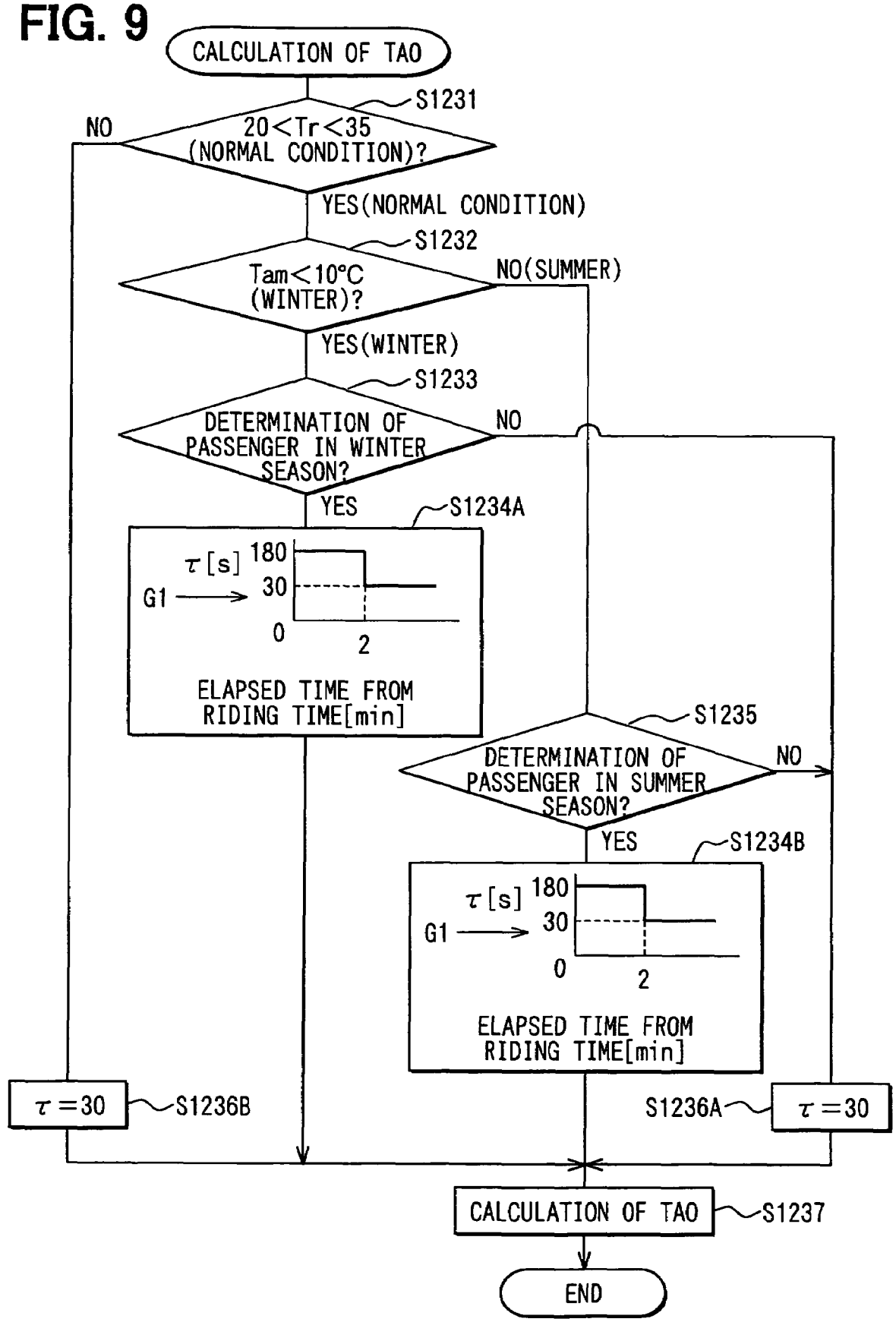
FIG. 9 is a flow chart for calculating a target blowing air temperature in a step of the flow chart shown in FIG. 5.

At a step S1231 of FIG. 9, the ECU determines whether the inside air temperature "Tr" ("Tr" corresponds to "TrRr") of the air conditioning space 1c is between 20° C. and 35° C. based on the inside air temperature signal "TrRr" from the inside air temperature sensor 85.

In the case that the inside air temperature "Tr" of the air conditioning space 1c is between 20° C. and 35° C., the ECU determines that the operational condition for the rear right space 1c by the rear unit 6 is at a normal condition (YES), and the process goes to a step S1232.

At the step S1232, the ECU determines whether it is the winter season or not, based on the outside air temperature "Tam" from the outside air temperature sensor 81. For example, when the outside air temperature is lower than 10° C. the ECU determines that it is the winter season (YES).

At a step S1233 (FIG. 9), the ECU determines whether the passenger gets into the rear right space 1c, based on the above calculated three average values "RrDrShoulder", "RrDrBody" and "RrDrLeg".

The above three average values are calculated for each time when the operational process for the rear space is carried out. Accordingly, those three average values of this time are designated by "RrDrShoulderNEW", "RrDrBodyNEW" and "RrDrLegNEW", whereas the average values of the previous time are designated by "RrDrShoulderOLD", "RrDrBodyOLD" and "RrDrLegOLD", to distinguish them from each other.

It is then determined whether more than two formulas are satisfied among the following formulas (5) to (7). Namely, it is determined whether more than two average temperatures, among the average temperatures for the shoulder, the breast and abdomen, and the thigh, are decreased by more than 3° C.

$$RrDr\text{ShoulderNEW}-RrDr\text{ShoulderOLD} \leq -3 \tag{5}$$

$$RrDr\text{BodyNEW}-RrDr\text{BodyOLD} \leq -3 \tag{6}$$

$$RrDr\text{LegNEW}-RrDr\text{LegOLD} \leq -3 \tag{7}$$

In the case that more than two formulas among the above formulas (5) to (7) are satisfied, the ECU determines that the passenger has got into the rear right space 1c (YES at the step S1233). A timing, at which the ECU determined as YES at the step S1233, is referred to as "a riding time".

At a step S1234A of FIG. 9, a time constant "τ" is determined based on a graph G1 (shown in a block of S1234A) and an elapsed time "t" from the riding time. The time constant "τ" is used for calculating the target blowing air temperature "RrTAODr", as explained later. For example, if the elapsed time "t" is less than 2 min, the time constant "τ" is decided as 180 sec, whereas if the elapsed time "t" is more than 2 min, the time constant "τ" is decided as 30 sec.

At the step S1233, in the case that the number of formulas among the above formulas (5) to (7), which are satisfied, is less than two, the ECU determines that no passenger is in the rear right space 1c (NO at the step S1233), and the time constant "τ" is decided as 30 sec at a step S1236A.

In the case that the inside air temperature for the rear right space 1c is lower than 20° C. or higher than 35° C., namely NO at the step S1231, the ECU determines that the air conditioning operation is in a transient state, and the time constant "τ" is decided as 30 sec at a step S1236B.

In the case that the outside air temperature is higher than 10° C., namely NO at the step S1232, the ECU determines that it is the summer season. It is then determined at a step S1235 whether more than two formulas among the following formulas (8) to (10) are satisfied. Namely, it is determined whether more than two average temperatures, among the average temperatures for the shoulder, the breast and abdomen, and the thigh, are increased by more than 2.5° C.

$$RrDr\text{ShoulderNEW}-RrDr\text{ShoulderOLD} \geq 2.5 \tag{8}$$

$$RrDr\text{BodyNEW}-RrDr\text{BodyOLD} \geq 2.5 \tag{9}$$

$$RrDr\text{LegNEW}-RrDr\text{LegOLD} \geq 2.5 \tag{10}$$

In the case that more than two formulas among the above formulas (8) to (10) are satisfied, the ECU determines that the passenger has got into the rear right space 1c (YES at the step S1235). A timing, at which the ECU determined as YES at the step S1235, is referred to as "a riding time".

The process further goes on to a step S1234B of FIG. 9, at which a time constant "τ" is determined based on a graph G1 (shown in a block of S1234B) and an elapsed time "t" from the riding time, as in the same manner to the step S1234A. For example, if the elapsed time "t" is less than 2 min, the time constant "τ" is decided as 180 sec, whereas if the elapsed time "t" is more than 2 min, the time constant "τ" is decided as 30 sec.

At the step S1235, in the case that the number of formulas among the above formulas (8) to (10), which are satisfied, is less than two, the ECU determines that no passenger is in the rear right space 1c (NO at the step S1237), and the time constant "r" is decided as 30 sec at the step S1236.

After the time constant "τ" is decided in one of the above steps (S1234A, S1234B, S1236A, or S1236B), the process goes to a step S1237, at which a correction temperature "RrTirDr (average)" for the clothing is calculated from the time constant "τ", and the target blowing air temperature "RrTAODr" is calculated by substituting the above correction temperature "RrTirDr (average)" for the clothing, the set temperature signal "RrTsetDr", the outside (ambient) temperature signal "Tam", and the insolation signal "TsDr", into a formula (11).

$$RrTAODr = 7 \times RrTsetDr - 3 \times RrTirDr(\text{average}) - 1.1 \times Tam - 1.5 \times TsDr - 65 \tag{11}$$

In the above formula (11), "7" is a temperature set gain for the rear right space, "3" is an IR gain for the rear right space, "1.1" is an outside temperature gain, "1.5" is an insolation gain for a right side, and "65" is a constant for correction for the rear right space.

A calculation for the above correction temperature "RrTirDr (average)" for the clothing will be explained.

At first, an average value (hereinafter referred to as "an average clothing temperature "RrDrTirNEW" of this time") is calculated from "RrDrShoulderNEW", "RrDrBodyNEW" and "RrDrLegNEW"; namely $$RrDr\text{Tir}\text{NEW} = (RrDr\text{ShoulderNEW} + RrDr\text{BodyNEW} + RrDr\text{LegNEW})/3$$

Then, an average value (hereinafter referred to as "an average clothing temperature "RrDrTirOLD" of the previous time") is calculated from "RrDrShoulderOLD", "RrDrBodyOLD" and "RrDrLegOLD"; namely $$RrDrTirOLD=(RrDrShoulderOLD+RrDrBodyOLD+RrDrLegOLD)/3$$

An average value of "RrDrShoulder", "RrDrBody" and "RrDrLeg" is referred to as simply "a clothing temperature ("RrDrTir"), which is calculated by:

$$RrDrTir=(RrDrShoulder+RrDrBody+RrDrLeg)/3$$

The clothing temperature "RrDrTir" is corrected, so that a variation (RrDrTirOLD−RrDrTirNEW) of the clothing temperature "RrDrTir" is changed with a time delay and the variation is updated, for example, for every 4 sec (an updating time period). The above time delay is determined by the time constant "τ".

More specifically, the variation of "RrDrTir", which is a deviation "E" (=RrDrTirNEW−RrDrTirOLD), as well as the time constant "τ" is substituted into a saturation curve KO(t) of a formula (12):

$$KO(t)=E(1-\exp(-t/\tau)) \qquad (12)$$

Figure 10:
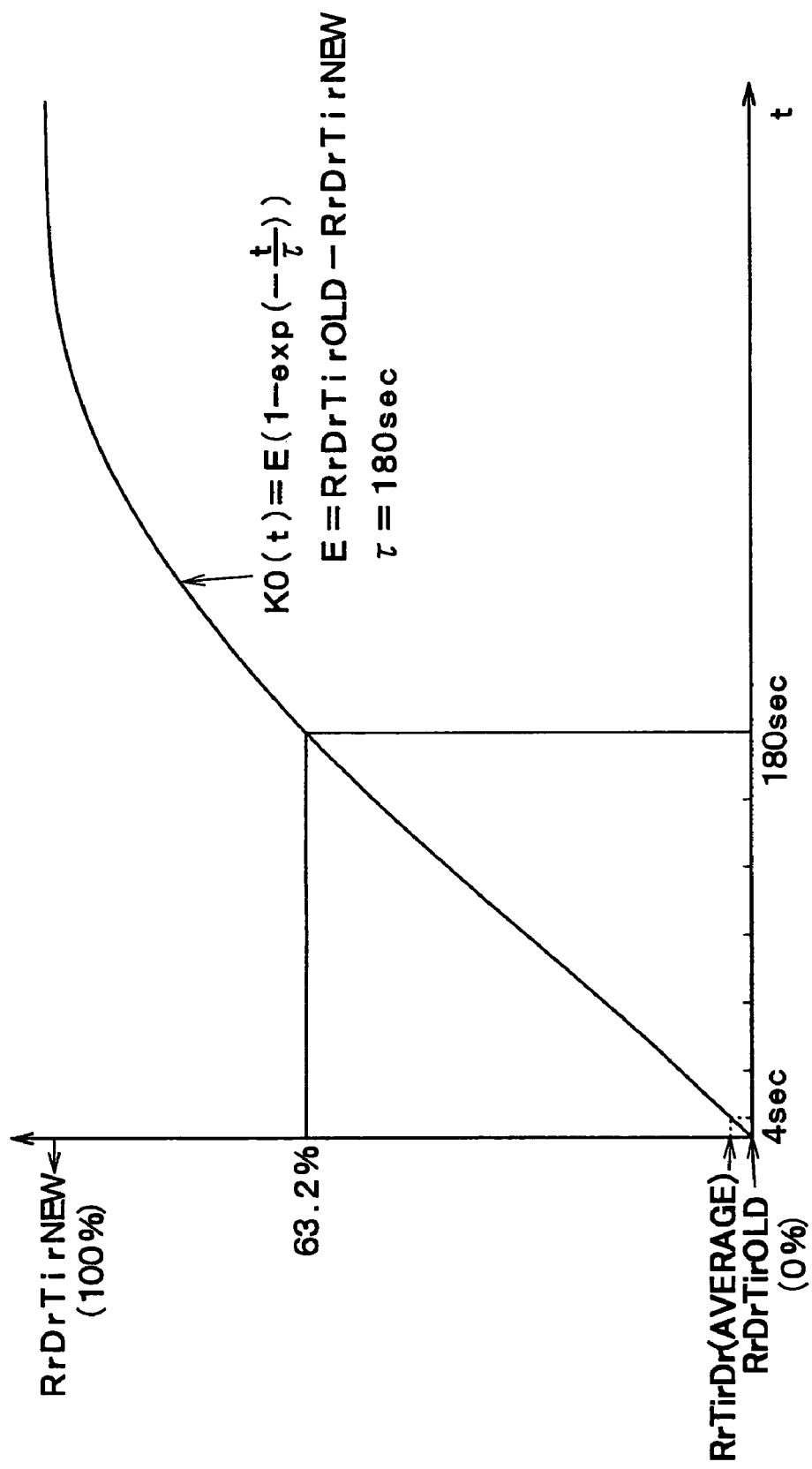
FIGS. 10 and 11 are charts for explaining a process for calculating the target blowing air temperature in the flow chart shown in FIG. 5.

In the case that "τ" is 180 sec, the saturation curve KO(t) shown in FIG. 10 is obtained, wherein "τ=180 sec" is substituted in the above formula (12). Further, the updating time period of 4 sec is substituted to "t" in the above formula (12), and its value of a function KO(4) is determined as the above correction temperature "RrTirDr (average)" for the clothing. The KO(t) is a function, wherein the value of KO(t) is obtained as "E×0.632" when 180 sec is substituted into "t" (which is equal to "τ".

Figure 11:
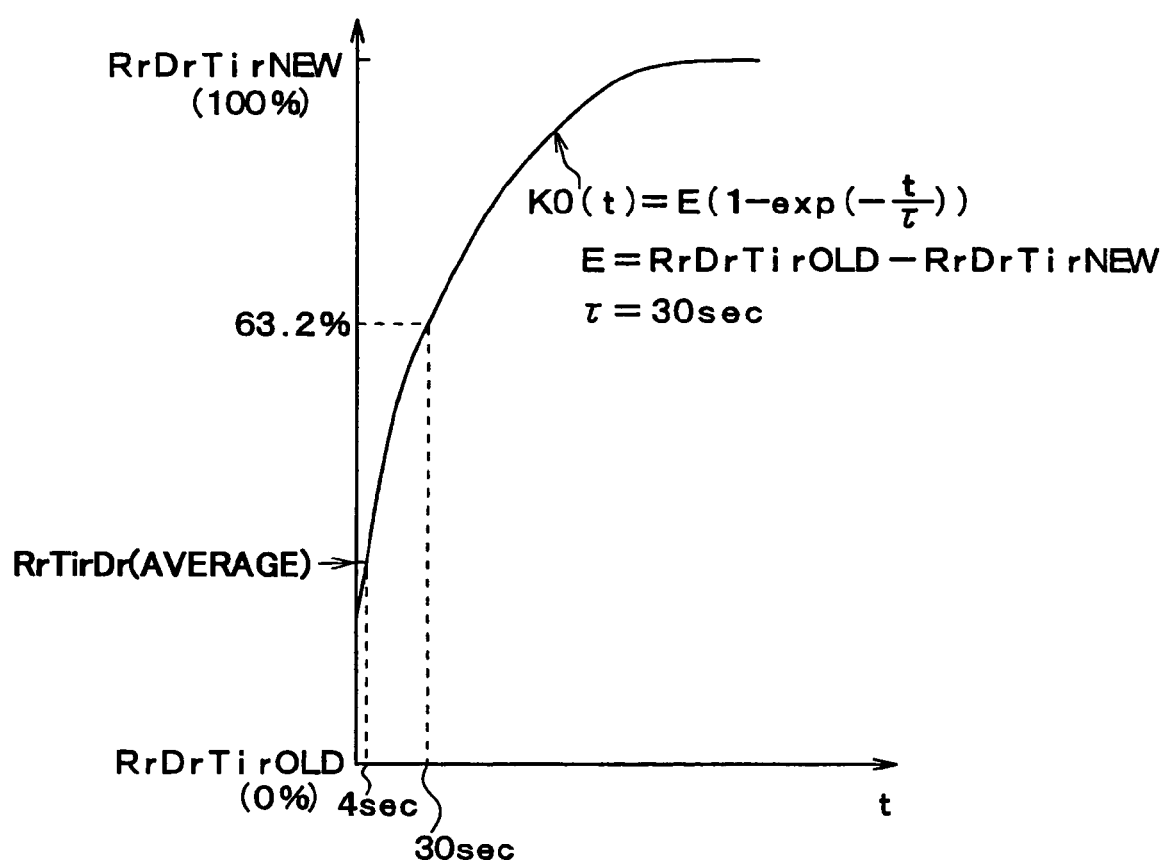

In the case that "τ" is 30 sec, the saturation curve KO(t) shown in FIG. 11 is obtained, wherein "τ=180 sec" is substituted in the above formula (12). Further, the updating time period of 4 sec is substituted to "t" in the above formula (12), and its value of a function KO(4) is determined as the above correction temperature "RrTirDr (average)" for the clothing. The KO(t) is a function, wherein the value of KO(t) is obtained as "E×0.632" when 30 sec is substituted into "t" (which is equal to "τ").

Now, a calculation of a target blowing air temperature "RrTAOPa" for the rear left air conditioning space 1d is explained. Since the calculation of "RrTAOPa" is different from that of "RrTAODr" only in that the air conditioning space is different, the calculation of "RrTAOPa" is substantially the same to that for "RrTAODr".

The target blowing air temperature "RrTAOPa" is a target temperature which is necessary to keep the temperature of the air conditioning space 1d at the set temperature "RrTsetPa", irrespectively of the changes of vehicle environmental condition (e.g. thermal load for the air conditioning operation). A process for deciding the target blowing air temperature "RrTAOPa" is explained with reference to the flow charts of FIGS. 5 and 9.

Average values "RrPaShoulder", "RrPaBody" and "RrPaLeg" of surface temperatures at the shoulder, the breast and abdomen, and the thigh of the passenger in the rear left space 1d, are calculated at the step S122, based on the detected temperature signals Tir2 to Tir4 from the matrix IR sensor 70b, as in the same manner to the case for the rear right space 1c.

Those three average values "RrPaShoulder", "RrPaBody" and "RrPaLeg" of this time are designated by "RrPaShoulderNEW", "RrPaBodyNEW" and "RrPaLegNEW", whereas the average values of the previous time are designated by "RrPaShoulderOLD", "RrPaBodyOLD" and "RrPaLegOLD", to distinguish them from each other. An average value of "RrPaShoulder", "RrPaBody" and "RrPaLeg" is referred to as simply "a clothing temperature ("RrPaTir").

At the step S1231 of FIG. 9, the ECU determines whether the operational condition for the rear left space 1d by the rear unit 6 is in a normal condition, based on the inside air temperature signal "TrRr" from the inside air temperature sensor 85.

In the case that the operational condition for the rear left space 1d is in the normal condition, the process goes to the step S1232 at which the ECU determines whether it is the winter season or not based on the outside temperature signal "Tam" from the outside temperature sensor 81.

When the ECU determines that it is the winter season (YES at the step S1232), the process goes to the step S1233 at which the ECU determines whether the passenger gets into the rear left space 1d, based on the above calculated average values "RrPaShoulder", "RrPaBody" and "RrPaLeg".

When the ECU determines that the passenger has got into the rear left space 1d at the step S1233, the process further goes on to the step S1234A of FIG. 9, at which the time constant "τ" is decided based on the graph G1 (shown in the block of S1234A) and the elapsed time "t" from the riding time, as in the same manner to the process for the rear right space 1c. Namely, either 180 sec or 30 sec is decided as the time constant "τ".

In the case that the ECU determines that it is the summer time (NO at the step S1232) based on the outside temperature signal "Tam" from the outside temperature sensor 81, the ECU determines at the step S1235 whether the passenger gets into the rear left space 1d, based on the above average values "RrPaShoulder", "RrPaBody" and "RrPaLeg".

When the ECU determines at the step S1235 that the passenger has got into the rear left space 1d, either 180 sec or 30 sec is decided as the time constant "τ", at the step S1234B, based on the graph G1 (shown in the block of S1234B of FIG. 9) and the elapsed time "t" from the riding time, as in the same manner to the step S1234.

In the case that the ECU determines at the step S1234B that no passenger is in the rear left space 1d (NO at the step S1234B), the time constant "τ" is decided as 30 sec at the step S1236A. Furthermore, in the case that the inside air temperature for the rear left space 1d is lower than 20° C. or higher than 35° C., the ECU determines that the air conditioning operation is in the transient state (NO at the step S1231), and the time constant "τ" is decided as 30 sec at the step S1236B.

After the time constant "τ" is determined in one of the above steps (S1234A, S1234B, S1236A, or S1236B), the process goes to the step S1237, at which the correction temperature "RrTirPa (average)" for the clothing is calculated from the time constant "τ", and the target blowing air temperature "RrTAOPa" is calculated by substituting the above correction temperature "RrTirPa (average)" for the clothing, the set temperature signal "RrTsetPa", the outside (ambient) temperature signal "Tam", and the insolation signal "TsPa", into a formula (13).

$$RrTAOPa=7\times RrTsetPa-3\times RrTirPa(\text{average})-1.1\times Tam-1.5\times TsPa-65 \qquad (13)$$

In the above formula (13), "7" is a temperature set gain for the rear left space, "3" is an IR gain for the rear left space, "1.1" is an outside temperature gain, "1.5" is an insolation gain for a left side, and "65" is a constant for correction for the rear left space.

A calculation for the above correction temperature "RrTirPa (average)" for the clothing will be explained.

At first, an average value "RrPaTirNEW" is calculated from "RrPaShoulderNEW", RrPaBodyNEW" and "RrPa-LegNEW"; namely $$RrPaTirNEW=(RrPaShoulderNEW+RrPaBodyNEW+RrPaLegNEW)/3 \quad (5)$$

Then, an average value "RrPaTirOLD" is calculated from "RrPaShoulderOLD", "RrPaBodyOLD" and "RrPaLegOLD"; namely $$RrPaTirOLD=(RrPaShoulderOLD+RrPaBodyOLD+RrPaLegOLD)/3$$

The clothing temperature "RrPaTir" is corrected, so that a variation (RrPaTirOLD−RrPaTirNEW) of the clothing temperature "RrPaTV" is changed with a time delay and the variation is updated, for example, for every 4 sec (an updating time period). The above time delay is determined by the time constant "τ".

In the case that "τ" is 180 sec, the above correction temperature "RrTirPa (average)" for the clothing is calculated by the formula (12). Namely, the value of KO(4), which is obtained by substituting "τ" (180 sec) and the updating time period (4 sec) into the saturation curve KO(t) of the formula (12), is determined as the correction temperature "RrTirPa (average)".

As above, the target blowing air temperatures "RrTAODr" and "RrTAOPa" for the rear right and rear left spaces 1c and 1d are respectively determined at the step S123 (FIG. 5) and the steps S1231 to S1237 (FIG. 9). Then, the process goes from the step S123 to the step S125, wherein the step S124 is not performed since the outside air mode is generally not available for the air conditioning operation for the rear space.

At the step S125 (FIG. 5), the blowing air modes for the respective rear right and rear left spaces 1c and 1d are determined based on "RrTAODr" and "RrTAOPa" in accordance with the control map shown in FIG. 7.

More specifically, "RrTAODr" is used as "TAO" in FIG. 7 for the rear right space 1c, and the blowing air mode for the air conditioning space 1c is automatically changed from "a face mode (FACE)" to "a bi-level mode(B/L)" and "a foot mode (FOOT)", as "RrTAODr" is increased. As in the same manner, the blowing air mode for the air conditioning (rear left) space 1d is automatically changed from "a face mode (FACE)" to "a bi-level mode (B/L)" and "a foot mode (FOOT)", as "RrTAOPa" is increased.

The face mode is a blowing air mode in which the conditioned air is blown out toward the upper body of the passenger from the face air outlets (2c, 2d) which are opened by the switching doors (66a, 66b), and the foot mode is a blowing air mode in which the conditioned air is blown out toward the lower body of the passenger from the foot air outlets (not shown). And the bi-level mode is a blowing air mode in which the conditioned air is blown out toward the upper and lower body of the passenger from both of the face and foot air outlets.

Then, at the step S126 (FIG. 5), a blower voltage to be applied to the blower motor 62a is selected from the control map shown in FIG. 8, depending on the average values of "RrTAODr" and "RrTAOPa", as in the same manner for the blower motor 52a. The average values of "RrTAODr" and "RrTAOPa" are collectively referred to as an average target value for the rear space.

At the step S127 (FIG. 5), target opening degrees θ3 and θ4 for the air mixing doors 65a and 65b are calculated by the following formulas (14) and (15). In the following formulas, "TeRr" is the evaporator temperature signal from the evaporator temperature sensor 87, and "Tw" is the cooling water temperature signal from the cooling water temperature sensor 82.

$$\theta 3=\{(RrTAODr-TeRr)/(Tw-TeRr)\} \times 100(\%) \quad (14)$$

$$\theta 4=\{(RrTAOPa-TeRr)/(Tw-TeRr)\} \times 100(\%) \quad (15)$$

In the case that θ3=0% and θ4=0%, which mean the maximum cooling condition, the whole conditioned air (cool air) having passed through the evaporator 63 of the rear unit 6 flow through the bypass air passages 61a and 61b of the right side and left side air passages 60c and 60d. On the other hand, in the case that θ3=100% and θ4=100%, which mean the maximum heating condition, the whole conditioned air (cool air) having passed through the evaporator 63 of the rear unit 6 flow through the heater core 64 in the right side and left side air passages 60c and 60d, so that the air is heated.

Then at the step S128 (FIG. 5), control signals (which correspond to the above decided blower voltage, the target opening degrees θ3 and θ4, and the blowing air mode) are outputted to the servo motors 650a, 650b, 660a, 660b and the blower motor 62a, to respectively control the operations of the air mix doors 65a, 65b, the air outlet switching doors 66a, 66b and the blower device 62.

The process goes to the step S130 (FIG. 5). At this step, when a predetermined time period is passed, the process goes back to the step S121 and the above described steps S121 to S130 are repeated. As above, the air conditioning operation for the rear space 1c and 1d is performed.

Effects of the above first embodiment will be explained. According to the embodiment, the air conditioning system for the motor vehicle comprises a rear air conditioning unit 6 for independently performing the air conditioning operations for the rear right and rear left spaces 1c and 1d, the IR sensor 70a (70b) for detecting the surface temperature of the passenger's clothing (at the shoulder, the breast and abdomen, and the thigh), and the electronic control unit (ECU) 8 for independently controlling the air conditioning operations for the rear right and rear left spaces 1c and 1d.

When the ECU 8 determines that the passenger has got into the space 1c (1d), the variation of the clothing temperature "RrDrTW" ("RrPaTW") detected by the IR sensor 70a (70b) is reflected, with the certain time delay, into the control for the air conditioning operation by the rear unit 6.

More specifically, the ECU 8 corrects the clothing temperature "RrDrTir"("RrPaTir", so that the variation "RrDrTirOLD"−"RrDrTirNEW" ("RrPaTirOLD"−"RrPaTirNEW") of the clothing temperature "RrDrTir" ("RrPaTir") is changed with the time delay, and the ECU 8 calculates the target blowing air temperature "RrTAODr" ("RrTAOPa") based on the correction temperature "RrTirDr (Average)" ("RrTirPa (Average)"). The ECU 8 further controls the rear unit 6 to make the actual air temperature to be blown into the rear right space 1c (the rear left space 1d) closer to the target blowing air temperature "RrTAODr" ("RrTAOPa").

Accordingly, in the case that the passenger gets into the vehicle with his clothing having the low surface temperature in the winter season, the ECU 8 gives the certain time delay (which is determined by the detected values from the IR sensor 70a (70b) and the time constant "τ" (e.g. 180 sec)) in the control of the air conditioning operation for the rear space 1c (1d), even though the surface temperature of the passenger's clothing is increased by the (warm) inside temperature in a short time period.

As a result, the actual air temperature blown into the rear space 1c (1d) is decreased with the time delay, namely the actual air temperature can be maintained at the higher value until the passenger feels "warm" by the hot blowing air. The air conditioning system sufficiently gives comfortable feeling to the passenger, even shortly after the passenger gets into the vehicle.

On the other hand, in the case that the passenger gets into the vehicle with his clothing having the high surface temperature in the summer season, the ECU 8 also gives the certain time delay (which is determined by they detected values from the IR sensor 70*a* (70*b*) and the time constant "τ" (e.g. 180 sec)) in the control of the air conditioning operation for the rear space 1*c* (1*d*), even though the surface temperature of the passenger's clothing is decreased by the (cold) inside temperature in a short time period.

As a result, the actual air temperature blown into the rear space 1*c* (1*d*) is increased with the time delay, namely the actual air temperature can be maintained at the lower value until the passenger feels "cool" by the cold blowing air. Therefore, the air conditioning system sufficiently gives comfortable feeling to the passenger, even shortly after the passenger gets into the vehicle.

In the case that the air conditioning operation by the rear unit 6 for the rear space 1*c* (1*d*) is in its transient state, the amount of the blowing air into the rear space 1*c* (1*d*) is at a high value. If the ECU 8 gave the time delay in the control of the air conditioning operation in such a case, the amount of the blowing air would be further increased, and an uncomfortable feeling might be given to the passenger.

According to the embodiment of the present invention, however, the ECU 8 gives the time delay in the change of the detected values of the IR sensor 70*a* (70*b*), only when the air conditioning operation is in the normal condition (not in the transient state) and the ECU 8 determines that the passenger has got into the rear space 1*c* (1*d*). The embodiment of the present invention prevents the uncomfortable feeling, to the passenger, due to the extremely increased amount of the blowing air.

The ECU 8 determines, based on the detected signal from the inside air temperature sensor 85, that the air conditioning operation for the rear space 1*c* (1*d*) is in the normal condition. Namely, the air conditioning system of the present invention does not require any specific devices or processes for such determination. And thereby, the determination that the air conditioning operation for the rear space 1*c* (1*d*) is in the normal condition, can be performed without a large cost increase.

According to the investigation of the inventors of the present invention, the time period, during which the passenger feels "hot" or "cold" after he has got into the vehicle, is generally 2 min.

According to the embodiment of the invention, therefore, the ECU 8 corrects the detection value at the IR sensor 70*a* (70*b*), so that the variation of the detection value is changed with the time constant "τ" of 180 sec, during the time period of 2 min after the ECU 8 determines that the passenger has got into the vehicle. And the ECU 8 controls the air conditioning operation by the rear unit 6 based on such corrected detection value. As a result, the air conditioning system can avoid such an uncomfortable feeling by the passenger, in that the passenger feels "hot" or "cold" during the time period of 2 min after the passenger has got into the vehicle.

Furthermore, according to the embodiment of the invention, the time constant "τ" is decreased from 180 sec to 30 sec after the time period of 2 min, so that the response of the rear unit 6 to the change of the detection values of the IR sensor 70*a* (70*b*) can be improved.

It can be possible to determine whether the passenger gets into the vehicle or not, for example, by detecting load applied to the respective vehicle seats by a load sensor. In such a case, it can be detected whether the passenger gets into the vehicle or not, irrespectively of the change of temperature of the passenger's clothing.

According to the embodiment of the invention, however, the ECU 8 determines whether or not the passenger gets into the vehicle, based on the detection values of the IR sensor 70*a* (70*b*), i.e. based on the change of the clothing temperatures of the passenger. Accordingly, the ECU 8 can control the air conditioning operation by the rear unit 6 for the rear space by giving the time delay in the change of the detection values of the IR sensor 70*a* (70*b*), when the passenger really feels "hot" or "cold".

When a hot object (e.g. a burning cigarette end) or a cold object (e.g. an ice cream, a cold canned coffee) temporarily comes into a detection area by the IR sensor 70*a* (70*b*), the control for the air conditioning operation may be rapidly changed (for example, the amount of the blowing air is rapidly increased), to give an uncomfortable feeling to the passenger.

According to the embodiment of the invention, however, the rear unit 6 is operated before the riding time of the passenger and even after the certain time period (2 min), in such a manner that the time delay is given, by the time constant "τ" of 30 sec, to the change of the detection values of the IR sensor 70*a* (70*b*). As a result, even in the case that the burning cigarette end, the ice cream, the cold canned coffee, or the like temporarily come into the detection area of the IR sensor 70*a* (70*b*), the rapid change of the air conditioning operation (the amount of the blowing air) can be prevented. And thereby, the uncomfortable feeling is not given to the passenger.

Second Embodiment

According to a second embodiment of the present invention, a contribution ratio of the detection value by the IR sensor 70*a* (70*b*) is changed to give the more comfortable feeling to the passenger, as explained hereinafter.

Figure 12:
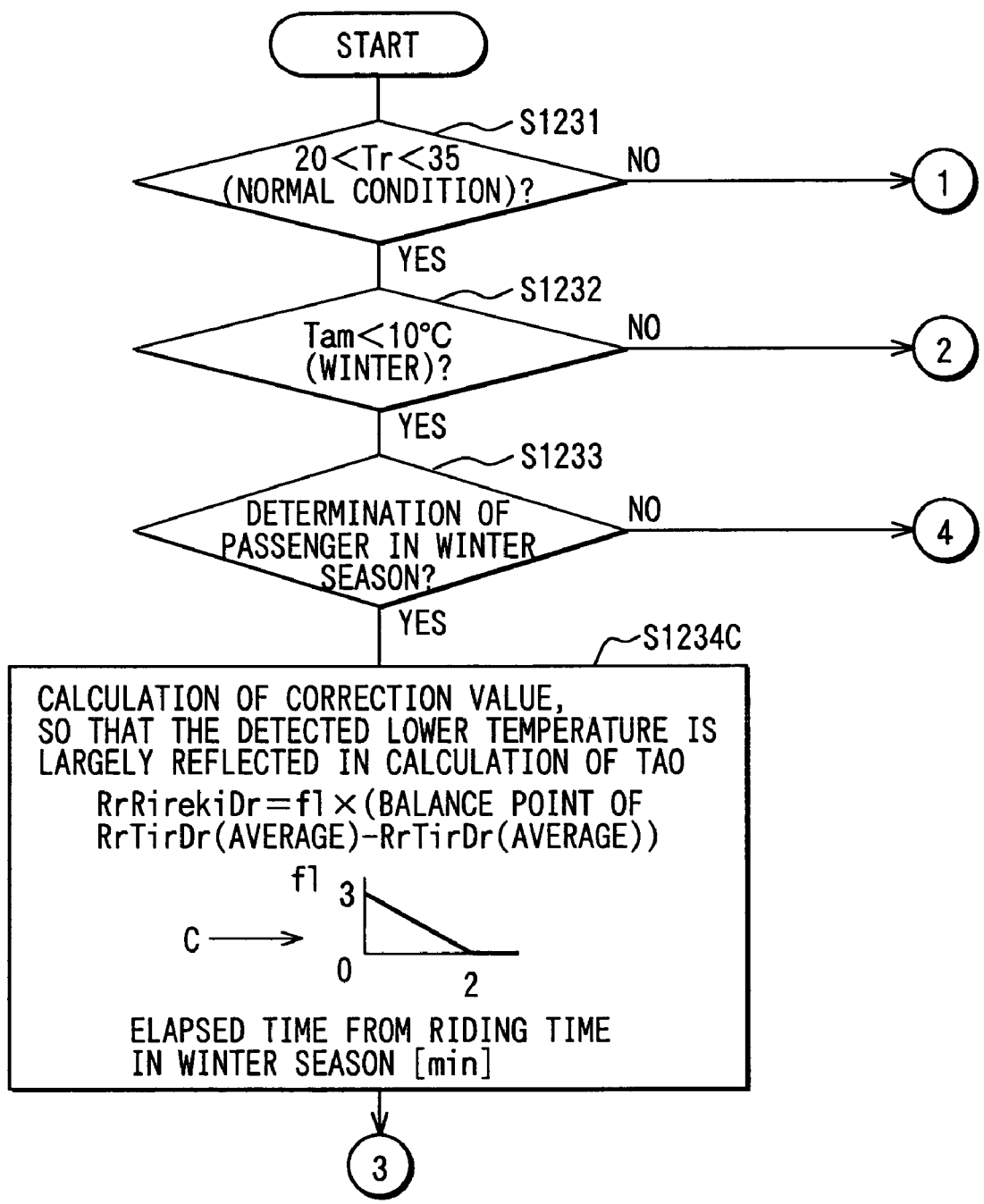
FIGS. 12 and 13 are flow charts showing a part of the process for calculating the target blowing air temperature, according to a second embodiment.
Figure 13:
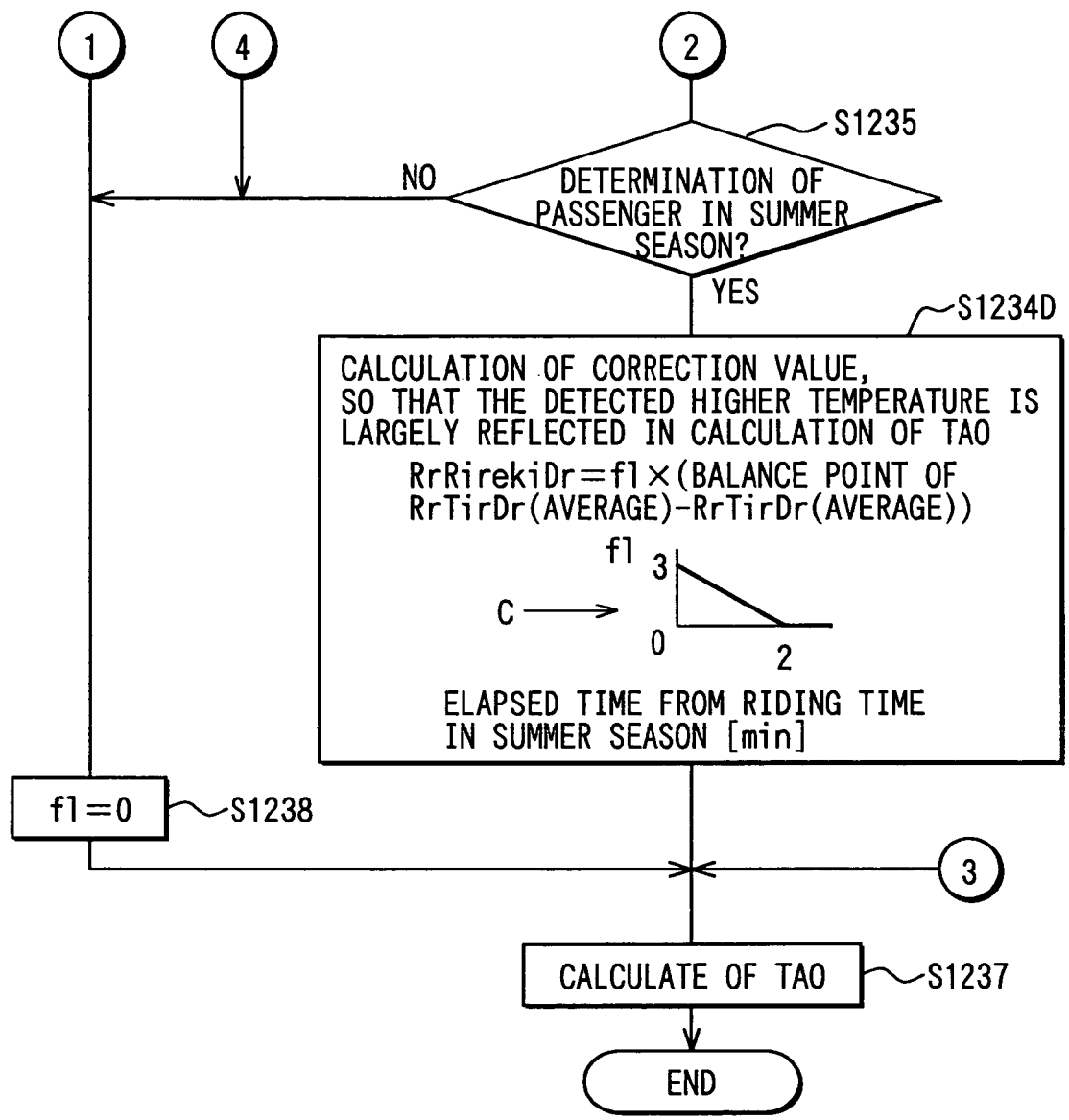

In the second embodiment, the target blowing air temperature is determined by the ECU 8 in accordance with the flow charts shown in FIGS. 12 and 13, instead of FIG. 9. The same references to FIG. 9 are used in FIGS. 12 and 13 for the same process (or for the substantially same process).

The process goes from the step S1231 to the step S1232 and the step S1233, when the ECU 8 determines (YES) at the step S1231 that the air conditioning operation for the rear right space 1*c* is in the normal condition, based on the inside air temperature signal "TrRr" from the inside air temperature sensor 85, and the ECU 8 determines (YES) at the step S1232 that it is the winter season, based on the outside air temperature signal "Tam" from the outside air temperature sensor 81. When the ECU 8 further determines (YES) at the step S1233 that the passenger has got into the vehicle, the process goes to a step S1234C, at which a correction value "RrRirekiDr" for the target blowing air temperature is calculated.

"RrRirekiDr" is the correction value calculated by the following formula:

$$RrRirekiDr = f1 \times (\text{Balance point of } RrTirDr(\text{Average})) - RrTirDr(\text{Average})$$

In the above formula, a coefficient "f1" is decided by a control map designated by an arrow C in a block of the step S1234C, wherein an ordinate indicates the coefficient "f1" and a lateral axis indicates the elapsed time from the riding time. In a graph of the control map, the coefficient "f1" is zero before the passenger gets into the vehicle, whereas the coefficient "f1" is gradually decreased from "3" during a predetermined time period "td" (for example, 2 min) as the time passes by from the riding time of the passenger, and the coefficient "f1" becomes zero after the predetermined time period "td".

As above, during the time period "td" (2 min), the detected temperature by the matrix IR sensor 70a largely contributes in the calculation of the target blowing air temperature "RrTAODr", compared with that for the time before the passenger gets into the vehicle. The contribution ratio of the detected temperature to the "RrTAODr" is gradually decreased as the time passes by from the riding time of the passenger.

In the above formula, the balance point of RrTirDr(Average) is an average value of "a balance point for the surface temperature at the shoulder", "a balance point for the surface temperature at the breast and abdomen", and "a balance point for the surface temperature at the thigh". Further, the balance points for the respective surface temperatures mean a detected temperature at the respective portions (shoulder, breast and abdomen, and thigh) when the air conditioning operation becomes to the normal condition after the set temperature (for example, 25° C.) is selected by the temperature setting switch 11.

RrTirDr (Average) is a corrected clothing temperature, which is the same to that in the first embodiment, and therefore which is calculated from the saturation curve KO(t) of the formula (12) by substituting 4 sec for "t" and 30 sec for "τ".

When the ECU determines (YES) at the step S1231 (FIG. 12) that the air conditioning operation for the rear right space 1c is in the normal condition, and the ECU determines (NO) at the step S1232 (FIG. 12) that it is not the winter season but the summer season, the process goes to the step S1235 of FIG. 13. When the ECU determines (YES) at the step S1235 (FIG. 13) that the passenger has got into the vehicle, the process goes to a step S1234D, at which the correction value "RrRirekiDr" for the target blowing air temperature is calculated, as in the same manner of the step S1234C.

"RrRirekiDr" is the correction value calculated by the following formula:

$RrRirekiDr = f1 \times (\text{Balance point of } RrTirDr(\text{Average})) - RrTirDr(\text{Average})$ In the above formula, a coefficient "f1" is decided by a control map designated by an arrow C in a block of the step S1234D, wherein an ordinate indicates the coefficient "f1" and a lateral axis indicates the elapsed time from the riding time. In a graph of the control map, the coefficient "f1" is zero before the passenger gets into the vehicle, whereas the coefficient "f1" is gradually decreased from "3" during a predetermined time period "td" (for example, 2 min) as the time passes by from the riding time of the passenger, and the coefficient "f1" becomes zero after the predetermined time period "td".

As above, during the time period "td" (2 min), the detected temperature by the matrix IR sensor 70a largely contributes in the calculation of the target blowing air temperature "RrTAODr", compared with that for the time before the passenger gets into the vehicle.

More specifically, the detected lower temperature largely contributes in the calculation of the target blowing air temperature "RrTAODr" in the winter season, whereas the detected higher temperature largely contributes in the calculation of the target blowing air temperature "RrTAODr" in the summer season. The contribution ratio of the detected temperature to the "RrTAODr" is gradually decreased as the time passes by from the riding time of the passenger.

In the case that the ECU determines (NO) at the step S1231 (FIG. 12), or the ECU determines (NO) at the step S1233 (FIG. 12), the coefficient "f1" is selected as "0" at a step S1238 in FIG. 13.

After the correction value "RrRirekiDr" is calculated as above, the process goes to the step S1237 (FIG. 13), at which the target blowing air temperature "RrTAODr" is calculated by substituting the corrected dressing temperature "RrTirDr (average)", the set temperature "RrTsetDr", the outside (ambient) temperature signal "Tam", and the insolation signal "TsDr", into a formula (16).

$$RrTAODr = 7 \times RrTsetDr - 3 \times RrTirDr(\text{average}) - 1.1 \times Tam - 1.5 \times TsDr + RrRirekiDr - 65 \quad (16)$$

In the above formula (16), "7" is a temperature set gain for the rear right space, "3" is an IR gain for the rear right space, "1.1" is an outside temperature gain, "1.5" is an insolation gain for a right side, and "65" is a constant for correction for the rear right space.

Now, a calculation of a target blowing air temperature "RrTAOPa" for the rear left air conditioning space 1d is explained. Since the calculation of "RrTAOPa" is different from that of "RrTAODr" only in that the air conditioning space is different, the calculation of "RrTAOPa" is substantially the same to that for "RrTAODr".

In FIGS. 12 and 13, the process goes from the step S1231 to the step S1232 and the step S1233, when the ECU 8 determines (YES) at the step S1231 that the air conditioning operation by the rear unit 6 for the rear left space 1d is in the normal condition, and the ECU 8 determines (YES) at the step S1232 that it is the winter season.

When the ECU 8 further determines (YES) at the step S1233 that the passenger has got into the rear space 1d of the vehicle, the process goes to the step S1234C, at which the correction value "RrRirekiPa" for the target blowing air temperature is calculated.

Although the step S1234C of FIG. 12 shows the step for the rear right space 1c, the step S1234C can be applied to the calculation for the rear left space 1d in the same manner.

"RrRirekiPa" is the correction value calculated by the following formula:

$RrRirekiPa = f1 \times (\text{Balance point of } RrTirPa(\text{Average})) - RrTirPa(\text{Average})$ In the above formula, a coefficient "f1" is decided by a control map designated by an arrow C in the block of the step S1234C, wherein the ordinate indicates the coefficient "f1" and the lateral axis indicates the elapsed time from the riding time. In the graph of the control map, the coefficient "f1" is zero before the passenger gets into the vehicle, whereas the coefficient "f1" is gradually decreased from "3" during a predetermined time period "td" (for example, 2 min) as the time passes by from the riding-time of the passenger, and the coefficient "f1" becomes zero after the predetermined time period "td".

As above, during the time period "td" (2 min), the detected temperature by the matrix IR sensor 70b largely contributes in the calculation of the target blowing air temperature "RrTAOPa", compared with that for the time before the passenger gets into the vehicle.

More specifically, the detected lower temperature largely contributes in the calculation of the target blowing air temperature "RrTAODr" in the winter season, whereas the detected higher temperature largely contributes in the calculation of the target blowing air temperature "RrTAOPa" in the summer season. The contribution ratio of the detected temperature to the "RrTAOPa" is gradually decreased as the time passes by from the riding time of the passenger.

In the case that the ECU determines (NO) at the step S1231 (FIG. 12), or the ECU determines (NO) at the step S1233 (FIG. 12), the coefficient "f1" is selected as "0" at a step S1238 in FIG. 13.

The balance point of "RrTirPa (Average)" is substantially the same to the balance point of "RrTirDr (Average)" for the rear right space 1c. And "RrTirPa (Average)" is the corrected clothing temperature, which is the same to that in the first embodiment, and calculated from the saturation curve KO(t) of the formula (12) by substituting 4 sec for "t" and 30 sec for "τ".

After the correction value "RrRirekiPa" is calculated as above, the process goes to the step S1237 (FIG. 13), at which the target blowing air temperature "RrTAOPa" is calculated by substituting the corrected clothing temperature "RrTirPa (average)", the set temperature "RrTsetPa", the outside (ambient) temperature signal "Tam", and the insolation signal "TsPa", into a formula (17).

$$RrTAOPa = 7 \times RrTsetPa - 3 \times RrTirPa(\text{average}) - 1.1 \times Tam - 1.5 \times TsPa + RrRirekiPa - 65 \quad (17)$$

In the above formula (17), "7" is a temperature set gain for the rear left space, "3" is an IR gain for the rear left space, "1.1" is an outside temperature gain, "1.5" is an insolation gain for a left side, and "65" is a constant for correction for the rear left space.

Effects of the above second embodiment will be explained. According to the second embodiment, the air conditioning system for the motor vehicle comprises a rear air conditioning unit 6 for independently performing the air conditioning operations for the rear right and rear left spaces 1c and 1d, the IR sensor 70a (70b) for detecting the surface temperature of the passenger's clothing (at the shoulder, the breast and abdomen, and the thigh), and the electronic control unit (ECU) 8 for independently controlling the air conditioning operations for the rear right and rear left spaces 1c and 1d.

When the ECU determines that the passenger has got into the rear space 1c (1d) of the vehicle, the contribution ratio of the detected value by the IR sensor 70a (70b) to the control of the air conditioning operation by the rear unit 6 for the rear space 1c (1d) is made larger compared with that for the time before the passenger gets into the vehicle.

With such a control, the lower the detected temperature becomes, the higher the actual blowing air temperature to the rear space 1c (1d) becomes. On the other hand, the higher the detected temperature becomes, the lower the actual blowing air temperature to the rear space 1c (1d) becomes.

Accordingly, in the case that the passenger gets into the vehicle with his clothing having the low surface temperature in the winter season, the temperature of the blowing air to the rear space 1c (1d) can be made much higher than the temperature of the case in which the contribution ratio of the detected temperature is constant. As a result, the more comfortable feeling by the hot air to the passenger can be obtained, shortly after he gets into the vehicle.

On the other hand, in the case that the passenger gets into the vehicle with his clothing having the high surface temperature in the summer season, the temperature of the blowing air to the rear space 1c (1d) can be made much lower than the temperature of the case in which the contribution ratio of the detected temperature is constant. As a result, the more comfortable feeling by the cold air to the passenger can be obtained, shortly after he gets into the vehicle.

According to the investigation of the inventors of the present invention, the time period, during which the passenger feels "hot" or "cold" after he has got into the vehicle, is generally 2 min.

According to the embodiment of the invention, therefore, the ECU 8 increases the contribution ratio of the detected values of the IR sensor 70a (70b) during the time period of 2 min after the ECU 8 determines that the passenger has got into the vehicle, and decreases the contribution ratio after the time period of 2 min. As a result, the air conditioning system can avoid such an uncomfortable feeling by the passenger, in that the passenger feels "hot" or "cold" during the time period of 2 min after the passenger has got into the vehicle. Furthermore, after the time period of 2 min, the response of the rear unit 6 to the change of the detection values of the IR sensor 70a (70b) for the amount of the solar radiation can be improved.

Third Embodiment

According to a third embodiment, an air conditioning power is increased during a predetermined time period after the ECU determines that the passenger has got into the vehicle, so that more comfortable feeling by the conditioned air (hot air or cold air) can be given to the passenger, even shortly after he got into the vehicle. An operation for the rear right space 1c will be explained with reference to FIGS. 14 to 22.

Figure 14:
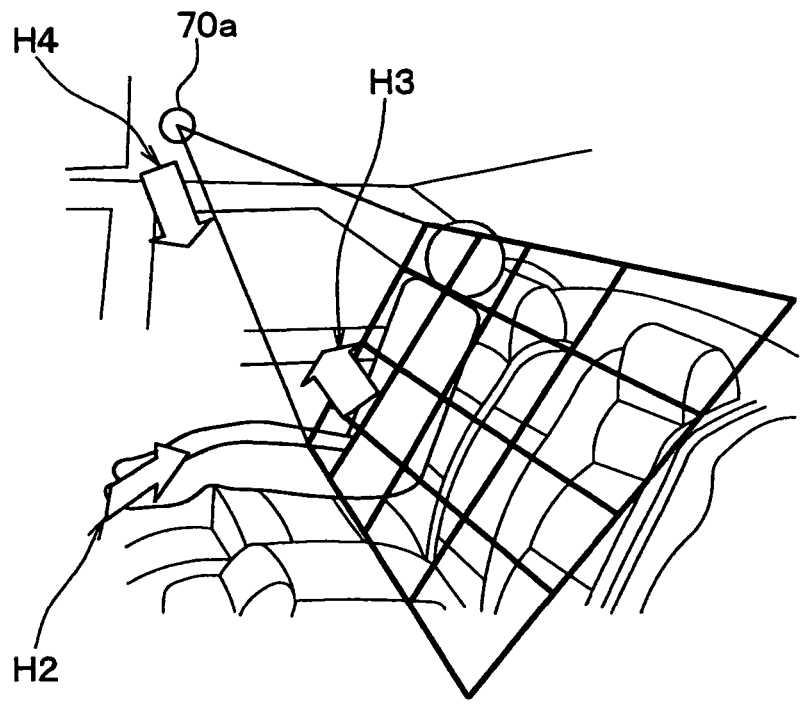
FIG. 14 is a schematic view showing detection areas by IR sensor, according to a third embodiment.
Figure 15:
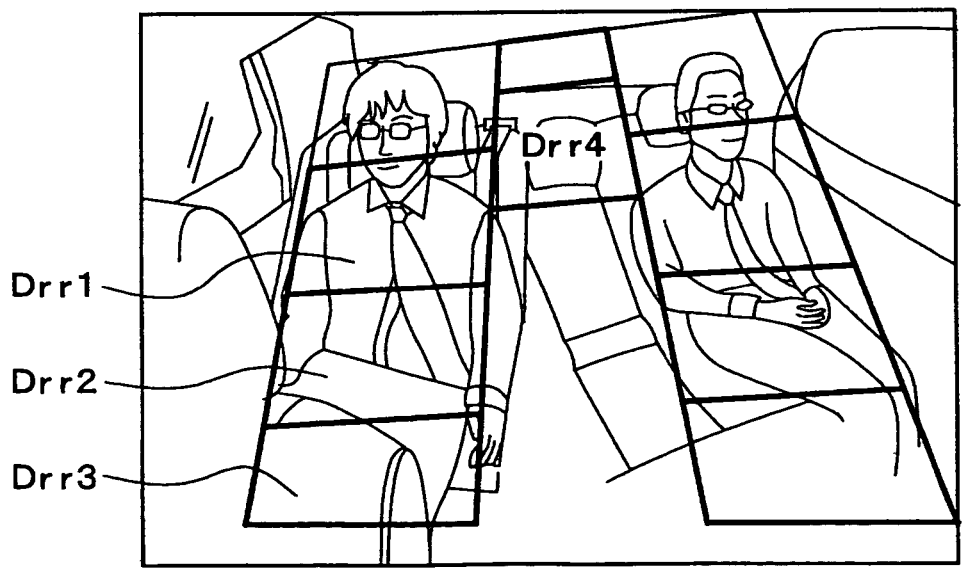
FIG. 15 is a schematic view showing more in detail the detection areas by IR sensor, according to the third embodiment.

The matrix IR sensor 70a of the embodiment comprises four thermoelectric couples Drr1 to Drr4, wherein detection areas of the thermoelectric couples Drr1 to Drr3 are those body portions of the passenger in the rear right space 1c, as shown in FIGS. 14 and 15.

More specifically, the detection area of the thermoelectric couple Drr1 is formed at the shoulder portion of the passenger, the detection area of the thermoelectric couple Drr2 is formed at the abdomen portion of the passenger, and the detection area of the thermoelectric couple Drr3 is formed at the waist and thigh portions of the passenger, as shown in FIG. 15. And the detection area of the thermoelectric couple Drr4 is formed at the rear tray.

A process in the ECU 8 for calculating the target blowing air temperature "RrTAODr" is explained with reference to the drawings shown in FIGS. 16 to 22. FIGS. 16 to 19 show the flow charts for calculating the target blowing air temperature (corresponding to the flow chart of FIG. 9 for the first embodiment), wherein the process of this calculation is repeated at the predetermined intervals.

The detected temperature signals from the thermoelectric couples Drr1 to Drr4 are read into the ECU at the predetermined intervals (for example, 250 msec), so that the detected temperatures "Tirr1(n)" to "Tirr4(n)" of the thermoelectric couples Drr1 to Drr4 can be obtained at the predetermined intervals, wherein "n" means a number of detection samples.

Then, at a step S2000 (FIG. 16), average values of "AvTir1(n)" to "AvTir4(n)" are calculated for the respective thermoelectric couples, from the detected temperatures of this time and the detected temperatures of the previous times.

At first, the average value "AvTir1(n)" is calculated by the following formula from the detected temperature "Tirr1(n)" of this time by the thermoelectric couple Drr1 and other 15 previously detected temperature "Tirr1(n−1)", "Tirr1(n−2)", ... "Tirr1(n−15)":

$$AvTir1(n) = \{Tirr1(n) + Tirr1(n-1) + Tirr1(n-2) \ldots Tirr1(n3115)\}/16$$

The average value "AvTir2(n)" is likewise calculated by the following formula from the detected temperature "Tirr2(n)" of this time by the thermoelectric couple Drr2 and other 15 previously detected temperature "Tirr2(n−1)", "Tirr2(n−2)", ... "Tirr2(n−15)":

$$AvTir2(n)=\{Tirr2(n)+Tirr2(n-1)+Tirr2(n-2) \ldots Tirr2(n-15)\}/16$$

The average value "AvTir3(n)" is likewise calculated by the following formula from the detected temperature "Tirr3(n)" of this time by the thermoelectric couple Drr3 and other 15 previously detected temperature "Tirr3(n−1)", "Tirr3(n−2)", ... "Tirr3(n−15)":

$$AvTir3(n)=\{Tirr3(n)+Tirr3(n-1)+Tirr3(n-2) \ldots Tirr3(n-15)\}/16$$

After the above average values of "AvTir1(n)", "AvTir2(n)" and "AvTir3(n)" are calculated at the step S2000, the process goes to a step S2010, at which the ECU determines whether the outside air temperature is lower than 10° C., based on the outside air temperature signal "Tam" from the outside temperature sensor 81. Namely, the ECU determines whether it is the winter season or not.

When the outside air temperature is lower than 10° C., the ECU determines (YES) at the step S2010 that it is the winter season, and the process goes to a step S2020. At the step S2020, the ECU determines whether the passenger has got into the rear right space 1c, based on the above average values "AvTir1(n)", "AvTir2(n)" and "AvTir3(n)" and temperature correction data "HTir1(n−1)", "HTir2(n−1)" and "HTir3(n−1)".

The temperature correction data is a correction data (value) which is obtained by correcting the detected temperature from the respective thermoelectric couples in such a manner that a time delay having a time constant "τ" is given to a variation of the detected temperatures, and which is updated for every four sec. And the temperature correction data "HTir1(n−1))", "HTir2(n−1)" and "HTir3(n−1)" are those temperature correction data calculated in the previous time.

A process for determining whether the passenger gets into the vehicle is explained. In the case that a vehicle speed is zero (0 km/h), the ECU determines at the step S2020 whether the following three conditions (1) to (3) are satisfied within a predetermined time period (for example, 1 min) after a vehicle door is opened so that the passenger gets into the vehicle:

$$AvTir1(n)-HTir1(n-1) \leq -3 \quad (1)$$

$$AvTir2(n)-HTir2(n-1) \leq -3 \quad (2)$$

$$AvTir3(n)-HTir3(n-1) \leq -3 \quad (3)$$

In this process, a signal from a vehicle speed sensor is used for the detection of the vehicle speed, and a normally opened switch, which is closed when the vehicle door is opened, is used for the detection of the opening of the door.

In the case that the vehicle speed is zero, and the above three conditions (1) to (3) are satisfied within the predetermined time period after the vehicle door is opened, the ECU determines (YES) at the above step S2020 that the passenger has got into the vehicle. The process goes to a step S2030, at which the ECU calculates an elapsed time "f3" from a time at which the above determination is done.

The elapsed time "f3" is calculated in the following manner. At first, an average value "V1" is calculated by the following formula, wherein "Tirr1Off", "Tirr2Off" and "Tirr3Off" mean respectively the detected temperatures by the thermoelectric couples Drr1, Drr2 and Drr3 just before the ECU determines that the passenger has got into the vehicle:

$$V1=(Tirr1Off+Tirr2Off+Tirr3Off)/3$$

An average value "V2" is calculated by the following formula in the same manner to the average value "V1", wherein "Tirr1(n)", "Tirr2(n)" and "Tirr3(n)" mean the detected temperature by the thermoelectric couples Drr1, Drr2 and Drr3 of this time (after the passenger has got into the vehicle):

$$V2=\{Tirr1(n)+Tirr2(n)+Tirr3(n)\}/3$$

The elapsed time "f3" is determined from a control map (shown in a block of the step S2030 of FIG. 16) based on a difference "ΔT" (=V2−V1) between the above average values. In the control map, the elapsed time "f3" is regarded as 180 sec, in the case that "ΔT" is lower than −10° C. ("ΔT"<−10° C.), the elapsed time "f3" is gradually decreased from 180 sec to 0 sec in case of 0° C.≧"ΔT"≧−10° C., and the elapsed time "f3" is regarded as 0 sec in case of "ΔT">0° C.

After the elapsed time "f3" is calculated as above, the process goes to a step S2050 (FIG. 17), at which a time constant "τ" is calculated from a control map (shown in a block of the step S2050 of FIG. 17) based on the elapsed time "f3". The time constant "τ" is used for calculating the temperature correction data, as explained later. And in the control map of the step S2050, the time constant "τ" is regarded as "1" in case of (0 sec≦"f3"≦4 sec), whereas the time constant "τ" is regarded as "60" in case of ("f3", >4 sec).

At a next step S2060 (FIG. 17), a control coefficient "f1" is calculated from a control map (shown in a block of the step S2060 of FIG. 17) based on the above elapsed time "f3". The control coefficient "f1" is used for calculating a constant for correction for the target blowing air temperature in the rear right space 1c, as explained later. And in the control map of the step S2060, the control coefficient "f1" is gradually decreased as the elapsed time "f3" is increased.

After the time constant "τ" as well as the control coefficient "f1" is calculated as above, the process goes to a step S2070B, at which the constant "RrRirekiDr" for correction for the target blowing air temperature in the rear right space 1c is calculated.

At first, the temperature correction data "HTir1(n)", "HTir2(n)" and "HTir3(n)" are calculated. A deviation "E" is then calculated by the following formula from the average value "AvTir1(n)" and the temperature correction data "HTir1(n−1))" of the previous time; E=AvTir1(n)−HTir1(n−1)).

Figure 20:
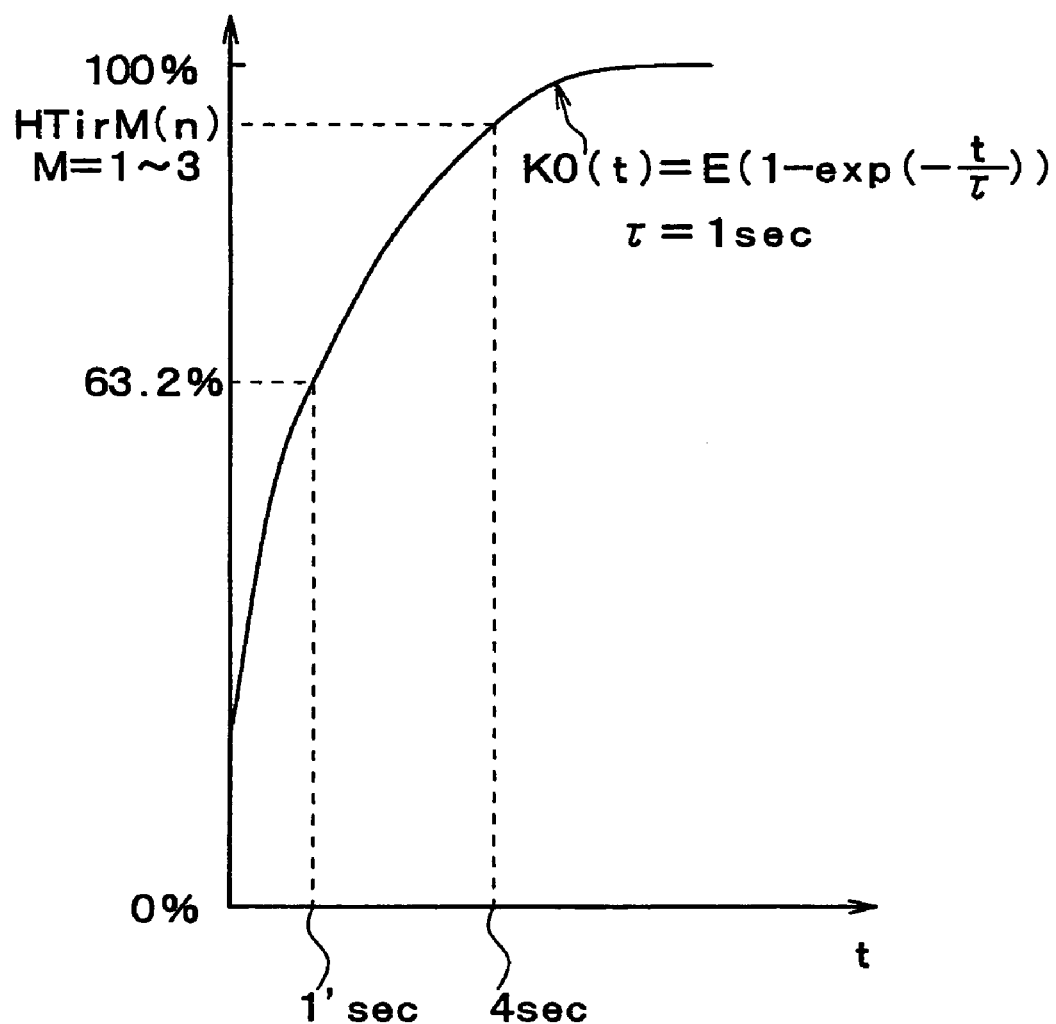
FIGS. 20 and 21 are charts for explaining a process for calculating temperature correction data according to the third embodiment.
Figure 21:
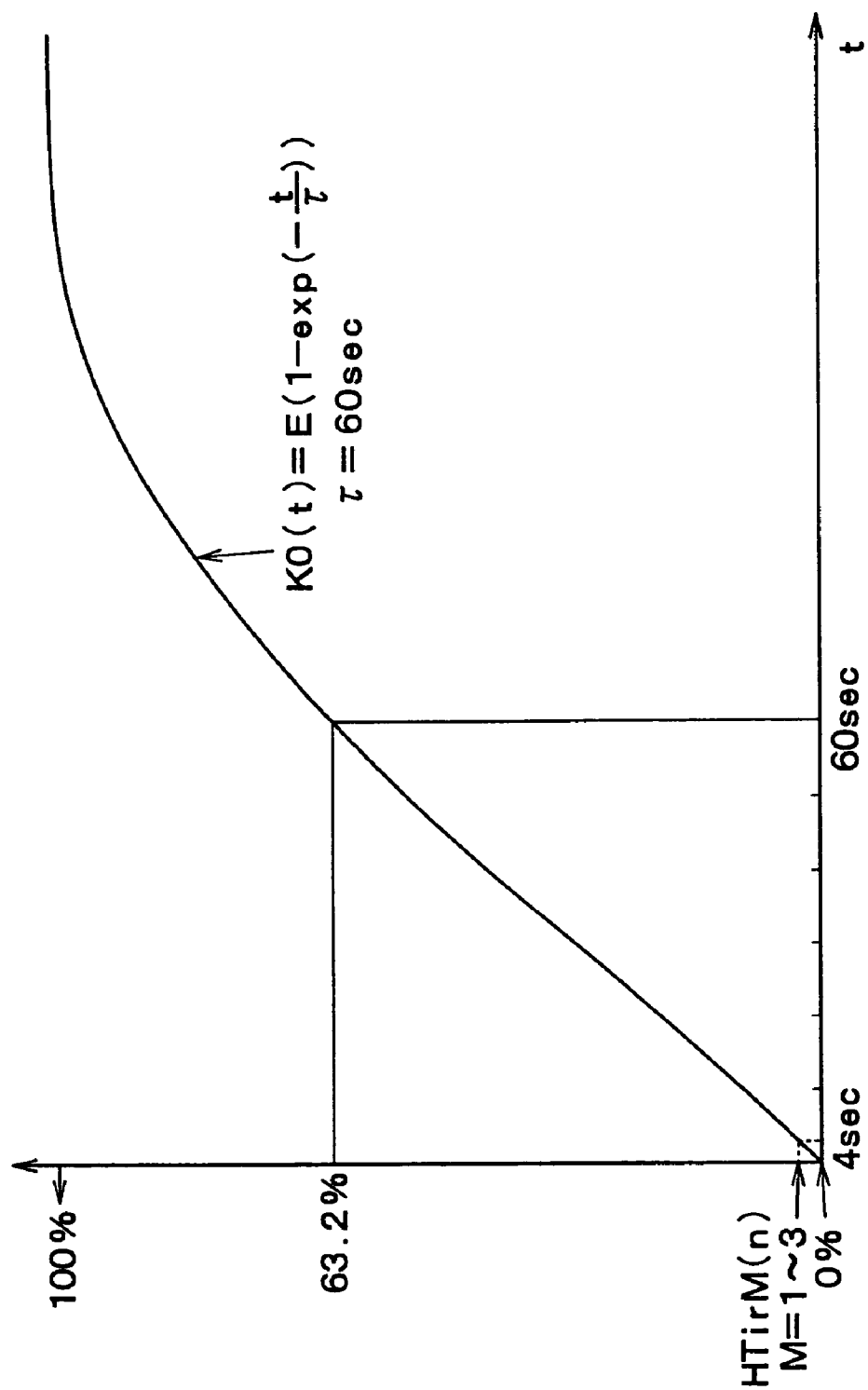
Figure 22:
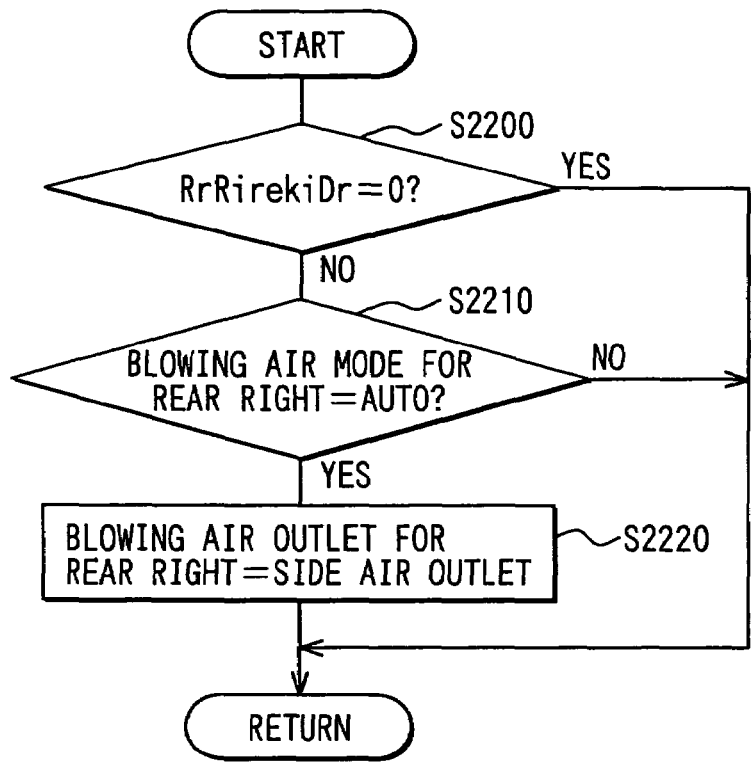
FIG. 22 is a flow chart showing a part of the process for the air conditioning operation, according to a modification of the third embodiment.

The above deviation "E" and the time constant "τ" are substituted in the saturation curve KO(t) of the formula (12). And the updating time "4 sec" is substituted for "t" of the saturation curve KO(t) obtained as above. The value of KO(4) thus obtained is regarded as the temperature correction data "HTir1(n)". FIG. 20 shows the saturation curve in the case of "τ"=1 sec, whereas FIG. 21 shows the saturation curve in the case of "τ"=60 sec.

As in the same manner to the above "Tirr1(n)", a deviation "E" is calculated by the following formula from the average value "AvTir2(n)" and the temperature correction data "HTir2(n−1)" of the previous time; E=AvTir2(n)−HTir2(n−1).

The above deviation "E" and the time constant "τ" are substituted in the saturation curve KO(t) of the formula (12). And the updating time "4 sec" is substituted for "t" of the saturation curve KO(t) obtained as above. The value of KO(4) thus obtained is regarded as the temperature correction data "HTir2(n)".

As in the same manner for the temperature correction data "HTir1(n)" and "HTir2(n), the temperature correction data "HTir3(n)" for the detected temperature "Tirr3(n)" is calculated.

Then, an average value "V3" for the temperature correction data is calculated by the following formula:

$$V3=\{HTir1(n)+HTir2(n)+HTir3(n)\}/3$$

A difference "ΔT"(=V3−V1) between the above average values "V3" and "V1" is further calculated. In the formula ("ΔT"=V3−V1), "V1" is the average value of the detected temperatures just before the passenger gets into the vehicle, as explained above.

After the above difference "ΔT" is obtained, the constant "RrRirekiDr" for correction for the target blowing air temperature in the rear right space 1c is calculated by substituting the values of "ΔT" and "f1" into the following formula (18):

$$RrRirekiDr=f1\times 9\times(V3-V1) \qquad (18)$$

As above, the constant "RrRirekiDr" for correction for the target blowing air temperature in the rear right space 1c is calculated in case of the winter season.

Now, the calculation of the constant "RrRirekiDr" for correction for the target blowing air temperature in the rear right space 1c in case of the summer season is further explained.

At a step S2080 (FIG. 18), the ECU determines whether it is the summer season or not, namely whether the outside temperature is higher than 15° C., based on the outside temperature signal "Tam" from the outside temperature sensor 81.

The ECU determines (YES) at the step S2080 that it is the summer season, when the outside temperature is higher than 15° C. The process goes to a step S2090 (FIG. 18), at which the ECU determines whether the passenger has got into the rear right space 1c of the vehicle or not.

In the case that a vehicle speed is zero (0 km/h), the ECU determines at the step S2090 whether the following three conditions (4) to (6) are satisfied within a predetermined time period (for example, 1 min) after the vehicle door is opened so that the passenger gets into the vehicle:

$$AvTir1(n)-HTir1(n-1)\geq 3 \qquad (4)$$

$$AvTir2(n)-HTir2(n-1)\geq 3 \qquad (5)$$

$$AvTir3(n)-HTir3(n-1)\geq 3 \qquad (6)$$

In the case that the vehicle speed is zero, and the above three conditions (4) to (6) are satisfied within the predetermined time period after the vehicle door is opened, the ECU determines (YES) at the above step S2090 that the passenger has got into the vehicle. The process goes to a step S2100, at which the ECU calculates an elapsed time "f4" from a time at which the above determination is done.

The elapsed time "f4" is calculated in the following manner, which is basically identical to the calculation of the elapsed time "f3". At first, an average value "V1" is calculated by the following formula, wherein "Tirr1Off", "Tirr2Off" and "Tirr3Off" mean respectively the detected temperatures by the thermoelectric couples Drr1, Drr2 and Drr3 just before the ECU determines that the passenger has got into the vehicle:

$$V1=(Tirr1Off+Tirr2Off+Tirr3Off)/3$$

An average value "V2" is likewise calculated by the following formula in the same manner to the average value "V1", wherein "Tirr1(n)", "Tirr2(n)" and "Tirr3(n)" mean the detected temperature by the thermoelectric couples Drr1, Drr2 and Drr3 of this time (after the passenger has got into the vehicle):

$$V2=\{Tirr1(n)+Tirr2(n)+Tirr3(n)\}/3$$

The elapsed time "f4" is determined from a control map (shown in a block of the step S2100 of FIG. 18) based on a difference "ΔT" (=V2−V1) between the above average values. In the control map, the elapsed time "f4" is regarded as 0 (zero) sec, in the case that "ΔT" is lower than 10° C. ("ΔT"<0° C.), the elapsed time "f4" is gradually increased from 0 sec to 180 sec in case of 10° C.≧"ΔT"≧0° C., and the elapsed time "f4" is regarded as 180 sec in case of "ΔT">10° C.

After the elapsed time "f4" is calculated as above, the process goes to a step S2110 (FIG. 19), at which a time constant "τ" is calculated from a control map (shown in a block of the step S2110 of FIG. 19) based on the elapsed time "f4". And in the control map of the step S2110, the time constant "τ" is regarded as "1", in case of (0 sec≦"f4"≦4 sec), whereas the time constant "τ" is regarded as "60" in case of ("f4">4 sec).

At a next step S2120 (FIG. 19), a control coefficient "f1" is calculated from a control map (shown in a block of the step S2120 of FIG. 19) based on the above elapsed time "f4". And in the control map of the step S2120, the control coefficient "f1" is gradually decreased as the elapsed time "f4" is increased.

After the time constant "τ" as well as the control coefficient "f1" is calculated as above, the process goes to a step S2130B, at which the constant "RrRirekiDr" for correction for the target blowing air temperature in the rear right space 1c is calculated.

Figure 17:
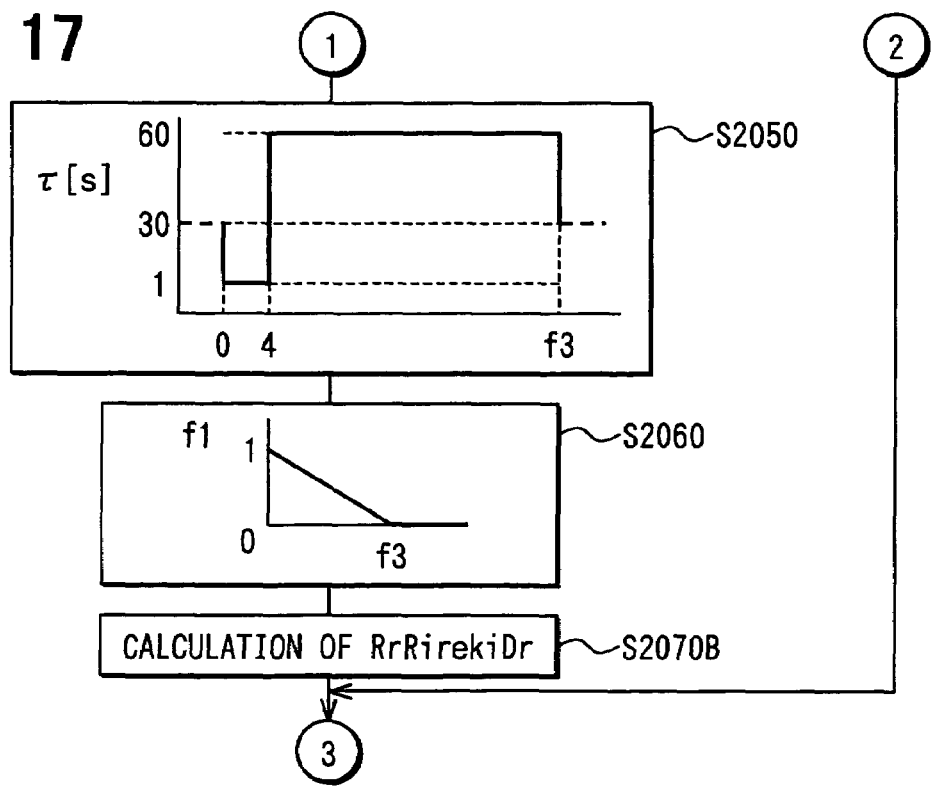

At the step S2130B, the temperature correction data "HTir1(n)", "HTir2(n)" and "HTir3(n)" are calculated from the control coefficient "f1", the time constant "τ", the saturation curve KO(t) of the formula (12), and average values "AvTir1(n)", "AvTir2(n)" and "AvTir3(n), as in the same manner to the step S2070B (FIG. 17).

Then, an average value "V3" for the temperature correction data is calculated by the following formula:

$$V3=\{HTir1(n)+HTir2(n)+HTir3(n)\}/3$$

A difference "ΔT"(=V3−V1) between the above average values "V3" and "V1" is further calculated. In the formula ("ΔT"=V3−V1), "V1" is the average value of the detected temperatures just before the passenger gets into the vehicle, as explained above:

$$V1=(Tirr1Off+Tirr2Off+Tirr3Off)/3$$

After the above difference "ΔT" is obtained, the constant "RrRirekiDr" for correction for the target blowing air temperature in the rear right space 1c is calculated by substituting the values of "ΔT" and "f1" into the following formula (19):

$$RrRirekiDr=-f1\times 9\times(V3-V1) \qquad (19)$$

As above, the constant "RrRirekiDr" for correction for the target blowing air temperature in the rear right space 1c is calculated in case of the summer season.

After the constant "RrRirekiDr" for correction for the target blowing air temperature is calculated in accordance with the formula (18) for the winter season or the formula (19) for the summer season, the process goes to a step S2140, at which the target blowing air temperature "RrTAODr" for rear right space 1c is calculated from the following formula (20), wherein the above calculated "RrRirekiDr", the desired set temperature "RrDrTset", the outside temperature "Tam", the solar insolation "TsDr" are substituted in the formula:

$$RrTAODr=RrKset \times RrDrTset-RrKr \times RrTr-RrKam \times Tam-RrKs \times TsDr+RrC+RrRirekiDr \qquad (20)$$

In the above formula (20), "RrKset" is a temperature set gain, "RrKr" is an inside temperature gain, "RrKam" is an outside temperature gain, "RrKs" is an insolation gain.

Then, the control for the blowing air mode, for the amount of the blowing air (the blower voltage), the opening degrees of the air mix doors is performed based on the above target blowing air temperature "RrTAODr", as in the same manner to the first embodiment.

Effects of the above third embodiment will be explained. According to the third embodiment, as explained above, the surface temperatures of the passenger's clothing (at the shoulder, the breast and abdomen, and the thigh) are detected by the thermoelectric couples Drr1 to Drr4 of the matrix IR sensor 70a, and the detected temperatures "Tirr1(n)" to "Tirr3(n)" are inputted into the ECU 8 at the predetermined time periods (250 msec).

The ECU 8 calculates the average values "AvTir1(n)", "AvTir2(n)" and "AvTir3(n)", at the predetermined time periods, from the detected temperatures of this time ("Tirr1(n)" to "Tirr3(n)") and the detected temperatures of the previous times ("Tirr1(n-1)" to "Tirr1(n-15)" for Drr1, "Tirr2(n-1)" to "Tirr2(n-15)" for Drr2, and "Tirr3(n-1)" to "Tirr3(n-15)" for Drr3) for the respective thermoelectric couples Drr1 to Drr3.

The ECU 8 calculates the temperature correction data "HTir1(n)", "HTir2(n)" and "HTir3(n)", in such a manner that the detected temperatures "Tirr1(n)", "Tirr2(n)" and "Tirr3(n)" are corrected so that the changes in the detected temperatures appear with the certain time delay.

The ECU 8 determines that the passenger has got into the rear space (rear right space 1c), when the differences between the average values (temperatures) of this time "AvTir1(n)", "AvTir2(n)" and "AvTir3(n)" and the temperature correction data of the previous time "HTir1(n-1))", "HTir2(n-1)" and "HTir3(n-1)" are respectively changed by more than "3° C.".

Since the ECU 8 determines whether the passenger gets into the rear space 1c based on the detected temperatures "Tirr1(n)", "Tirr2(n)" and "Tirr3(n)" at the three different body portions of the passenger (the shoulder portion, the abdomen portion, and the waist and thigh portions), the ECU 8 does not determine that the passenger has got into the vehicle in the case that a certain object is simply put in the rear right space 1c. Accordingly, the determination whether the passenger gets into the vehicle or not can be correctly performed.

Furthermore, the average values (temperatures) "AvTir1(n)" to "AvTir3(n)" as well as the temperature correction data "HTir1(n-1))" to "HTir3(n-1)" are used for determining whether the passenger gets into the vehicle.

Accordingly, even when the detected temperature signals from the thermoelectric couples Drr1 to Drr3 are temporarily varied due to disturbance, such a temporal variation of the detected temperatures may not largely appear in the average values (temperatures) "AvTir1(n)" to "AvTir3(n)" as well as the temperature correction data "HTir1(n)" to "HTir3(n)". As a result, the determination of the passenger in the vehicle can be also correctly performed.

The constant "RrRirekiDr" for correction is used for calculating the target blowing air temperature in the rear right space 1c, and the constant "RrRirekiDr" for correction is calculated by use of the temperature correction data "HTir1(n)" to "HTir3(n)".

Since the air conditioning operation for the rear right space 1c is controlled based on the constant "RrRirekiDr" for correction, the control of the air conditioning operation can be performed with the certain time delay in the change of the detected temperatures of the IR sensor 70a.

In the determination whether the passenger gets into the vehicle or not, the detected temperatures "Tirr1(n)", "Tirr2(n)" and "Tirr3(n)" at more than three different body portions (such as, the shoulder portion, the abdomen portion, and the waist and thigh portions) are used. And it is determined that the passenger gets into the vehicle, when more than two of the temperature changes at the respective detection portions exceed the predetermined values (more than two of the conditions (1) to (3) in case of the winter season, or more than two of the conditions (4) to (6) in case of the summer season). Therefore, the determination of the passenger can be correctly performed.

As the constant "RrRirekiDr" for correction is calculated in accordance with the formulas (18) or (19)

$$(RrRirekiDr=f1 \times 9 \times (V3-V1) \qquad (18))$$

$$(RrRirekiDr=-f1 \times 9 \times (V3-V1) \qquad (19),$$

"f1≠0" is necessary, to make the constant "RrRirekiDr" not to be zero (RrRirekiDr≠0).

Since the "f1" is decided by the elapsed time "f3", the "f1" becomes zero "0" when the elapsed time becomes larger than the predetermined time period. In other words, "f1≠0" and "RrRirekiDr≠0", during the predetermined time period after the ECU determined that the passenger has got into the vehicle, whereas "f1=0" and "RrRirekiDr=0" after the predetermined time period.

Since the control for the blowing air mode, for the amount of the blowing air (the blower voltage), the opening degrees of the air mix doors is performed based on the target blowing air temperature "RrTAODr", which is calculated by use of the above "RrRirekiDr", the power of the air conditioning operation by the rear unit 6 for the rear right space 1c is increased during the predetermined time period after the ECU determines that the passenger has got into the vehicle, compared with the power of the air conditioning operation before the passenger got into the vehicle.

Accordingly, the comfortable feeling to the passenger can be increased within a short time, when the passenger gets in the rear right space 1c.

A correction time (hereinafter referred to as "Th"), which is a time period from the time at which the passenger gets into the vehicle to the time at which the "f1" becomes zero (i.e. "RrRirekiDr=0"), is decided by "f3" (or "f4"), namely the detected temperatures at the thermoelectric couples Drr1 to Drr3. Since the correction time "Th", during which the power of the air conditioning operation is increased, is decided depending on the detected temperatures at the thermoelectric couples Drr1 to Drr3, the comfortable feeling to the passenger can be further increased.

Since the ECU 8 calculates "RrRirekiDr" by use of the average values V3 and V1 (the average values of the detected temperatures at the different body portions more than three; the shoulder portion, the abdomen portion, and the waist and thigh portions), "RrTAODr" and the power of the air conditioning operation for the rear right space 1c can be changed depending on the detected temperatures at the IR sensor 70a.

Since the power of the air conditioning operation is automatically changed depending on the clothing temperature of the passenger, the comfortable feeling to the passenger can be increased within a short time period.

The passenger gets into the vehicle only when the vehicle is stopped. If the ECU determines that the passenger gets into the vehicle during the vehicle is running, such determination is generally an error.

According to the present embodiment, the ECU determines that the passenger gets into the vehicle, when the vehicle speed is lower than the predetermined value (=0 km/h), and when all (or at least two) of the conditions (1) to (3) or the conditions (4) to (6) are satisfied. As above, an erroneous determination that the passenger gets into the vehicle can be prevented.

The door must be opened, when the passenger gets into the vehicle. If the ECU determines that the passenger gets into the vehicle in spite that the door is not opened, such determination is generally an error.

According to the present embodiment, the ECU determines whether all (or at least two) of the conditions (1) to (3) or the conditions (4) to (6) are satisfied or not, only within the predetermined time period after the door has been opened. As above, the erroneous determination can be also prevented.

(Modification)

In the above third embodiment, when the ECU determines that the passenger gets into the rear right space 1c, the blowing air mode can be additionally changed by use of the "RrRirekiDr". The control of the blowing air mode is explained with reference to the flow chart shown in FIG. 22.

At a step S2200, the ECU 8 determines whether "RrRirekiDr" is zero or not. Namely, it determines whether the correction time "Th" has passed by after the passenger got into the vehicle.

"RrRirekiDr" becomes zero, when the correction time "Th" has passed by after the passenger got into the vehicle, whereas "RrRirekiDr" is not zero before the elapsed time is within the correction time "Th". Then, the process goes to a step S2210, in case of NO at the step S2200.

In case that the blowing air mode for the rear right space 1c is set as not "manual" but as "automatic", the ECU determines (YES) at the step S2210, and the process goes to a step S2220 at which the blowing air mode is set as a side air mode. The side air mode is a mode, in which the conditioned air is blown into the rear space toward the passenger as indicated by H3 in FIG. 14 through a side air outlet provided at the door close to a side of the rear seat.

The side air outlet is arranged at a position closer to the passenger than the other air outlets, e.g. the face air outlet which is provided at an upper portion of the door for blowing the conditioned air toward the upper body of the passenger (as indicated by H4 in FIG. 14) or the foot air outlet which is provided at a center console for blowing the conditioned air toward the lower body of the passenger (as indicated by H2 in FIG. 14). Accordingly, the comfortable feeling can be given to the passenger within a much shorter time period after he gets into the vehicle.

Furthermore, as an alternative control, the bi-level mode, in which the conditioned air is equally blown out from the face and foot air outlets, can be selected when the ECU determines the passenger gets into the rear right space 1c of the vehicle. In this bi-level mode, the side air outlet is closed. Even with such a control, the comfortable feeling can be likewise given to the passenger within a much shorter time period after he gets into the vehicle.

Fourth Embodiment

In the above third embodiment, the determination whether the passenger gets into the vehicle or not is carried out by the changes of the detected temperatures "Tirr1(n)", "Tirr2(n)" and "Tirr3(n)" at the different body portions. According to the fourth embodiment, however, the determination that the passenger gets into the vehicle is carried out by use of such a temperature at a position at which the passenger usually get seated, and a temperature at a position at which the passenger does not usually get seated.

Figure 23:
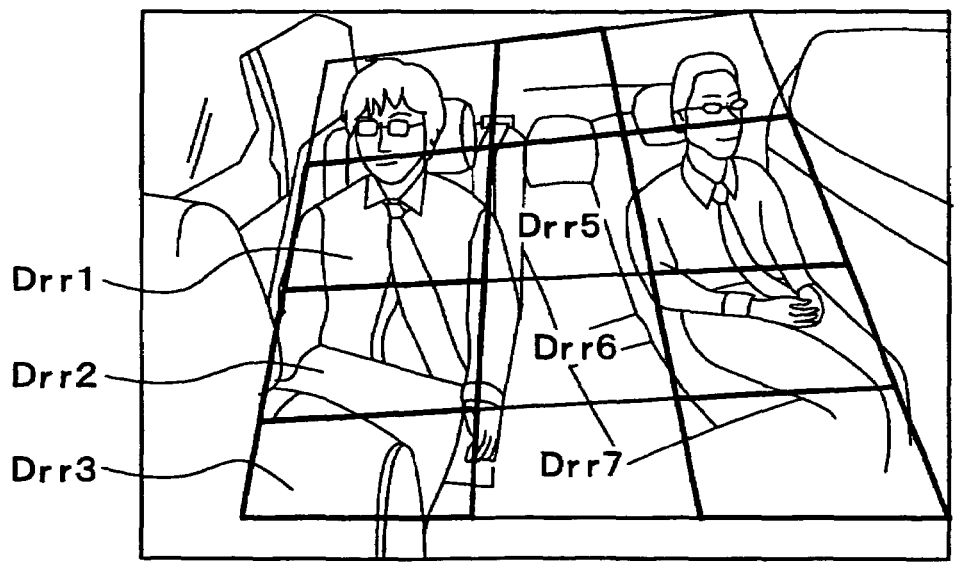
FIG. 23 is a schematic view showing detection areas by IR sensor, according to a fourth embodiment.

The detection areas Drr1, Drr2 and Drr3 by the thermoelectric couples Drr1, Drr2 and Drr3 are those positions at which the passenger usually get seated, as shown in FIG. 23. And surface temperatures "Tirr1(n)", "Tirr2(n)" and "Tirr3(n)" of those detection areas of the passenger (the breast portion, the abdomen portion, and the waist and thigh portions) are detected.

Areas of Drr5, Drr6 and Drr7, which are side areas of the detection areas of Drr1, Drr2 and Drr3, are detection areas of the thermoelectric couples Drr5, Drr6 and Drr7, and temperatures "Tirr5(n)", "Tirr6(n)" and "Tirr7(n)" at those detection areas are likewise detected.

The detection areas by the thermoelectric couples Drr5, Drr6 and Drr7 are formed between at a middle portion of the rear right and rear left spaces 1c and 1d, which corresponds to the position at which the passenger does not usually get seated.

The ECU determines whether the following formulas (21) to (23) are satisfied or not:

$$|Tirr1-Tirr5| \geq 2 \quad (21)$$

$$|Tirr2-Tirr6| \geq 2 \quad (22)$$

$$|Tirr3-Tirr7| \geq 2 \quad (23)$$

In the case that more than two absolute figures of the detected temperatures among those temperatures at the breast portion, the abdomen portion, and the waist and thigh portions are larger by 2° C. than absolute figures of the detected surface temperatures at the intermediate portions (Drr5, Drr6 and Drr7), more than two formulas among (21) to (23) are satisfied. In such a case, the ECU determines that the passenger is seated in the rear right space 1c. And in the case that only the formulas (21) to (23) less than 2 formulas are satisfied, the ECU determines that the passenger is not seated in the rear right space 1c.

Fifth Embodiment

In the above third and fourth embodiments, the ECU determines whether the passenger gets into the vehicle or not, based on the changes in the detected temperatures "Tirr1(n)", "Tirr2(n)" and "Tirr3(n)" of the surfaces of the passenger's clothing at the breast, abdomen and the waist. As already explained, the process of the ECU in the third and fourth embodiments can suppress erroneous determination of the passenger even when the detected temperature signals from the thermoelectric couples Drr1 to Drr3 are temporarily varied due to disturbance.

The fifth embodiment much more correctly prevents such erroneous detection due to the disturbance. The process of the fifth embodiment is explained with reference to flow charts shown in FIGS. 24 to 27, which are used in place of the flow charts shown in FIGS. 16 to 19 for the third embodiment. The reference numerals in FIGS. 24 to 27, which are the same to those in FIGS. 16 to 19, perform the same processes to those in FIGS. 16 to 19.

The ECU 8 determines whether the passenger gets into the vehicle or not, by use of the surface temperature "Tirr4($n$)" of the rear tray detected by the thermoelectric couple Drr4 of the matrix IR sensor 70$a$.

Figure 16:
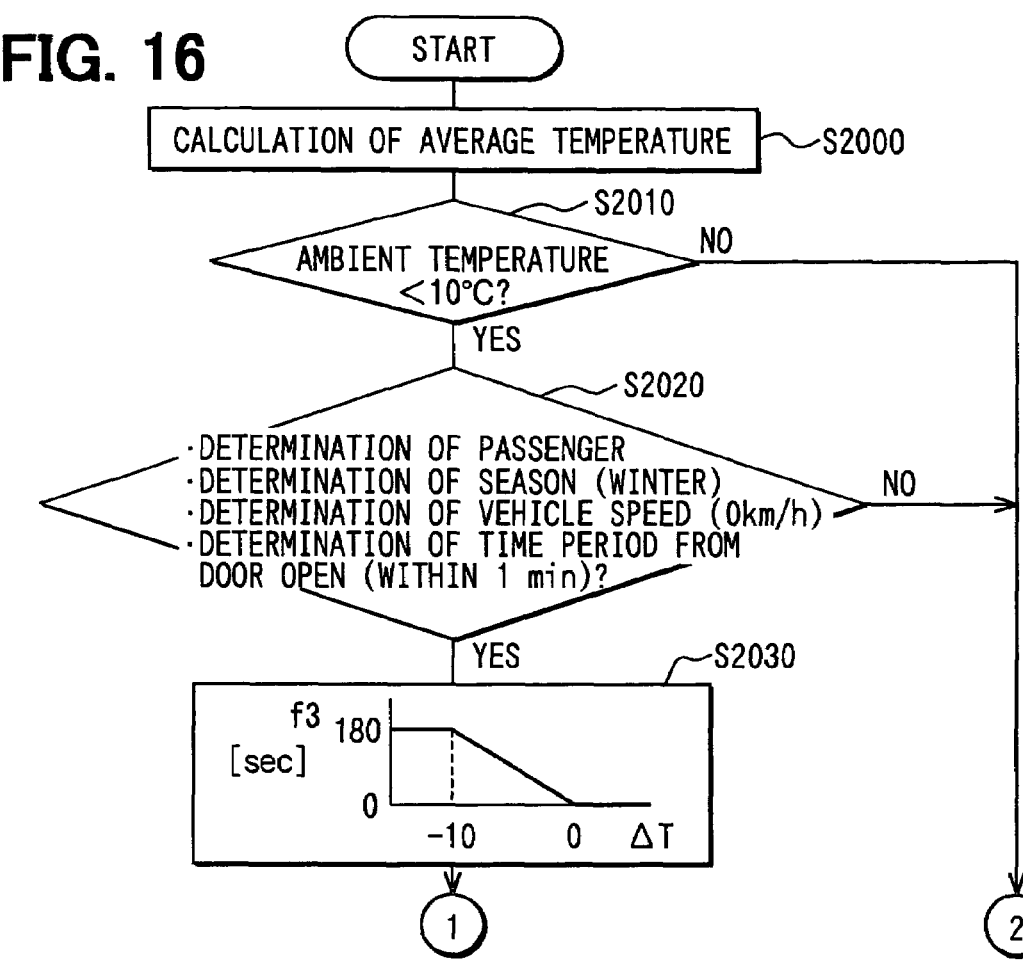
FIGS. 16 to 19 are flow charts showing a part of the process for calculating the target blowing air temperature, according to the third embodiment.
Figure 18:
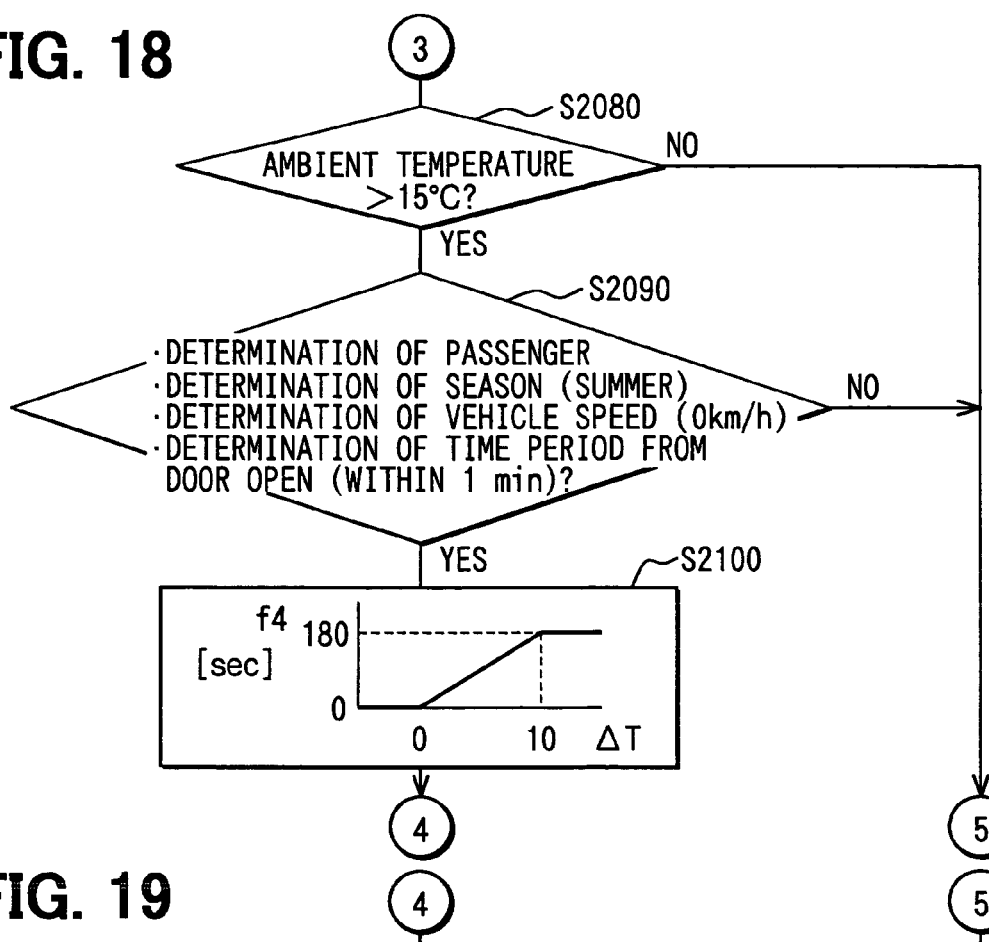
Figure 19:
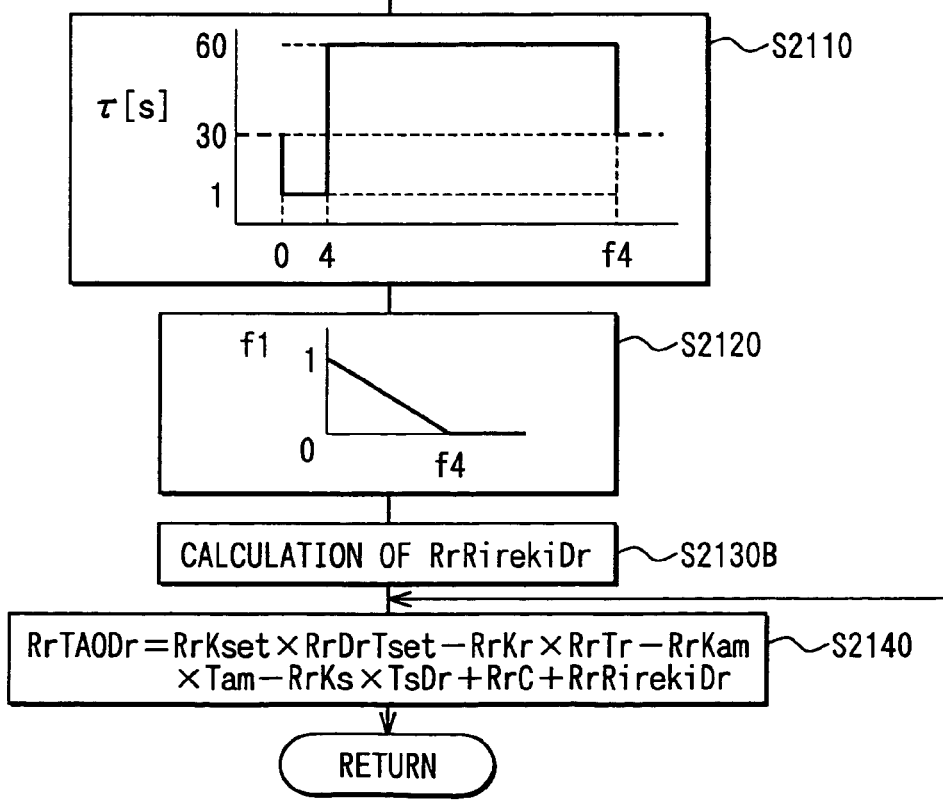
Figure 24:
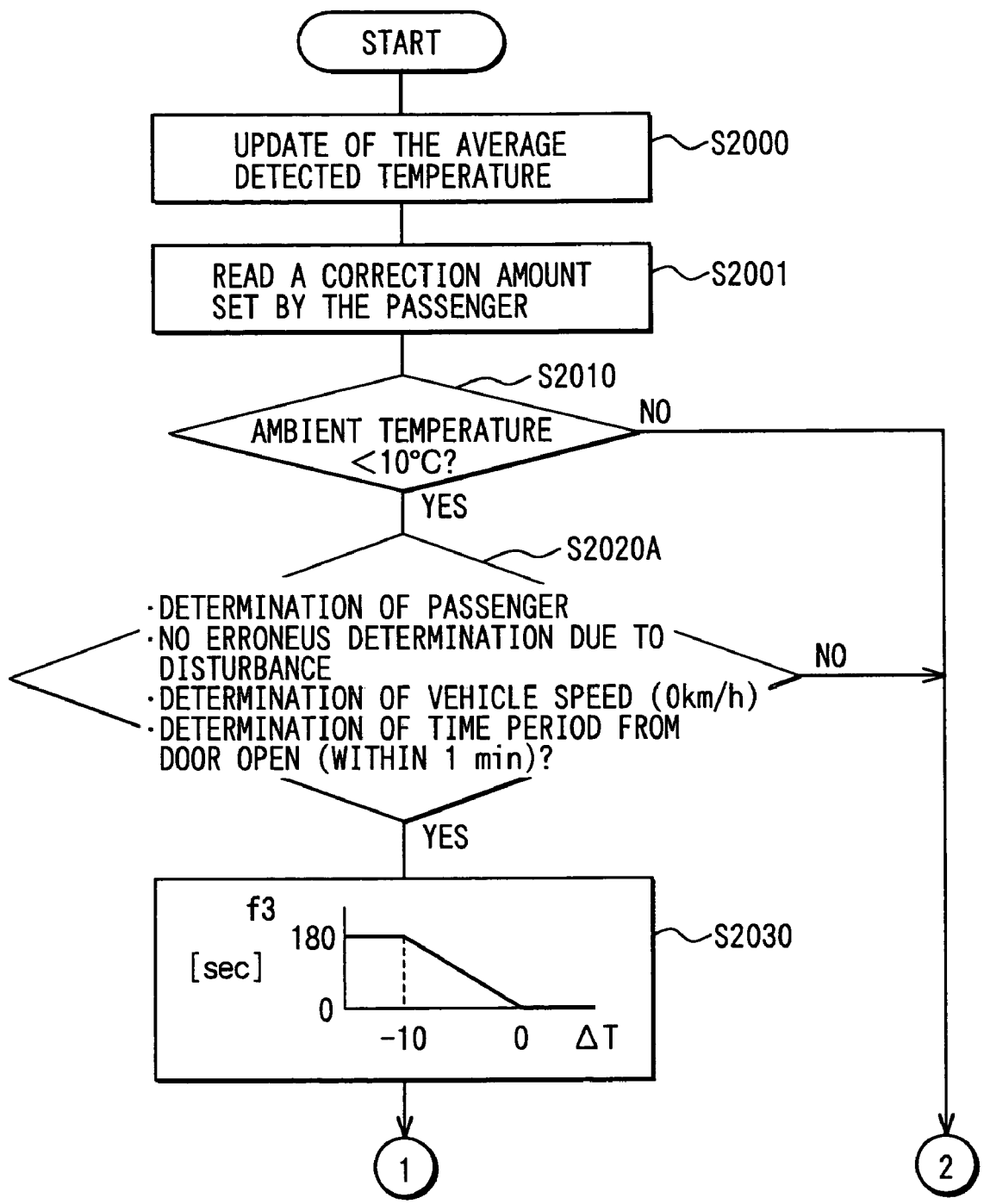
FIGS. 24 to 27 are flow charts showing a part of the process for calculating the target blowing air temperature, according to a fifth embodiment.
Figure 25:
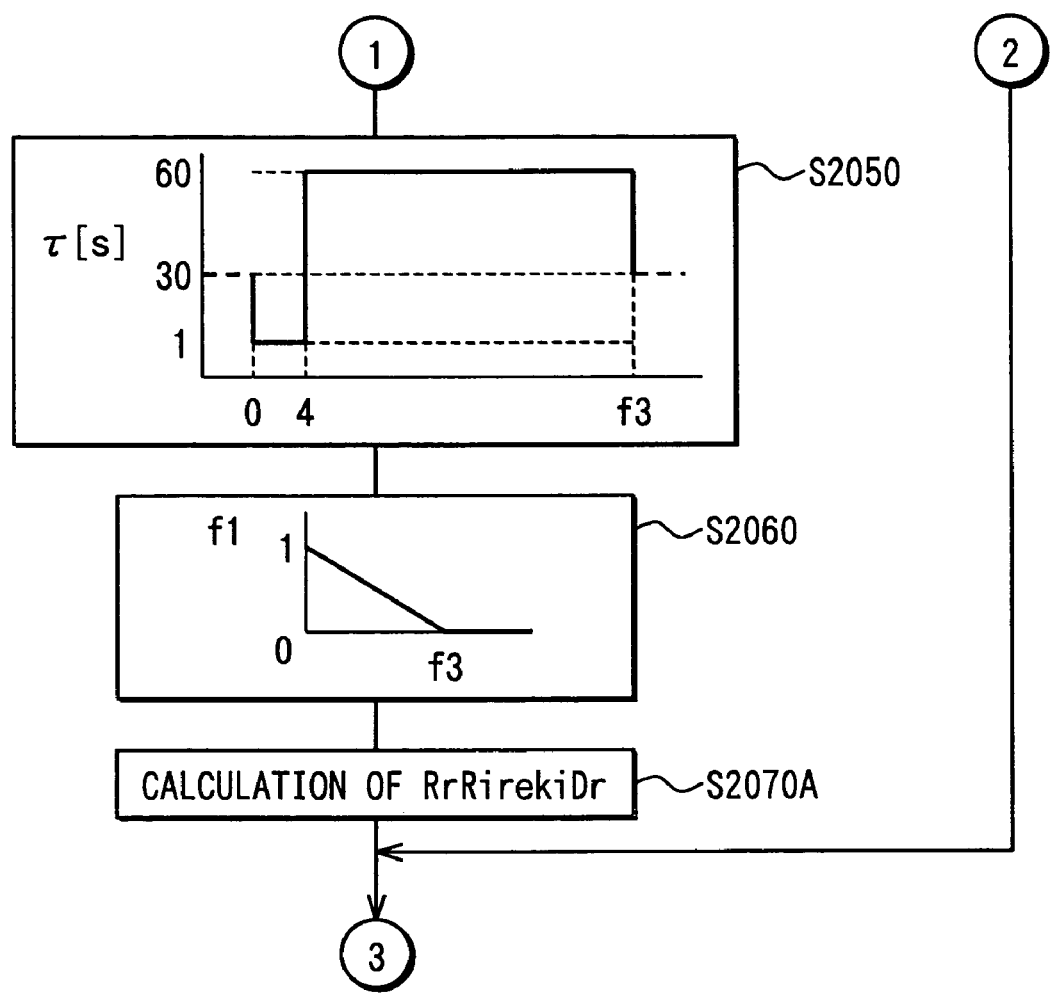
Figure 26:
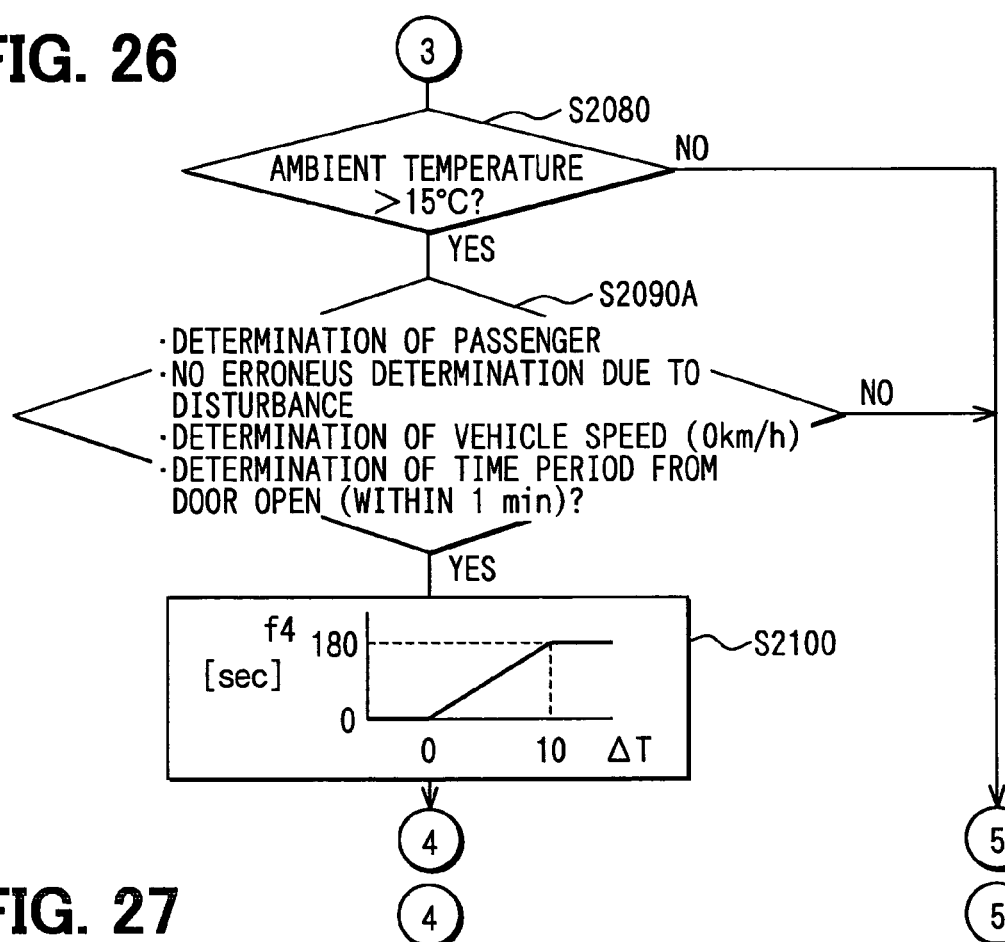
Figure 27:
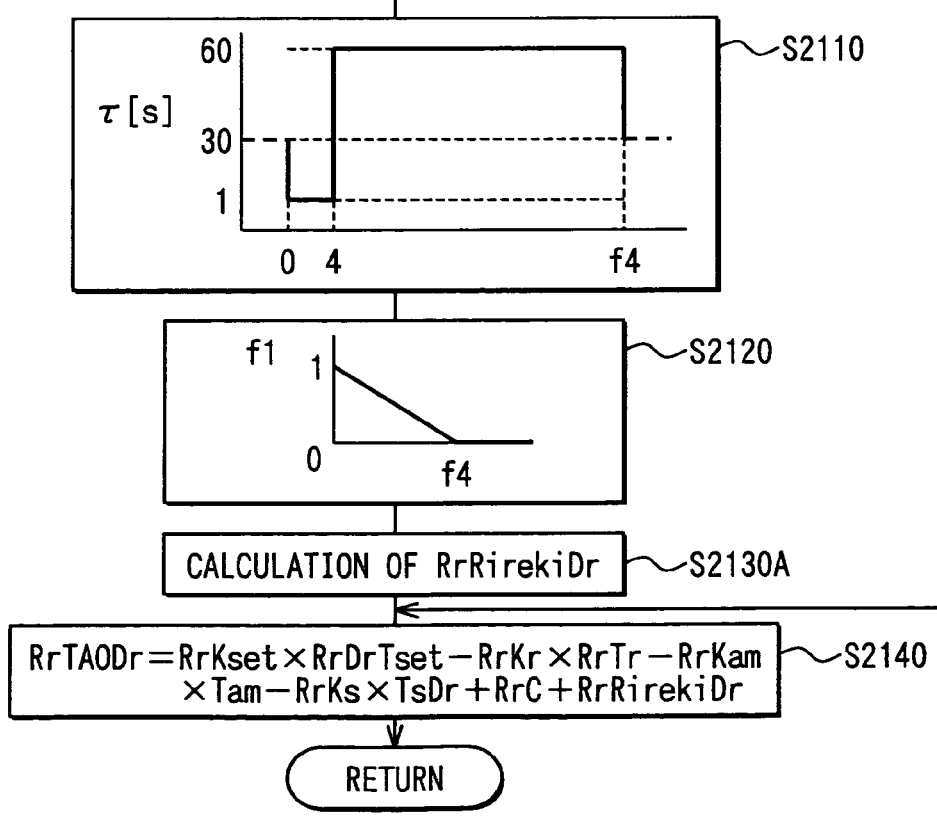
Figure 28:
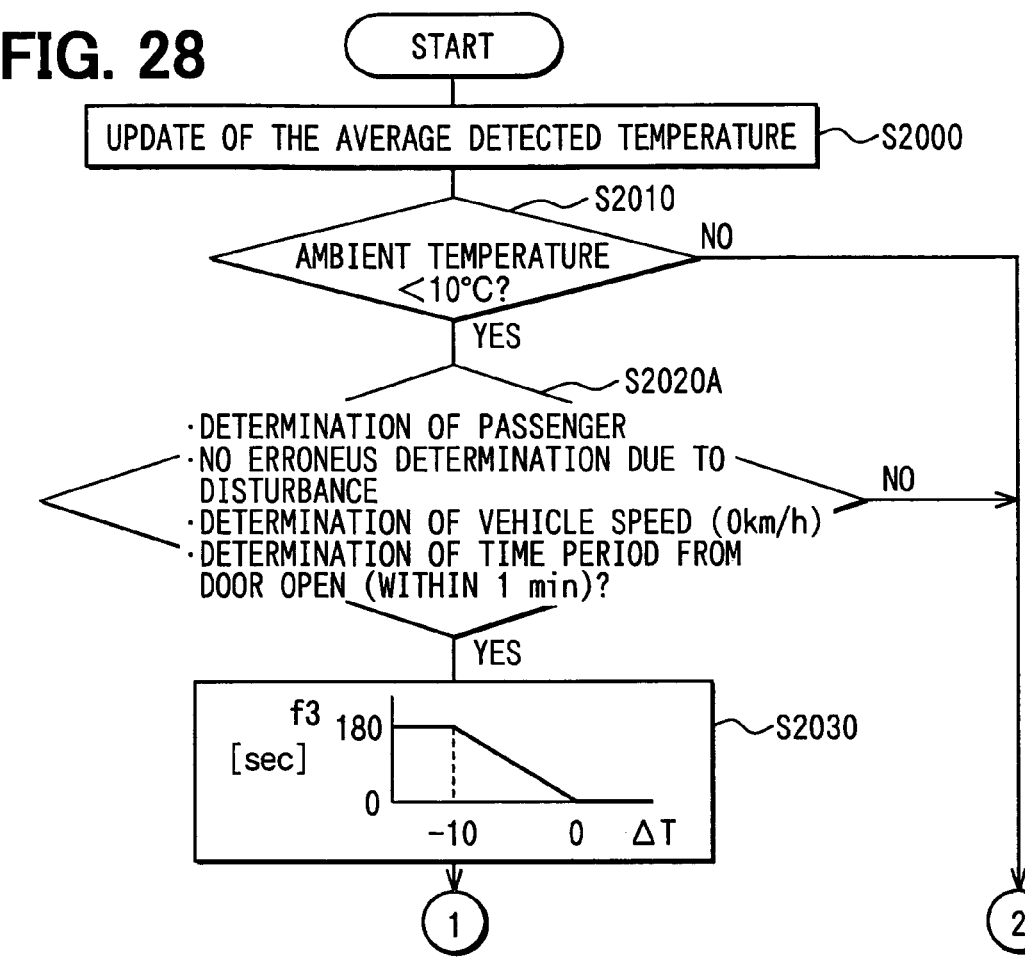
FIGS. 28 to 31 are flow charts showing a part of the process for calculating the target blowing air temperature, according to a sixth embodiment.

A step S2020A of FIG. 24 corresponds to the step S2020 of FIG. 16, and a step S2090A of FIG. 26 corresponds to the step S2090 of FIG. 18.

At the step S2020A of FIG. 24 (in the winter season), the ECU determines whether the following condition (7) is satisfied or not within a predetermined time period (for example, 1 min) after a vehicle door is opened so that the passenger gets into the vehicle:

$$AvTir4(n)-HTir4(n-1) \leq -3 \qquad (7)$$

In the case that a vehicle speed is zero (0 km/h), and the above condition (7) is satisfied in addition to the conditions (1) to (3) (explained in the third embodiment), the ECU determines that the passenger has got into the rear right space 1$c$.

At a step S2090A of FIG. 26 (in the summer season), the ECU determines whether the following condition (8) is satisfied or not within a predetermined time period (for example, 1 min) after a vehicle door is opened so that the passenger gets into the vehicle:

$$AvTir4(n)-HTir4(n-1) \geq 3 \qquad (8)$$

In the case that a vehicle speed is zero (0 km/h), and the above condition (8) is satisfied in addition to the conditions (4) to (6) (explained in the third embodiment), the ECU determines that the passenger has got into the rear right space 1$c$.

In the above conditional formulas (7) and (8), "AvTir4(n)" is an average value calculated by the following formula from the detected temperature "Tirr4($n$)" of this time by the thermoelectric couple Drr4 and other 15 previously detected temperatures "Tirr4(n−1)", "Tirr4(n−2)", . . . "Tirr4(n−15)":

$$AvTir4(n)=\{Tirr4(n)+Tirr4(n-1)+Tirr4(n-2)\ldots Tirr4(n-15)\}/16$$

"HTir4(n−1)" is a temperature correction data, which is obtained by correcting the detected temperature from the thermoelectric couple in such a manner that a time delay having a time constant "τ" is given to a variation of the detected temperatures, and which is updated for every four sec. And the temperature correction data "HTir4(n−1)" is the temperature correction data calculated in the previous time.

At the step S2020A or the step S2090A, the ECU determines that the passenger has not got into the vehicle, in the case that the conditional formula (7) or (8) is not satisfied.

According to the embodiment, the correction amount "f5" of the target blowing air temperature "RrTAODr" (that is the correction amount of the power for the air conditioning operation) can be adjusted in advance by the passenger with the temperature setting switch 11.

At a step S2001 of FIG. 24, the correction amount "f5" set by the temperature setting switch 11 is read into the ECU. The switch 11 has four different buttons, wherein "OFF" button corresponds to "f5=0", "High" corresponds to "f5=15", "Medium" corresponds to "f5=9", and "Low" corresponds to "f5=3".

At a step S2070A (FIG. 25), or at a step S2130A (FIG. 27), the ECU calculates "RrRirekiDr" by use of the correction amount "f5".

Namely, at the step S2070A (in case of winter), "RrRirekiDr" is calculated in accordance with the following formula (24), wherein the above correction amount "f5" as well as "f1", "V3" and "V1" is substituted:

$$RrRirekiDr=f1 \times f5 \times (V3-V1) \qquad (24)$$

At the step S2130A (in case of summer), "RrRirekiDr" is likewise calculated in accordance with the following formula (25), wherein the above correction amount "f5" as well as "f1", "V3" and "V1" is substituted:

$$RrRirekiDr=-f1 \times f5 \times (V3-V1) \qquad (25)$$

Since "RrRirekiDr" is varied depending on the correction amount "f5", the target blowing air temperature which is calculated by use of such "RrRirekiDr" is likewise varied depending on the correction amount "f5".

The power of the air conditioning operation by the rear unit 6 for the rear right space 1$c$ is thereby decided by the target blowing air temperature. As above, the power of the air conditioning operation by the rear unit 6 for the rear right space 1$c$ is adjusted by the correction amount "f5", which has been selected by the passenger.

Sixth Embodiment

According to the sixth embodiment, the power of the air conditioning operation by the rear unit 6 for the rear space 1$c$ is increased when the passenger gets into the vehicle, as in the similar manner to the third embodiment. The processes for this operation are shown in flow charts shown in FIGS. 28 to 31.

The reference numerals in FIGS. 28 to 31, which are the same to those in FIGS. 16 to 19 or in FIGS. 24 to 27, perform the same processes to those in FIGS. 16 to 19 or in FIGS. 24 to 27.

Figure 29:
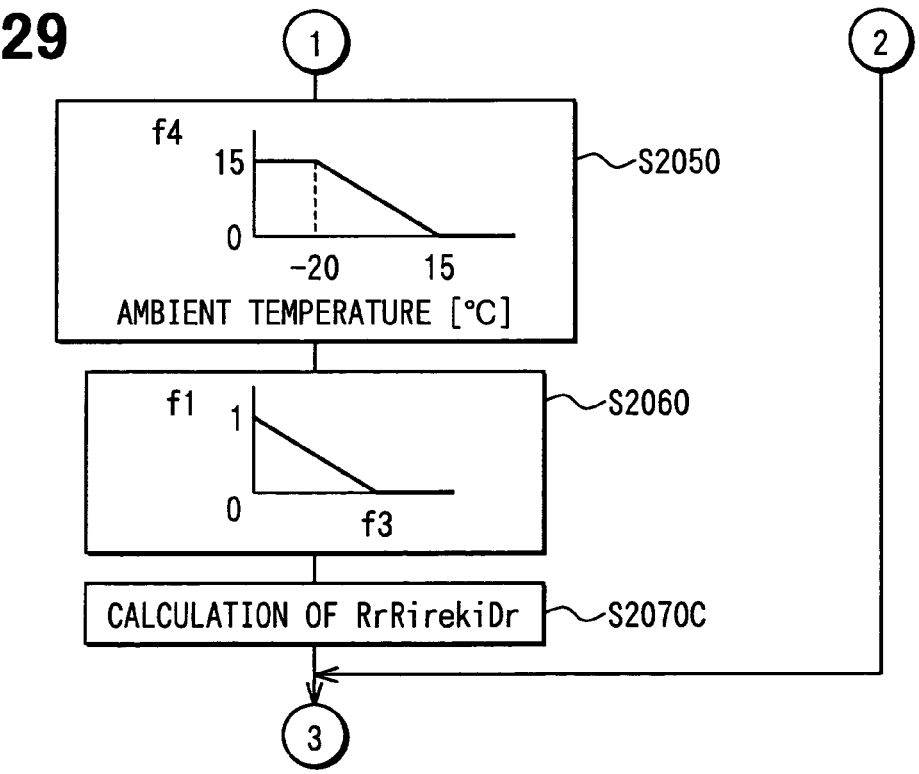
Figure 30:
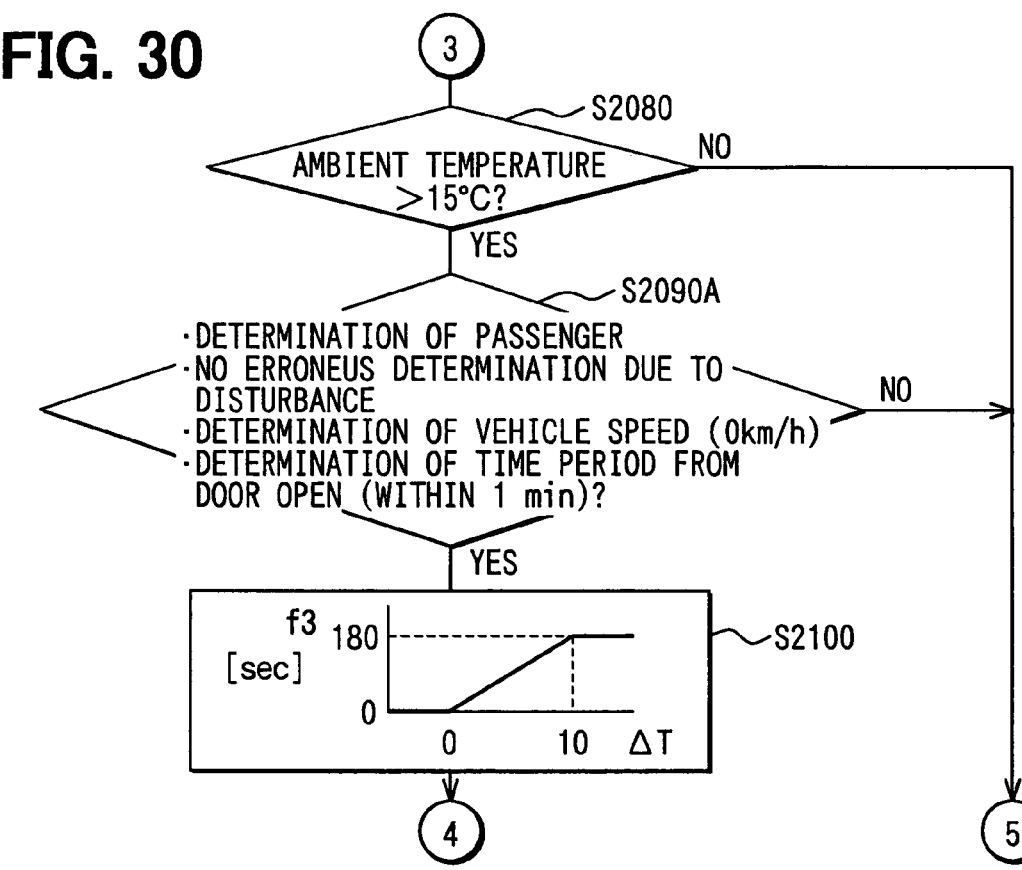
Figure 31:
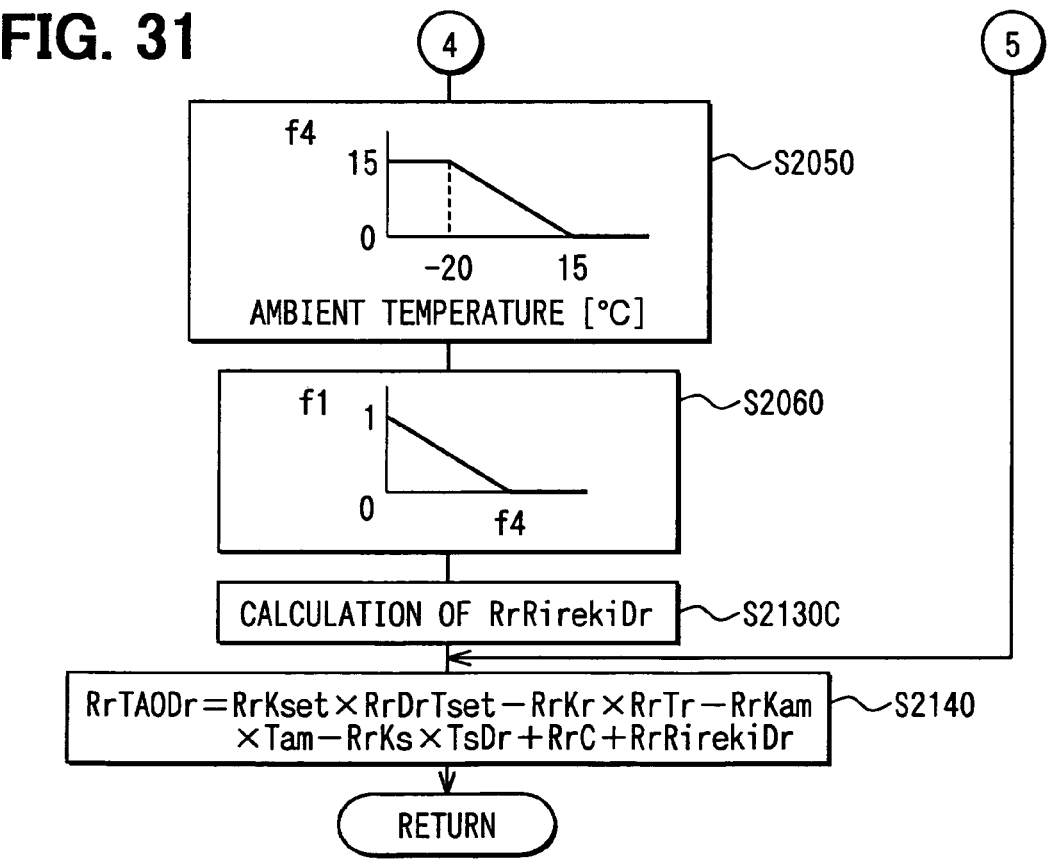

The flow charts of FIGS. 28 to 31 are different from those of FIGS. 16 to 19 or in FIGS. 24 to 27 in that the step S2070B in FIG. 17 is replaced by a step S2070C in FIG. 29, and the step S2130B is replaced by a step S2130C in FIG. 31.

At the step S2070C of FIG. 29 (in case winter), "RrRirekiDr" is calculated in accordance with the following formula (26), wherein "f1" and "f4" are substituted in the formula:

$$RrRirekiDr=f1 \times 9 \times f4 \qquad (26)$$

At the step S2130C of FIG. 31 (in case of summer), "RrRirekiDr" is likewise calculated in accordance with the following formula (27), wherein "f1" and "f4" are substituted in the formula:

$$RrRirekiDr=-f1 \times 9 \times f4 \qquad (27)$$

The target blowing air temperature "RrTAODr" is then calculated based on the above "RrRirekiDr" in accordance with the formula (20):

$$RrTAODr=RrKset \times RrDrTset-RrKr \times RrTr-RrKam \times Tam-RrKs \times TsDr+RrC+RrRirekiDr \qquad (20)$$

As above, the target blowing air temperature "RrTAODr" of the case that the ECU determines that the passenger has got into the vehicle.

The target blowing air temperature "RrTAODr" before the passenger gets into the vehicle is also calculated in accordance with the formula (20), wherein "RrRirekiDr" is zero (RrRirekiDr=0). On the other hand, in the case that the outside temperature is lower than 10° C. (YES at the step S2010 of FIG. 28), and the passenger gets into the vehicle, "RrRirekiDr" calculated at the step S2070C of FIG. 29 is larger than zero (RrRirekiDr>0). The target blowing air temperature in the winter season is thus increased when the ECU determines that the passenger gets into the vehicle, compared with the target blowing air temperature calculated when no passenger is in the rear right space 1c. As a result, the power of the air conditioning operation by the rear unit 6 for the rear right space 1c is increased.

In the case that the outside temperature is higher than 15° C. (YES at the step S2080 of FIG. 30), and the passenger gets into the vehicle, "RrRirekiDr" calculated at the step S2030C of FIG. 31 is smaller than zero (RrRirekiDr<0). The target blowing air temperature in the summer season is thus decreased when the ECU determines that the passenger gets into the vehicle, compared with the target blowing air temperature calculated when no passenger is in the rear right space 1c. As a result, the power of the air conditioning operation by the rear unit 6 for the rear right space 1c is increased.

Seventh Embodiment

In the above embodiments, one blower device 52 is provided for the front space 1a and 1b, whereas one blower device 62 is provided for the rear space 1c and 1d. According to the seventh embodiment, one blower device is provided for the front right space 1a and rear right space 1c, whereas one blower device is provided for the front left space 1b and the rear left space 1d.

The seventh embodiment is explained with reference to FIG. 32, in which an air conditioning unit (right unit) for the front right and rear right spaces 1a and 1c is shown, and an air conditioning unit (left unit) for the front left and rear left spaces 1b and 1d is omitted. The reference numerals in FIG. 32, which are the same to those in FIG. 2, are those components substantially identical to those of FIG. 2.

The right unit 5A independently controls the blowing air temperatures and the blowing air modes (modes for the air outlets) for the respective air conditioning spaces (front right space) 1a and (rear right space) 1c.

The right unit 5A has an air duct 50 provided at a front portion of the passenger room of the vehicle. An air switching door 51 and a blower device 52 are provided at an upstream end of the air duct 50. The air switching door 51 is operated by a servo motor for selectively opening an outside air port 50b and an inside air recirculation port 50a.

The blower device 52 has a centrifugal type blower fan driven by a blower motor 52a for generating air flow so that the air is blown into the passenger compartment. The blower motor 52a is controlled by a blower driving circuit 52d. An evaporator 53 is provided in an intermediate portion of the air duct 50, for cooling down the air flowing through the air duct 50.

A partitioning plate 57 is provided in the air duct 50 and at the downstream side of the evaporator 53 to divide the air passage in the air duct 50 into two air passages, namely a front air passage 57A and a rear air passage 57B.

A defroster air outlet, a face air outlet, and a foot air outlet, which are not shown in the drawing but opening to the front right space 1a, are formed at a downstream side of the front air passage 57A.

A face air outlet and a foot air outlet, which are not shown in the drawing but opening to the rear right space 1c, are likewise formed at a downstream side of the rear air passage 57B.

A heater core 54 is provided for heating the air flowing through the front and rear air passages 57A and 57B, by heat exchanging with engine cooling water.

Air mix doors 58a and 58b are respectively provided in the front and the rear air passages 57A and 57B, and at the upstream side of the heater core 54, wherein the air mix doors 58a and 58b are independently operated. The air mix doors 58a and 58b respectively controls, by adjusting its opening degree in the front and rear air passages 57A and 57B, a ratio of an amount of the air (hot air) flowing through the heater core 54 to an amount of the air (cool air) flowing in bypass air passages (which bypass the heater core 54).

The air mix doors 58a and 58b are respectively operated by servo motors 580a and 580b, so that the temperatures of the blowing air to be blown into the air conditioning spaces 1a and 1c are independently controlled.

The evaporator 53 forms a part of the refrigerating cycle, which comprises a compressor to be operatively connected with an engine for the vehicle through an electromagnetic clutch and for compressing refrigerant, a condenser for condensing the refrigerant discharged from the compressor, a receiver for separating the condensed refrigerant into liquid-phase and gas-phase refrigerants, an expansion valve for expanding the liquid-phase refrigerant from the receiver in an adiabatic manner, and the evaporator 53 for evaporating the liquid-phase and gas-phase refrigerant.

Figure 32:
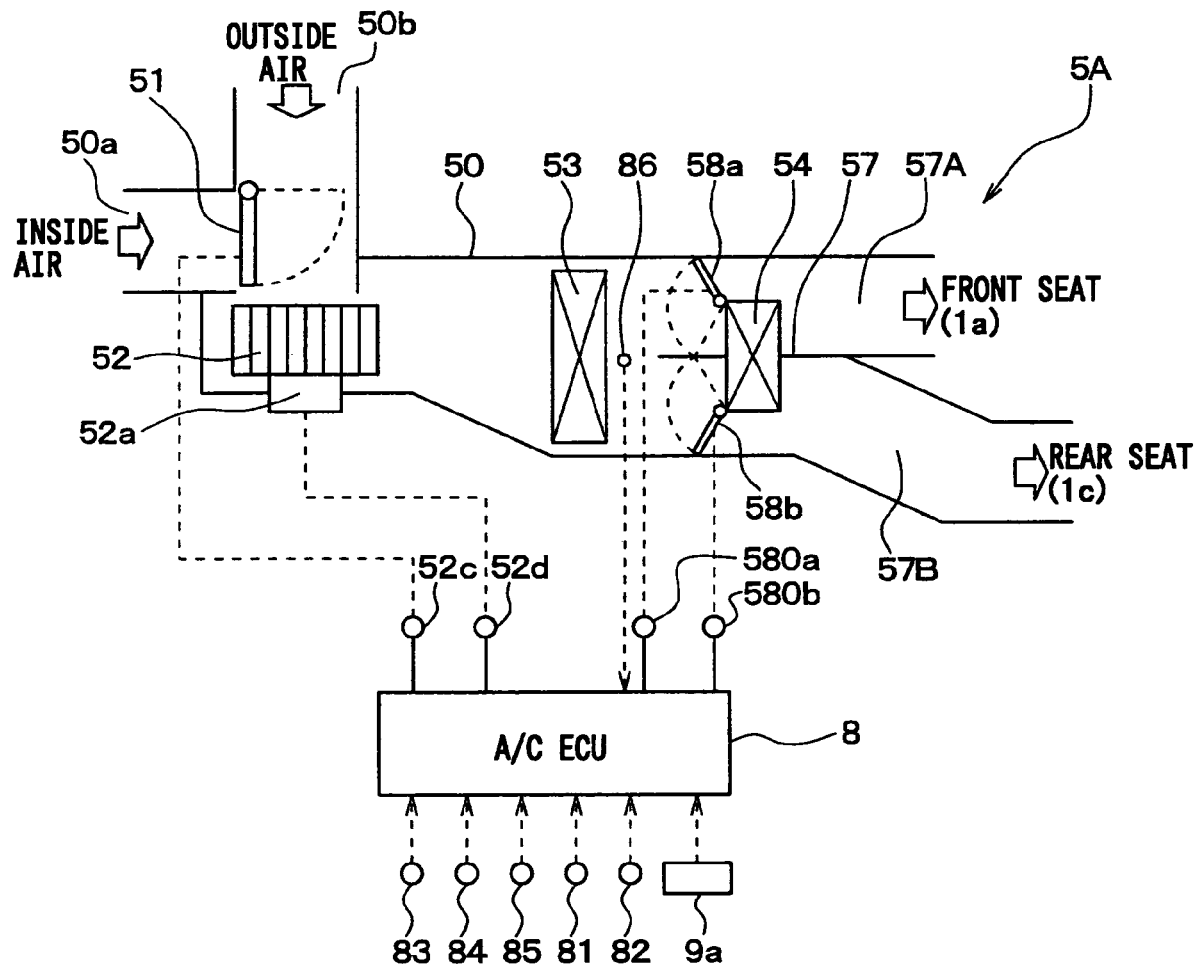
FIG. 32 is a schematic view showing the air conditioning system, according to a seventh embodiment.

An inside (front) air temperature sensor (e.g. thermister) 84 for detecting the inside air temperature in the front space 1a, an inside (rear) air temperature sensor (e.g. thermister) 85 for detecting the inside air temperature in the rear space 1c, an outside air temperature 81, an evaporator temperature sensor 86 for detecting the temperature of the air having passed through the evaporator 53, and a water temperature 82 for detecting the temperature "Tw" of the engine cooling water are connected to the ECU 8, as shown in FIG. 32.

A solar insolation sensor 83 for respectively detecting the amount of the solar insolation in the front right space (driver's seat) 1a and the front left space 1b (assistant driver's seat), and matrix type infrared ray (IR) sensors 70a and 70b are further connected to the ECU 8. Various signals from switches of a control panel 9a are also inputted into the ECU 8.

The control panel 9a comprises a switch for an (inside-outside) air mode, a switch for blowing air mode (a mode for selecting air outlets), a switch for blowing air amount, a switch for air conditioning operation, a switch for setting a front temperature, a switch for setting a rear temperature, and so on. The switch for setting the front temperature is a switch for setting a desired temperature "FrTsetDr" for the front space, and the switch for setting the rear temperature is a switch for setting a desired temperature for the rear space.

The ECU 8 is further explained with reference to FIG. 33, which shows a block diagram for a structure of the ECU 8. The ECU 8 controls various actuators 52c, 52d, 580a, 580b and so on, based on the input signals from the various sensors 81 to 86 and the various switches of the control panel 9a.

Figure 33:
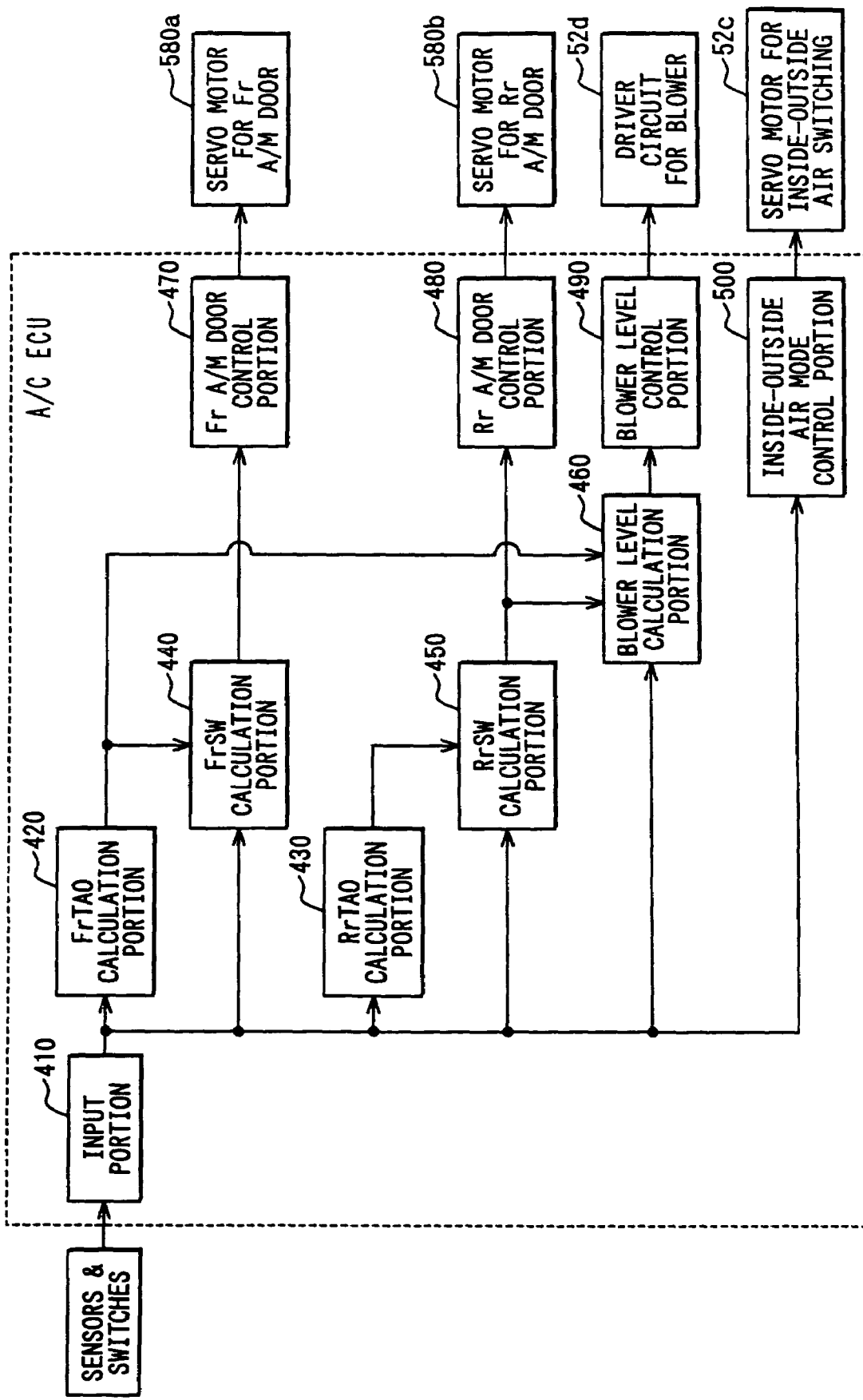
FIG. 33 is a schematic view showing a structure of an electronic control unit according to the seventh embodiment.
Figure 34:
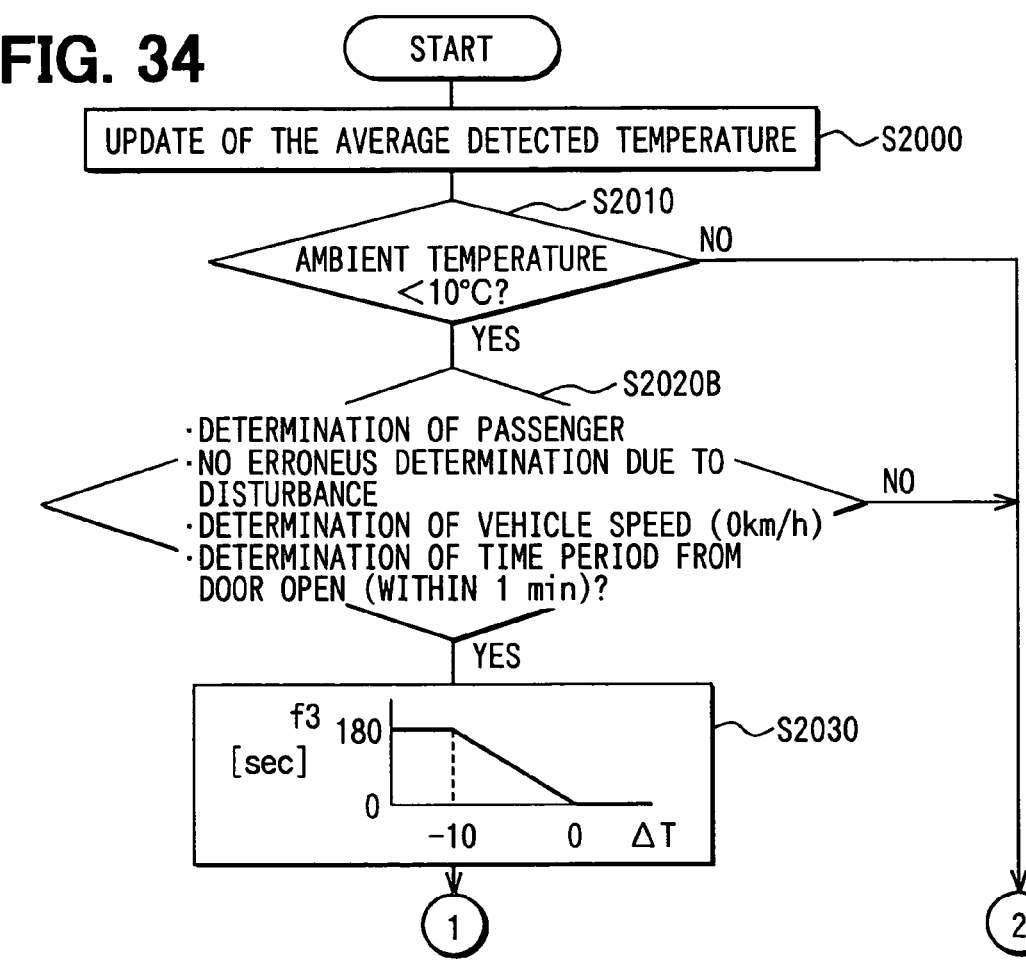
FIGS. 34 to 37 are flow charts showing a part of the process for calculating the target blowing air temperature, according to the seventh embodiment.
Figure 35:
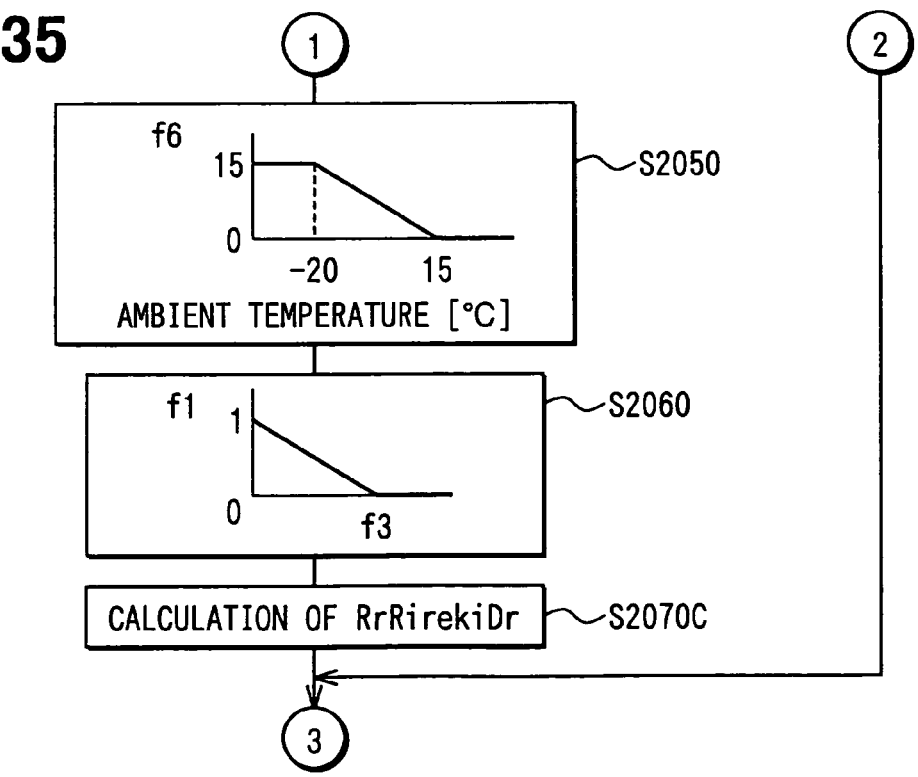
Figure 36:
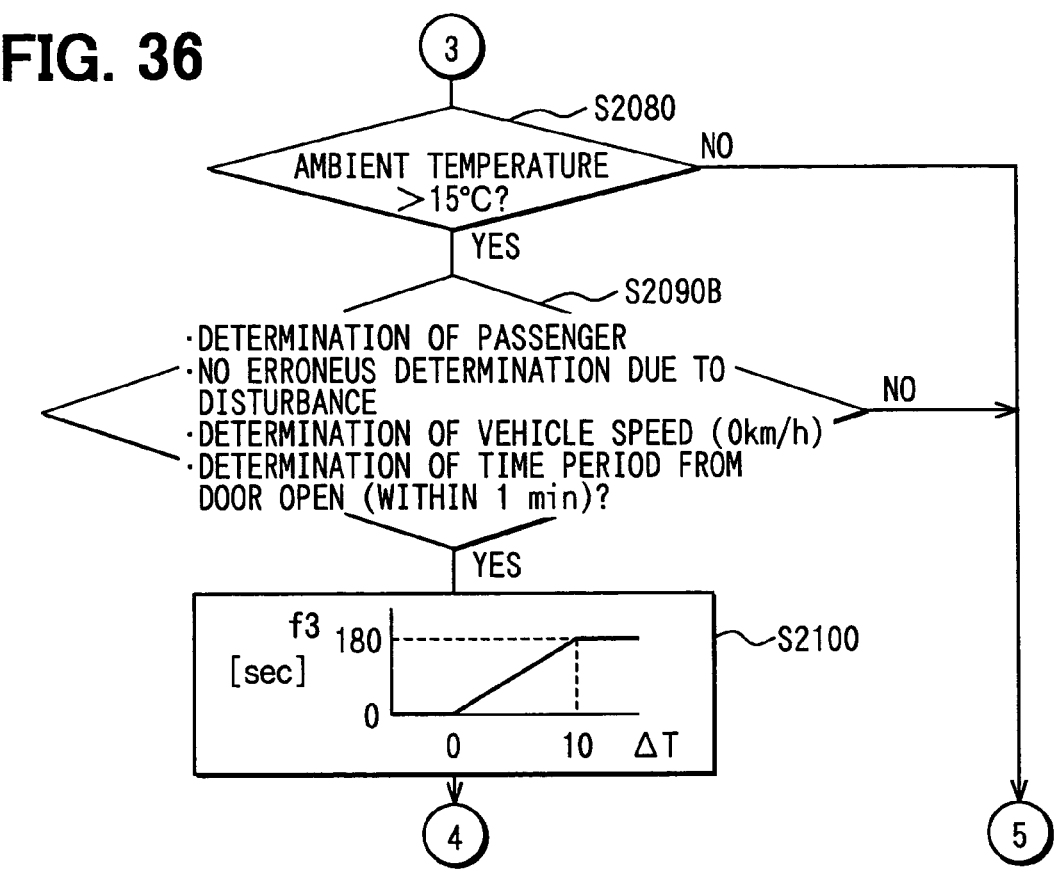
Figure 37:
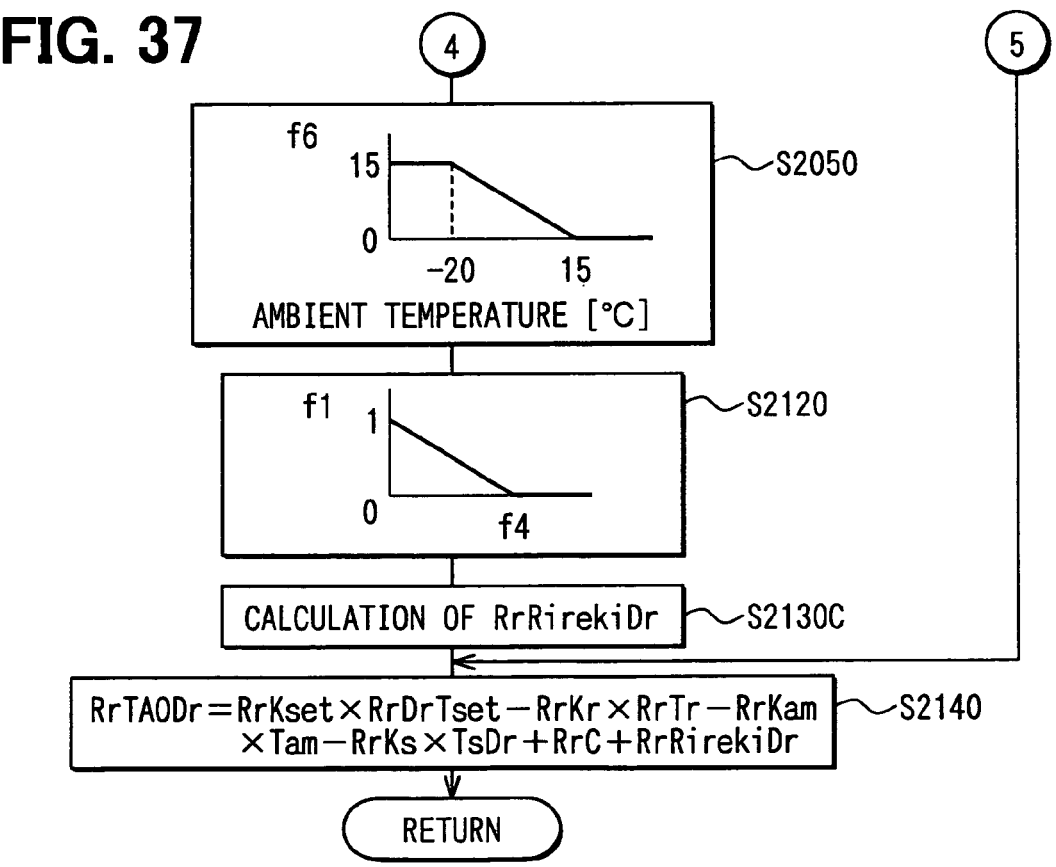

As shown in FIG. 33, the ECU 8 comprises an input portion 410, an FrTAO calculation portion 420 for a target blowing air temperature "FrTAO" for the front space, a RrTAO calculation portion 430 for a target blowing air temperature "DrTAO" for the rear space, an FrSW calculation portion 440 for an opening degree "FrSW" of the air mix door for the front space, a RrSW calculation portion 450 for an opening degree "RrSW" of the air mix door for the rear space, a blower level calculation portion 460 for a blower level, an Fr A/M door control portion 470 for the front air mix door, a Rr A/M door control portion 480 for the rear air mix door, a blower level control portion 490 for the blower level, and a inside-outside air control portion 500 for controlling the inside-outside air.

The signals from the various sensors 31 to 35, 70a, 70b, as well as various signals from the control switches of the panel 9a are inputted into the input-portion 410.

In the FrTAO calculation portion 420, the target blowing air temperature "FrTAODr" is calculated in accordance with the formula (28), in which the set temperature "FrTsetDr" for the front right space 1a, the detected temperature "TrDr" of the inside air in the front space, the ambient temperature "Tam", and the amount of the solar insolation in the front right space are substituted in the formula:

$$FrTAODr=KsetFrDr\cdot FrTsetDr-KrFr\cdot TrFr-FrKs\times TsDr-Kam\cdot Tam+CFrDr \quad (28)$$

In the above formula (28), "KsetFrDr" is a temperature set gain for the front right space, "KrFr" is an inside temperature gain for the front space, "Kam" is an outside temperature gain, "FrKs" is an insolation gain, and "CFrDr" is a constant for correction for the front right seat.

In the RrTAO calculation portion 430, the target blowing air temperature "RrTAODr" is calculated in the similar manner to "FrTAODr", in which the set temperature "RrTsetDr" for the rear right space 1c, the detected temperature "TrDr" of the inside air in the rear space, and so on are used for the calculation.

The process for calculating the target blowing air temperature "RrTAODr" for the rear right space 1c is further explained with reference to the flow charts shown in FIGS. 34 to 37.

At a step S2000 (FIG. 34), the ECU 8 receives the detected temperature signals "Tirr1(n)", "Tirr2(n)" and "Tirr3(n)" from the respective thermoelectric couples Drr1, Drr2 and Drr3 at the predetermined intervals, and calculates the average values "AvTir1(n)", "AvTir2(n)" and "AvTir3(n)".

At a step S2010 (FIG. 34), the ECU 8 determines (YES) that it is the winter season, when the ambient temperature is lower than 10° C., and the process goes to a step S2020B. At the step S2020B, the ECU 8 determines whether the passenger gets into the rear right space 1c or not, based on the above average values "AvTir1(n)", "AvTir2(n)" and "AvTir3(n)", the detected inside temperature "RrTr" of the rear right space by the inside air temperature sensor 85.

In the case that a vehicle speed is zero (0 km/h), the ECU determines (YES at the step S2020B) that the passenger has got into the vehicle, when the following three conditions (9) to (11) are satisfied within a predetermined time period (for example, 1 min) after a vehicle door is opened so that the passenger gets into the vehicle:

$$AvTir1(n)-RrTr\leqq-3 \quad (9)$$

$$AvTir2(n)-RrTr\leqq-3 \quad (10)$$

$$AvTir3(n)-RrTr\leqq-3 \quad (11)$$

In the case that the ECU determines (YES) at the above step S2020B, the process goes to a step S2030, at which the ECU calculates an elapsed time "f3" from a time at which the above determination is done.

Then, the process goes to a step S2050 (FIG. 35), at which a control coefficient "f6" is calculated based on the ambient temperature. The process further goes to a step S2060 (FIG. 35), at which a control coefficient "f1" is calculated based on "f3", wherein "f1" is calculated based on the detected temperature of the IR sensor 70a.

"RrRirekiDr" is calculated in accordance with the formula (29), in which the values of "f1" and "f6" are substituted:

$$RrRirekiDr=f1\times9\times f6 \quad (29)$$

In the case that the ambient temperature is higher than 15° C., the ECU 8 determines that it is the summer season (YES at a step S2080 in FIG. 36), the process goes to a step S2090B. At the step S2090B, the ECU 8 likewise determines whether the passenger gets into the rear right space 1c or not, based on the above average values "AvTir1(n)", "AvTir2(n)" and "AvTir3(n)", the detected inside temperature "RrTr" of the rear right space by the inside air temperature sensor 85.

In the case that a vehicle speed is zero (0 km/h), the ECU determines (YES at the step S2090B) that the passenger has got into the vehicle, when the following three conditions (12) to (14) are satisfied within a predetermined time period (for example, 1 min) after the vehicle door is opened so that the passenger gets into the vehicle:

$$AvTir1(n)-RrTr\geqq3 \quad (12)$$

$$AvTir2(n)-RrTr\geqq3 \quad (13)$$

$$AvTir3(n)-RrTr\geqq3 \quad (14)$$

In the case that the ECU determines (YES) at the above step S2090B, the process goes to a step S2100, at which the ECU calculates an elapsed time "f3" from a time at which the above determination is done.

Then, the process goes to a step S2050 (FIG. 37), at which a control coefficient "f6" is calculated based on the ambient temperature. The process further goes to a step S2120 (FIG. 37), at which a control coefficient "f1" is calculated based on "f3".

"RrRirekiDr" is calculated in accordance with the formula (30), in which the values of "f1" and "f6" are substituted:

$$RrRirekiDr=-f1\times9\times f6 \quad (30)$$

When the "RrRirekiDr" is calculated at the step S2070C (FIG. 35 for the winter season) or the step S2130C (FIG. 37 for the summer season), the target blowing air temperature "RrTAODr" is calculated by use of the above calculated "RrRirekiDr" at a step S2140.

In the FrSW calculation portion 440 (FIG. 33), the ECU 8 calculates the opening degree "FrSW" of the front air mix door 58a in accordance with the following formula (31), wherein the evaporator temperature "Te" inputted in the input portion 410, and the target blowing air temperature "FrTAODr" calculated in the FrTAO calculation portion 420 are substituted in the formula:

$$FrSW=\{(FrTAODr-Te)/(Tw-Te)\}\times100(\%) \quad (31)$$

In the case that the opening degree "FrSW" is 0%, the right unit 5A is operated as a max-cool mode, wherein the blowing air for the front right space is only the cold air. In the case that the opening degree "FrSW" is 100%, the right unit 5A is operated as a max-hot mode, wherein the blowing air for the front right space is only the hot air.

In the RrSW calculation portion 450 (FIG. 33), the ECU 8 calculates the opening degree "RrSW" of the front air mix door 58b in accordance with the following formula (32), wherein the evaporator temperature "Te" inputted in the input portion 410, and the target blowing air temperature "RrTAODr" calculated in the RrTAO calculation portion 430 are substituted in the formula:

$$RrSW=\{(RrTAODr-Te)/(Tw-Te)\}\times100(\%) \quad (32)$$

In the case that the opening degree "RrSW" is 0%, the right unit 5A is operated as a max-cool mode, wherein the blowing air for the rear right space is only the cold air. In the case that the opening degree "RrSW" is 100%, the right unit 5A is operated as a max-hot mode, wherein the blowing air for the rear right space is only the hot air.

In the blower level calculation portion 460 (FIG. 33), the ECU 8 calculates a blower voltage (a voltage to be applied to the blower motor 52a), based on the target blowing air temperature "FrTAODr" for the front space calculated in the FrTAO calculation portion 420 and the target blowing air temperature "RrTAODr" for the rear space calculated in the RrTAO calculation portion 430. Namely, a blowing air level by the blower device 52 (i.e. a target amount of the blowing air) is calculated.

Figure 38:
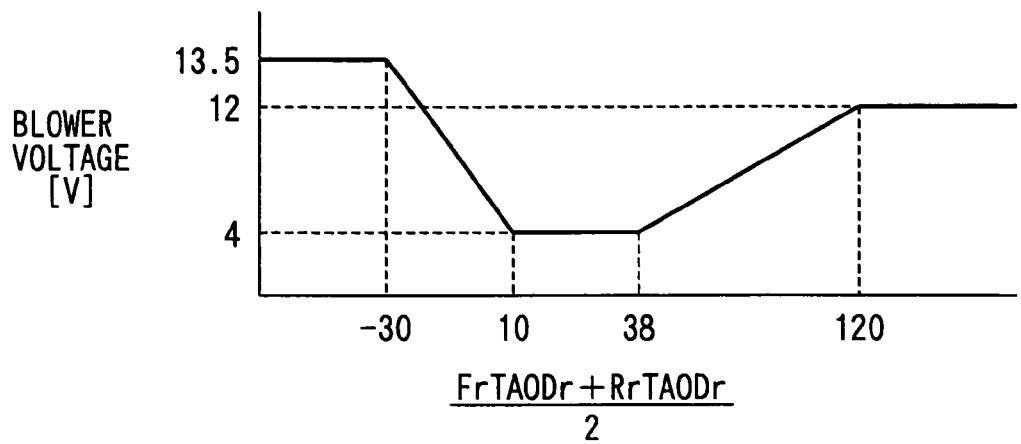
FIG. 38 is a control map for calculating a blower voltage.

More specifically, the blower voltage for the blower motor 52a is calculated in accordance with a control map shown in FIG. 38, based on an average amount of the "FrTAODr" and "RrTAODr":

The average amount=(*FrTAODr*+*RrTAODr*)/2

According to the control map shown in FIG. 38, the blower voltage is increased when the average amount becomes higher or lower than an intermediate range.

The Fr A/M door control portion 470 (FIG. 33) controls the servomotor 580a based on the opening degree "FrSW" for the front air mix door 58a calculated in the FrSW calculation portion 440.

The Rr A/M door control portion 480 (FIG. 33) controls the servomotor 580b based on the opening degree "RrSW" for the rear air mix door 58b calculated in the RrSW calculation portion 450.

The blower level control portion 490 (FIG. 33) controls the blower circuit 52d based on the blower level calculated in the blower level calculation portion 460 to control the amount of the blowing air by the blower device 52. The air mode control portion 500 (FIG. 33) controls the servomotor 52c based on the signal inputted into the input portion 410 from the air mode switch.

Figure 39:
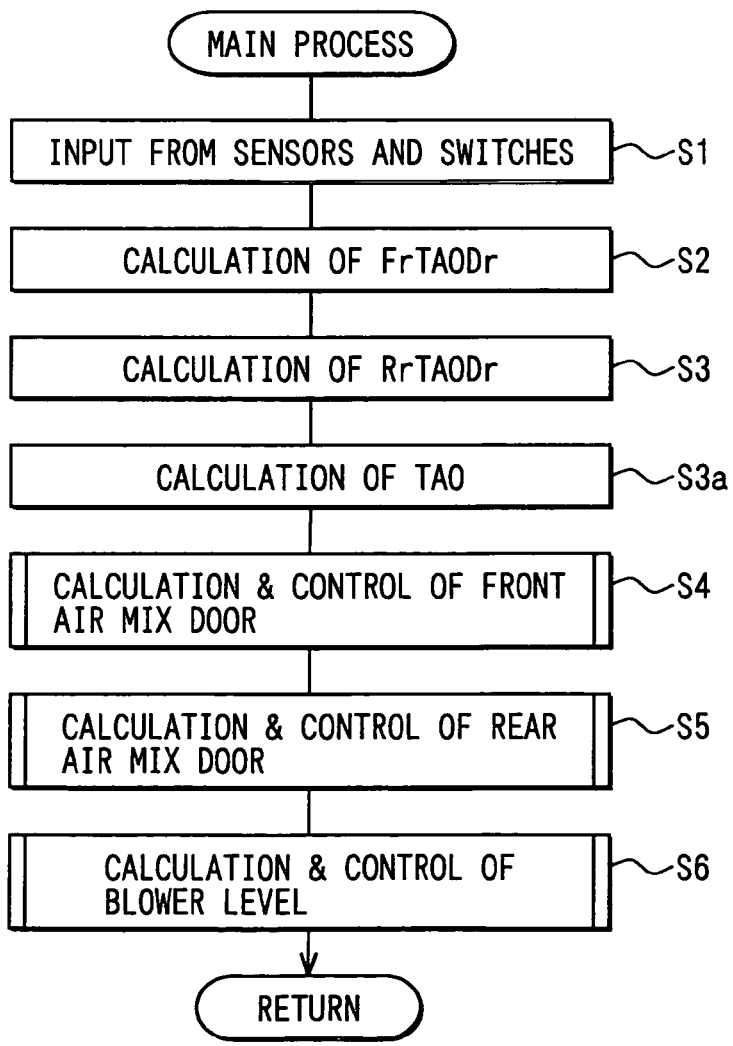
FIGS. 39 and 40 are flow charts showing a part of the process for calculating the target blowing air temperature, according to the seventh embodiment.

The processes by the ECU 8 for controlling the air mix doors and the blower level are explained with reference to the flow charts shown in FIGS. 39 to 42, wherein FIG. 39 shows a flow chart for a main process.

As shown in FIG. 39, at a step S1, the ECU 8 inputs into the input portion 410 (FIG. 33) signals from the various sensors 81 to 86 and from the switches of the control panel 9a. At a step S2, the ECU calculates the target blowing air temperature "FrTAODr" for the front right space in the calculation portion 420 (FIG. 33). At a step S3, the ECU calculates the target blowing air temperature "RrTAODr" for the rear right space in the calculation portion 430 (FIG. 33).

At a step S3a, the ECU 8 corrects the value of "FrTAODr" in the FrTAO calculation portion 420, depending on the determination whether the passenger gets into the rear right space 1c.

A reason for correcting the value of "FrTAODr" for the front right space 1a is to keep the power for the air conditioning operation for the front space at almost the same value before and after the passenger has got into the rear right space 1c.

Figure 40:
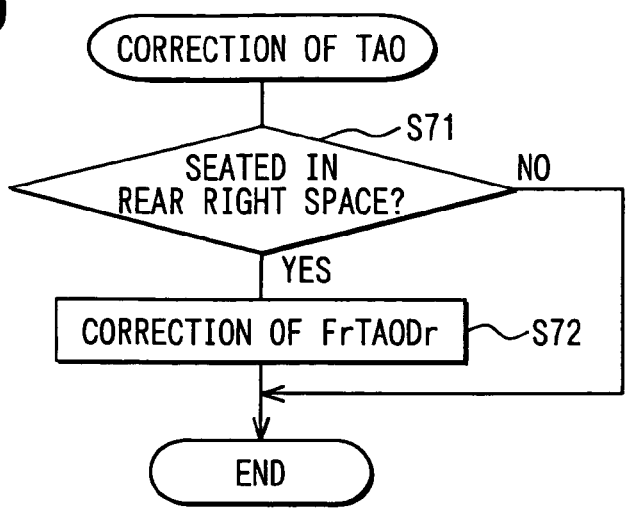

For example, in the case that the ECU determines that the passenger has got into the rear space of the vehicle at the step S2020B (FIG. 34) or the step S2090B (FIG. 36), (this process corresponds to a step S71 in FIG. 40), the ECU corrects the value of "FrTAODr" at a step S72 in FIG. 40. A correction amount of "FrTAODr" is calculated based on a difference "ΔBV" and control maps shown in FIGS. 41 and 42, wherein the difference "ΔBV" is a difference between a blower voltage after and before the determination that the passenger has got into the rear right space.

At first, in the case that the value of "FrTAODr" before correction is larger than 25° C. (i.e. in the winter season), the correction amount "Th" for "FrTAODr" is calculated based on the above difference "ΔBV" and the control map of FIG. 41.

Figure 41:
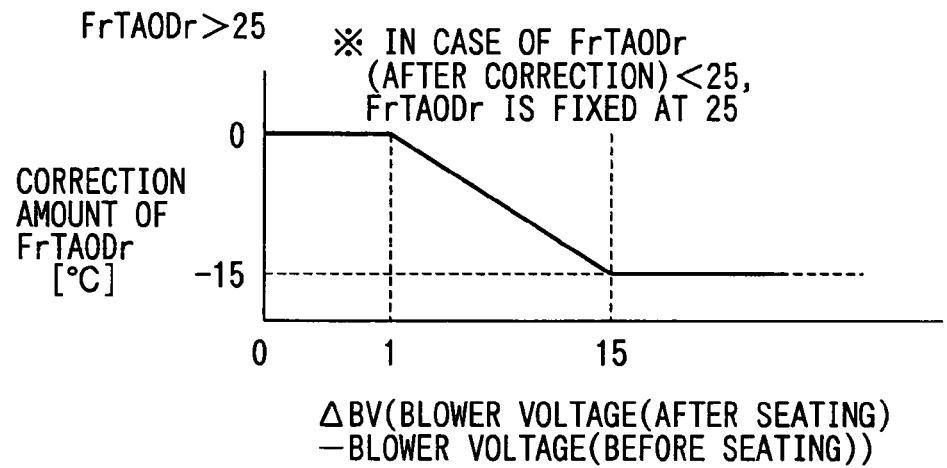
FIGS. 41 and 42 are charts for explaining correction of the target blowing air temperature, according to the seventh embodiment.

In the control map of FIG. 41, the correction amount "Th" is decreased as the difference "ΔBV" is increased, when the difference "ΔBV" is between 1° C. and 15° C. (1<ΔBV<15). In the case that the difference "ΔBV" is smaller than 1° C. (ΔBV≦1), the correction amount "Th" is constant at its maximum value, whereas in the case that the difference "ΔBV" is larger than 15° C. (ΔBV≧15), the correction amount "Th" is constant at its minimum value.

When the above correction amount "Th" is calculated, the value of "FrTAODr" after the correction is calculated by deducting the correction amount "Th" from the value of "FrTAODr" before the correction:

*FrTAODr*(after correction)=*FrTAODr*(before correction)−*Th*

In the case that the value of "FrTAODr (after correction)" becomes lower than 25° C. (FrTAODr (after correction)<25° C.), however, the value of "FrTAODr (after correction)" is fixed at 25° C.

On the other hand, in the case that the value of "FrTAODr" (before correction) is lower than 25° C. (i.e. in the summer season), the correction amount "Th" for "FrTAODr" is calculated based on the above difference "ΔBV" and the control map of FIG. 42.

Figure 42:
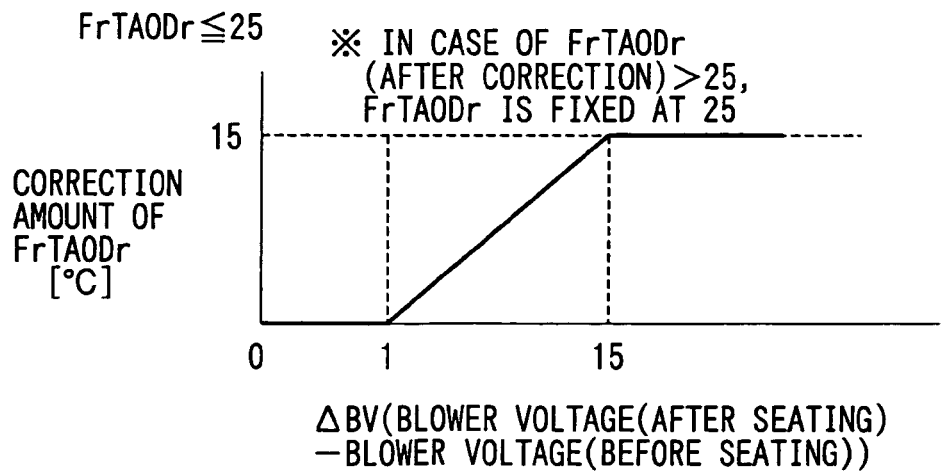

In the control map of FIG. 42, the correction amount "Th" is increased as the difference "ΔBV" is increased, when the difference "ΔBV" is between 1° C. and 15° C. (1<ΔBV<15). In the case that the difference "ΔBV" is smaller than 1° C. (ΔBV≦1), the correction amount "Th" is constant at its minimum value, whereas in the case that the difference "ΔBV" is larger than 15° C. (ΔBV≧15), the correction amount "Th" is constant at its maximum value.

When the above correction amount "Th" is calculated, the value of "FrTAODr" after the correction is calculated by deducting the correction amount "Th" from the value of "FrTAODr" before the correction:

*FrTAODr*(after correction)=*FrTAODr*(before correction)−*Th*

In the case that the value of "FrTAODr (after correction)" becomes higher than 25° C. (FrTAODr (after correction)>25° C.), however, the value of "FrTAODr (after correction)" is fixed at 25° C.

When the target blowing air temperature "FrTAODr" is corrected as above, at the step S72 in FIG. 40, the corrected value of "FrTAODr (after correction)" is used for the following processes S4 to S6 in FIG. 39.

In the case that the ECU determines that the passenger is not in the rear space of the vehicle at the step S2020B (FIG. 34) or the step S2090B (FIG. 36), (NO at the step S71 in FIG. 40), the value of "FrTAODr" is not corrected and therefore the value of "FrTAODr (before correction)" is used for the following processes S4 to S6 in FIG. 39.

The FrSW calculation portion 440 and the FrSW control portion 470 of the ECU (FIG. 33) calculate and control the opening degree of the front air mix door 58a, at a step S4 in FIG. 39. Namely, the FrSW calculation portion 440 reads the target blowing air temperature "FrTAODr" from the FrTAO calculation portion 420, and the FrSW calculation portion 440 calculates the target opening degree "FrSW" of the front air mix door. Then, the Fr A/M door control portion 470 controls the servo motor 580a for the front air mix door based on the target opening degree "FrSW".

At a step S5 in FIG. 39, the opening degree of the rear air mix door 58b is calculated and controlled. Namely, the RrSW calculation portion 450 reads the target blowing air temperature "RrTAODr" from the RrTAO calculation portion 430, and the RrSW calculation portion 450 calculates the target opening degree "RrSW" of the rear air mix door. Then, the Rr A/M door control portion 480 controls the servo motor 580b for the rear air mix door based on the target opening degree "FrSW".

At a step S6 in FIG. 39, the blower level calculation portion 460 calculates the blower level based on the average value of the target blowing air temperature "FrTAODr" for the front space and "RrTAODr" for the rear space, and the blower level control portion 490 controls the blower circuit 52c based on the calculated blower level and thereby controls the amount of the blowing air.

The air conditioning operation for the passenger room is performed by repeating the above processes at the predetermined intervals.

According to the above embodiment, the target blowing air temperature "FrTAODr" for the front space is corrected when the ECU determines that the passenger has got into the rear right space 1c, so that the power of the air conditioning operation for the front space 1a can be kept at the same level to that of the air conditioning operation before the determination of the passenger in the rear space.

In the case that the passenger gets into the rear right space 1c, the value of "RrRirekiDr" and thereby the value of "RrTAODr" are calculated based on the detected values of the IR sensor 70a with respect to such passenger in the rear space. And the amount of the blowing air to the front and rear spaces 1a and 1c by the blower device 52 is calculated based on the above "RrTAODr".

As a result, the amount of the blowing air to the front right space 1a may be varied after the passenger gets into the rear right space 1c. However, as explained above, according to the embodiment, the target blowing-air temperature "FrTAODr" for the front right space is corrected to adjust the temperature of the blowing air for the front right space 1a, so that the power of the air conditioning operation for the front right space 1a can be kept at the same level to that of the operation before the passenger gets into the rear space.

And therefore, even when the amount of the blowing air for the front right space 1a is varied, as a result that the passenger gets into the rear right space 1c, an uncomfortable feeling to the passenger in the front space can be suppressed, because the power of the air conditioning operation for the front right space 1a can be kept at the same level to that of the operation before the passenger gets into the rear space.

In the above seventh embodiment, the FrTAO calculation portion 420 corrects the target blowing air temperature "FrTAODr" depending on the determination whether the passenger gets in the rear right space 1c or not. It can be modified in such a manner that the RrTAO calculation portion 430 corrects the target blowing air temperature "RrTAODr" depending on the determination whether the passenger gets in the front right space 1a, in the case that the space 1a is for the assistant driver's seat.

In the above determination whether the passenger gets into the vehicle, a pressure sensor for detecting a pressure applied to a vehicle seat can be used in place of the matrix IR sensor.

Other Embodiments

In the above embodiments, the average value of three detected temperatures of "RrDrShoulder", "RrDrBody" and "RrDrLeg" from the no-contact temperature sensor (IR sensor 70a) is used as the clothing temperature "RrDrTir". However, one of them, or an average value among two of them can be used as the clothing temperature "RrDrTir"

In the similar way, one of the three detected values from the thermoelectric couples "Dr2", "Dr3" and "Dr4", or an average value among two of them can be used as the detected value from the no-contact temperature sensor.

In the above embodiments, the clothing temperature "RrDrTir (average)" or "RrPaTir (average)" is used for calculating the target blowing air temperatures "RrTAODr" or "RrTAOPa", so that the time delay appears the change of the clothing temperature "RrDrTir" or "RrPaTir". However, the clothing temperature "RrDrTir" or "RrPaTir" can be used without time delay for the calculation of the target blowing air temperatures "RrTAODr" or "RrTAOPa".

In the above first embodiment, the time constant "τ" is fixed at the predetermined value "180 sec" during the predetermined time period of "2 min" after the determination that the passenger has got into the vehicle, and the time constant "τ" is changed to another predetermined value "30 sec" after the predetermined time period "2 min". However, the time constant "τ" can be gradually changed (decreased) from the first predetermined value "180" to the second predetermined value "30 sec" as the time passes by. And, the first and second predetermined values are not limited to those values of "180 sec" or "30 sec".

In the above first embodiment, the time constant "τ" is fixed at the predetermined value "30 sec" before the passenger gets into the vehicle, so that the time delay in the changes of the clothing temperatures detected by the IR sensor 70a (70b) is reflected in the calculation of the target blowing air temperature for the rear unit 6. However, the detected temperature of the IR sensor 70a (70b) can be used directly (without time delay) for calculating the target blowing air temperature for the rear unit 6, before the passenger gets into the vehicle.

Further, in the above first embodiment, the time constant "τ" is fixed at the predetermined value "30 sec" after the predetermined time period (2 min) from the passenger gets into the vehicle, so that the time delay in the changes of the clothing temperatures detected by the IR sensor 70a (70b) is reflected in the calculation of the target blowing air temperature for the rear unit 6. However, the detected temperature of the IR sensor 70a (70b) can be used directly (without time delay) for calculating the target blowing air temperature for the rear unit 6, after the predetermined time period (2 min) from the passenger gets into the vehicle.

In the second embodiment, the contribution ratio of the detected temperature by the IR sensor 70a (70b) to the "RrTAODr" is increased when the passenger gets into the vehicle and gradually decreased as the time passes by from the riding time of the passenger. However, the contribution ratio can be maintained at a constant high value for a certain time period and can be gradually or stepwise decreased after the certain time period.

In the above embodiments, the thermopile type detecting device is used for the matrix IR sensors 70a and 70b, wherein the change of electromotive force-generated in response to an amount change of infrared ray is detected as the temperature change. However, other types of the sensors, such as a quantum type sensor for directly converting the infrared ray energy into an electrical signal, a pyroelectric type sensor using polarization due to temperature change in response to the amount of the infrared ray, or a bolometer type sensor using a change of resistance due to temperature change in response to the amount of the infrared ray.

Furthermore, in the above embodiments, the ECU determines whether the air conditioning operation by the rear unit 6 for the rear space is in the normal condition or not, based on the inside air temperature "TrRr" from the inside air temperature sensor 85. However, the above determination can be also carried out by use of a relation between "RrTAODr" (or "RrTAOPa") and "TrRr", or a relation between "RrTsetDr" (or "RrTsetPa") and "TrRr".

In the above embodiments (third to seventh embodiments), the determination whether the passenger has got into the vehicle or not is performed based on the three conditional formulas ((1) to (3), (4) to (6), (9) to (11) or (12) to (14), wherein all of those three conditional formulas are satisfied. However, the determination ca be done based on the condition that two of them (e.g. (1) and (2)) are satisfied.

As already mentioned, in the above embodiments, the time delay is given in the changes of the dressing temperatures detected by the IR sensor 70a (70b), so that the air conditioning operation is also performed with the corresponding time delay. However, instead of giving the time delay in the changes of the clothing temperatures detected by the IR sensor 70a (70b), the operation of changing the blowing air mode, controlling the amount of the blowing air, controlling the opening degree of the air mix doors can be directly operated with the time delay.

What is claimed is:

1. An air conditioning system for a vehicle comprising:
    a temperature switch for setting a desired temperature;
    an air-conditioning unit having a blower device for blowing air into a passenger compartment of the vehicle, the air-conditioning unit further having an evaporator and a heater core for carrying out an air-conditioning operation so as to control temperature of the air blown into the passenger compartment;
    a no-contact temperature sensor for detecting surface temperature of the passenger's clothing; and
    a control unit for calculating a target value for temperature of the air blown into the passenger compartment from the air-conditioning unit, the target value being calculated based on the desired temperature and the surface temperature detected by the no-contact temperature sensor so that the air-conditioning operation is carried out by the air-conditioning unit in accordance with the target value,
    wherein the air-conditioning unit continues operation using a time delay before returning to normal operation in such a manner that the time delay in a case of a passenger getting into the vehicle is made larger than the time delay before the passenger gets into the vehicle.

2. The air conditioning system according to claim 1, wherein
    the time delay is given to a change of the surface temperature detected by the no-contact temperature sensor.

3. The air conditioning system according to claim 2, wherein,
    the time delay is decided by a time constant "$\tau$".

4. The air conditioning system according to claim 3, wherein,
    the time constant "$\tau$" is decreased as time passes by after the control unit determines that the passenger has gotten into the vehicle.

5. The air conditioning system according to claim 4, wherein,
    the time constant "$\tau$" is kept at a predetermined value during a predetermined time period from determination by the control unit that the passenger has gotten into the vehicle, and the time constant "$\tau$" is decreased from the predetermined value after the predetermined time period.

6. The air conditioning system according to claim 3, wherein,
    the surface temperature detected by the no-contact temperature sensor is corrected by the control unit in such a way that the surface temperature is changed with the time constant "$\tau$", and
    the air-conditioning operation of the air-conditioning unit is controlled based on a corrected value of the surface temperature.

7. The air conditioning system according to claim 6, wherein,
    the target value for the temperature of the air blown into the passenger compartment from the air-conditioning unit is calculated based on the desired temperature and the corrected value of the surface temperature, and
    the control unit controls the air-conditioning unit based on the target value, so that the temperature of the air blown into the passenger compartment is controlled to be closer to the target value.

8. An air conditioning system according to claim 7, wherein
    the air-conditioning unit comprises multiple air outlets for blowing the air-conditioned air toward the passengers in the first seat and a second seat, wherein the air-conditioning operation for the first and second seats is independently performed,
    the control unit controls the air-conditioning unit so that an amount of the blowing air by the blower device as well as the temperatures of the blowing air for the first and second seats, based on the detected temperature, and
    the control unit further changes the temperature of the blowing air for the first seat, to keep the power of the air-conditioning operation for the first seat, when the control unit determines that the passenger has gotten into the second seat.

9. The air conditioning system according to claim 1, wherein,
    the time delay is given to the change of the surface temperature detected by the no-contact temperature sensor, when the control unit determines that the air-conditioning operation is in its normal operational condition.

10. An air conditioning system according to claim 1, wherein
    the control unit controls the air-conditioning unit to increase a power of the air-conditioning operation by the air-conditioning unit, when the control unit determines that the passenger has gotten into the vehicle, so that the power of the air-conditioning operation after the determination becomes higher than that before the determination.

11. An air conditioning system according to claim 10, wherein
the control unit comprises setting means for setting a degree of the increase for the power of the air-conditioning operation.

12. An air conditioning system according to claim 10, wherein
the control unit increases the power of the air-conditioning operation, based on the detected temperature of the passenger's clothing.

13. An air conditioning system according to claim 10, wherein
the control unit changes a time period, during which the power of the air-conditioning operation is increased, based on the detected temperature of the passenger's clothing.

14. An air conditioning system according to claim 10, wherein
the air-conditioning unit comprises air outlets for blowing the air-conditioned air toward an upper and a lower body of the passenger, and
the control unit controls the air-conditioning unit so that the air-conditioned air is blown toward the upper and lower body of the passenger, when the control unit determines that the passenger has gotten into the vehicle.

15. An air conditioning system according to claim 10, wherein
the air-conditioning unit comprises multiple air outlets for blowing the air-conditioned air toward a body of the passenger, and
the control unit controls the air-conditioning unit so that the air-conditioned air is blown toward the body of the passenger, when the control unit determines that the passenger has gotten into the vehicle,
wherein the air-conditioned air is blown toward the passenger from such air outlet which is closer to the passenger than the other air outlets.

16. An air conditioning system according to claim 1, wherein
the control unit determines that the passenger has gotten into the vehicle, based on a change of the detected temperature of the no-contact temperature sensor.

17. An air conditioning system according to claim 16, wherein
the no-contact temperature sensor detects a first temperature of a seat portion at which the passenger generally sits, and a second temperature of another seat portion at which the passenger generally does not sit,
the control unit determines whether the passenger sits at the seat portion or not, based on a difference between the first and second temperatures, and
the control unit determines that the passenger has gotten into the vehicle, when the control unit determines that the passenger sits at the seat portion.

18. An air conditioning system according to claim 16, further comprising:
an inside air temperature sensor for detecting a temperature of inside air in the vehicle,
the control unit determines whether the passenger sits at a seat portion or not, based on a difference between the detected temperature of the no-contact temperature sensor and the inside air temperature, and
the control unit determines that the passenger has gotten into the vehicle, when the control unit determines that the passenger sits at the seat portion.

19. An air conditioning system according to claim 16, wherein,
the control unit determines that the passenger has gotten into the vehicle, when the control unit determines that the passenger sits at a seat portion, and when a vehicle speed is lower than a predetermined value.

20. An air conditioning system according to claim 16, wherein,
the control unit determines that the passenger has gotten into the vehicle, when the control unit determines that the passenger sits at a seat portion during a predetermined time period from a time point at which a vehicle door is opened.

21. An air conditioning system according to claim 16, wherein,
the control unit determines that the passenger sits at a seat portion, when a change of the detected temperature of the no-contact temperature sensor meets a predetermined condition, and
the control unit determines that the passenger has gotten into the vehicle, when the control unit determines that the passenger sits at the seat portion.

22. An air conditioning system according to claim 21, wherein,
the no-contact temperature sensor detects temperatures of the passenger's clothing at more than three different portions, and
the control unit determines that the passenger sits at the seat portion, when changes of more than two detected temperatures of the no-contact temperature sensor meet the predetermined condition.

23. An air conditioning system according to claim 21, wherein,
the no-contact temperature sensor detects temperature of the passenger' clothing at a predetermined time interval,
the control unit periodically calculates an average value from the detected temperature of this time and the detected temperature of a previous time, and corrects the detected temperature of this time to obtain a corrected detection temperature, wherein a change of the detected temperature is reflected in the corrected detection temperature with a certain time delay, and
the control unit determines that the passenger sits at the seat portion, when the average value of this time is changed by more than a predetermined amount compared with the corrected detection temperature of the previous time.

24. An air conditioning system according to claim 1, wherein,
the air-conditioning unit comprises multiple temperature adjusting devices for independently adjusting the temperatures of the blowing air into respective vehicle seats,
multiple no-contact temperature sensors are provided for the respective vehicle seats, and
the control unit controls the respective temperature adjusting devices based on the respective detected temperatures, so that the temperatures of the blowing air are adjusted for the respective vehicle seats.

* * * * *

UNITED STATES PATENT AND TRADEMARK OFFICE
CERTIFICATE OF CORRECTION

| | |
|---|---|
| PATENT NO. | : 7,578,341 B2 |
| APPLICATION NO. | : 11/108932 |
| DATED | : August 25, 2009 |
| INVENTOR(S) | : Ichishi et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this

Seventh Day of September, 2010

David J. Kappos
*Director of the United States Patent and Trademark Office*